(12) United States Patent
Greenberg et al.

(10) Patent No.: US 9,600,803 B2
(45) Date of Patent: Mar. 21, 2017

(54) MOBILE-FIRST AUTHORING TOOL FOR THE AUTHORING OF WRAP PACKAGES

(71) Applicant: Wrap Media, LLC, San Francisco, CA (US)

(72) Inventors: Eric H. Greenberg, Ross, CA (US); John M. Garris, San Francisco, CA (US); Kunal K. Bhasin, San Francisco, CA (US); Jared L. Ficklin, Austin, TX (US); Mark E. Rolston, Austin, CA (US); Matthew J. Santone, Austin, TX (US); Peter Petras, San Francisco, CA (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

(21) Appl. No.: 15/157,829

(22) Filed: May 18, 2016

(65) Prior Publication Data

US 2016/0283088 A1  Sep. 29, 2016

Related U.S. Application Data

(63) Continuation-in-part of application No. 14/669,395, filed on Mar. 26, 2015, and a continuation-in-part of
(Continued)

(51) Int. Cl.
*G06F 17/00* (2006.01)
*G06Q 10/10* (2012.01)
(Continued)

(52) U.S. Cl.
CPC ......... *G06Q 10/101* (2013.01); *G06F 3/0483* (2013.01); *G06F 3/0485* (2013.01);
(Continued)

(58) Field of Classification Search
CPC ........... G06F 17/3089; G06F 17/30893; G06F 17/04817
See application file for complete search history.

(56) References Cited

U.S. PATENT DOCUMENTS 5,228,123 A   7/1993  Heckel
5,659,793 A   8/1997  Escobar et al.
(Continued)

FOREIGN PATENT DOCUMENTS

WO   WO2014/115147   7/2014

OTHER PUBLICATIONS

Greenberg et al., U.S. Appl. No. 15/257,679, filed Sep. 6, 2016.
(Continued)

*Primary Examiner* — Mohammed-Ibrahim Zuberi
(74) *Attorney, Agent, or Firm* — Beyer Law Group LLP

(57) ABSTRACT

A mobile-first authoring tool for the authoring of a wrap package of cards on a mobile device by creating a plurality of cards for the wrap package using a number of media capture modes, selectively customizing the cards using a plurality of customization tools, defining one or more sequence order(s) for navigating the cards when the wrap is consumed and generating a wrap descriptor for the wrap package. The wrap descriptor specifies the cards of the wrap package and includes a plurality of cards descriptors, each card descriptor specifying content, a structure and a layout of an associated card respectively.

29 Claims, 36 Drawing Sheets

Related U.S. Application Data application No. 14/878,148, filed on Oct. 8, 2015, and a continuation-in-part of application No. 14/993,829, filed on Jan. 12, 2016, now Pat. No. 9,465,788.

(60) Provisional application No. 62/211,310, filed on Aug. 28, 2015, provisional application No. 62/248,644, filed on Oct. 30, 2015, provisional application No. 62/298,723, filed on Feb. 23, 2016, provisional application No. 62/210,585, filed on Aug. 27, 2015, provisional application No. 62/325,373, filed on Apr. 20, 2016.

(51) Int. Cl.
| | | |
|---|---|---|
| *G06F 17/22* | (2006.01) | |
| *G06F 17/30* | (2006.01) | |
| *G06F 3/0483* | (2013.01) | |
| *G06F 3/0485* | (2013.01) | |
| *G06T 11/60* | (2006.01) | |
| *G06F 3/0481* | (2013.01) | |

(52) U.S. Cl.
CPC ...... *G06F 3/04817* (2013.01); *G06F 17/2247* (2013.01); *G06F 17/3089* (2013.01); *G06F 17/30893* (2013.01); *G06F 17/30905* (2013.01); *G06T 11/60* (2013.01)

(56) References Cited

U.S. PATENT DOCUMENTS

| | | |
|---|---|---|
| 5,880,740 A | 3/1999 | Halliday et al. |
| 6,021,417 A | 2/2000 | Massarksy |
| 6,157,935 A | 12/2000 | Tran et al. |
| 6,216,112 B1 | 4/2001 | Fuller et al. |
| 6,321,244 B1 | 11/2001 | Liu et al. |
| 6,507,865 B1 | 1/2003 | Hanson et al. |
| 6,553,403 B1 | 4/2003 | Jarriel et al. |
| 6,738,079 B1 | 5/2004 | Kellerman et al. |
| 7,030,872 B2 | 4/2006 | Tazaki |
| 7,941,739 B1 | 5/2011 | Mohammed et al. |
| 8,255,293 B1 | 8/2012 | Davies |
| 8,291,312 B1 | 10/2012 | Zhou |
| 8,341,525 B1 | 12/2012 | Achour et al. |
| 8,402,356 B2 | 3/2013 | Martinez et al. |
| 8,412,675 B2 | 4/2013 | Alvarado et al. |
| 8,468,126 B2 | 6/2013 | van Gent et al. |
| 8,762,885 B2 | 6/2014 | Hwang et al. |
| 8,812,528 B1 | 8/2014 | Pedregal et al. |
| 8,825,083 B1 | 9/2014 | Pedregal et al. |
| 8,832,062 B1 | 9/2014 | Pedregal et al. |
| 8,832,127 B1 | 9/2014 | Pedregal et al. |
| 8,832,191 B1 | 9/2014 | LeBeau et al. |
| 8,903,852 B1 | 12/2014 | Pedregal et al. |
| 8,949,250 B1 * | 2/2015 | Garg ............... G06F 17/3053 707/748 |
| 8,990,672 B1 | 3/2015 | Grosz et al. |
| 9,110,903 B2 | 8/2015 | Martinez et al. |
| 9,213,365 B2 | 12/2015 | Sirpal et al. |
| 9,275,403 B2 | 3/2016 | Pedregal et al. |
| 9,285,977 B1 | 3/2016 | Greenberg et al. |
| 9,304,666 B2 | 4/2016 | Kapahi |
| 9,330,192 B1 | 5/2016 | Greenberg et al. |
| 9,418,056 B2 | 8/2016 | Greenberg et al. |
| 9,448,988 B2 | 9/2016 | Greenberg et al. |
| 2001/0034746 A1 | 10/2001 | Tsakiris et al. |
| 2002/0047856 A1 | 4/2002 | Baker |
| 2003/0009694 A1 | 1/2003 | Wenocur et al. |
| 2003/0041110 A1 | 2/2003 | Wenocur et al. |
| 2003/0093572 A1 | 5/2003 | Laux et al. |
| 2003/0101092 A1 | 5/2003 | Fuller et al. |
| 2003/0169282 A1 | 9/2003 | Herigstad et al. |
| 2003/0191816 A1 | 10/2003 | Landress et al. |
| 2004/0111673 A1 | 6/2004 | Bowman et al. |
| 2004/0177327 A1 | 9/2004 | Kieffer |
| 2004/0226048 A1 | 11/2004 | Alpert et al. |
| 2005/0022116 A1 | 1/2005 | Bowman et al. |
| 2005/0027820 A1 | 2/2005 | O'Laughlen et al. |
| 2005/0066279 A1 | 3/2005 | LeBarton et al. |
| 2005/0071783 A1 | 3/2005 | Atkins |
| 2005/0210416 A1 | 9/2005 | MacLaurin et al. |
| 2005/0245241 A1 | 11/2005 | Durand et al. |
| 2006/0048076 A1 | 3/2006 | Vronay et al. |
| 2006/0156219 A1 | 7/2006 | Haot et al. |
| 2006/0230337 A1 | 10/2006 | Lamont et al. |
| 2006/0259462 A1 | 11/2006 | Timmons et al. |
| 2007/0028166 A1 | 2/2007 | Hundhausen et al. |
| 2007/0118801 A1 | 5/2007 | Harshbarger et al. |
| 2007/0208704 A1 | 9/2007 | Ives |
| 2007/0232399 A1 | 10/2007 | Kathman et al. |
| 2008/0040322 A1 | 2/2008 | Rucker et al. |
| 2008/0077852 A1 | 3/2008 | Fleishman et al. |
| 2008/0165081 A1 | 7/2008 | Lawther et al. |
| 2008/0215964 A1 | 9/2008 | Abrams et al. |
| 2009/0119615 A1 | 5/2009 | Huang |
| 2009/0158182 A1 | 6/2009 | McCurdy et al. |
| 2009/0192928 A1 | 7/2009 | Abifaker |
| 2009/0300511 A1 | 12/2009 | Behar et al. |
| 2010/0070876 A1 | 3/2010 | Jain et al. |
| 2010/0269037 A1 | 10/2010 | Atkins |
| 2011/0060993 A1 | 3/2011 | Cotter et al. |
| 2011/0113124 A1 | 5/2011 | Zhang |
| 2011/0214015 A1 | 9/2011 | Li et al. |
| 2011/0214075 A1 | 9/2011 | Vongphouthone et al. |
| 2012/0011430 A1 | 1/2012 | Parker et al. |
| 2012/0054589 A1 | 3/2012 | Berger et al. |
| 2012/0054596 A1 | 3/2012 | Kroger et al. |
| 2012/0096357 A1 | 4/2012 | Folgner et al. |
| 2012/0131427 A1 | 5/2012 | Artin |
| 2012/0150605 A1 | 6/2012 | Isaacson et al. |
| 2012/0150729 A1 | 6/2012 | Isaacson et al. |
| 2012/0150730 A1 | 6/2012 | Isaacson et al. |
| 2012/0150731 A1 | 6/2012 | Isaacson et al. |
| 2012/0150732 A1 | 6/2012 | Isaacson et al. |
| 2012/0150743 A1 | 6/2012 | Isaacson et al. |
| 2012/0209902 A1 | 8/2012 | Outerbridge |
| 2012/0210200 A1 | 8/2012 | Berger et al. |
| 2012/0236201 A1 | 9/2012 | Larsen et al. |
| 2012/0278704 A1 | 11/2012 | Ying et al. |
| 2012/0313876 A1 | 12/2012 | Smith |
| 2013/0007603 A1 | 1/2013 | Dougherty |
| 2013/0021377 A1 | 1/2013 | Doll |
| 2013/0024757 A1 | 1/2013 | Doll et al. |
| 2013/0061160 A1 | 3/2013 | Tseng |
| 2013/0073387 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0097186 A1 | 4/2013 | Van Hoff |
| 2013/0099447 A1 | 4/2013 | Patton |
| 2013/0111395 A1 | 5/2013 | Ying et al. |
| 2013/0144707 A1 | 6/2013 | Isaacson et al. |
| 2013/0151959 A1 | 6/2013 | Flynn, III et al. |
| 2013/0166445 A1 | 6/2013 | Isaacson et al. |
| 2013/0179761 A1 | 7/2013 | Cho et al. |
| 2013/0219255 A1 | 8/2013 | Van Hoff et al. |
| 2013/0223819 A1 | 8/2013 | Sims et al. |
| 2013/0246261 A1 | 9/2013 | Purves et al. |
| 2013/0254063 A1 | 9/2013 | Stone et al. |
| 2013/0254705 A1 | 9/2013 | Mooring et al. |
| 2013/0263050 A1 | 10/2013 | Audet |
| 2013/0268372 A1 | 10/2013 | Jalili |
| 2013/0282605 A1 | 10/2013 | Noelting |
| 2013/0283194 A1 | 10/2013 | Kopp |
| 2013/0290887 A1 | 10/2013 | Sun et al. |
| 2013/0305218 A1 | 11/2013 | Hirsch et al. |
| 2013/0311870 A1 | 11/2013 | Worsley et al. |
| 2013/0316773 A1 | 11/2013 | Boyd |
| 2013/0319209 A1 | 12/2013 | Good et al. |
| 2013/0325671 A1 | 12/2013 | Glass et al. |
| 2013/0339830 A1 | 12/2013 | Yuan et al. |
| 2013/0346302 A1 | 12/2013 | Purves et al. |
| 2014/0032525 A1 | 1/2014 | Merriman et al. |

(56) References Cited

U.S. PATENT DOCUMENTS

| | | |
|---|---|---|
| 2014/0033047 A1 | 1/2014 | Poling et al. |
| 2014/0047413 A1 | 2/2014 | Sheive et al. |
| 2014/0068665 A1 | 3/2014 | Evans et al. |
| 2014/0074624 A1 | 3/2014 | Ying et al. |
| 2014/0074863 A1 | 3/2014 | Walkingshaw et al. |
| 2014/0074934 A1 | 3/2014 | Van Hoff et al. |
| 2014/0075275 A1 | 3/2014 | Aleksandrovsky et al. |
| 2014/0075289 A1 | 3/2014 | Brant |
| 2014/0075339 A1 | 3/2014 | Weskamp et al. |
| 2014/0087780 A1 | 3/2014 | Abhyanker et al. |
| 2014/0089789 A1 | 3/2014 | Schowtka et al. |
| 2014/0089804 A1 | 3/2014 | Gazit et al. |
| 2014/0096014 A1 | 4/2014 | Johnson et al. |
| 2014/0101539 A1 | 4/2014 | Ma et al. |
| 2014/0109046 A1 | 4/2014 | Hirsch et al. |
| 2014/0114866 A1 | 4/2014 | Abhyanker |
| 2014/0129942 A1 | 5/2014 | Rathod |
| 2014/0152591 A1 | 6/2014 | Odakura |
| 2014/0164507 A1 | 6/2014 | Tesch et al. |
| 2014/0165091 A1 | 6/2014 | Abhyanker |
| 2014/0173417 A1 | 6/2014 | He |
| 2014/0198127 A1 | 7/2014 | Ying |
| 2014/0210843 A1 | 7/2014 | VanCuren, Jr. et al. |
| 2014/0245128 A9 | 8/2014 | Brant |
| 2014/0245369 A1 | 8/2014 | Green et al. |
| 2014/0250001 A1 | 9/2014 | Isaacson et al. |
| 2014/0250002 A1 | 9/2014 | Isaacson et al. |
| 2014/0280852 A1 | 9/2014 | Griffiths et al. |
| 2014/0287779 A1 | 9/2014 | O'Keefe et al. |
| 2014/0320535 A1 | 10/2014 | Ying |
| 2014/0344294 A1 | 11/2014 | Skeen et al. |
| 2014/0344765 A1 | 11/2014 | Hicks et al. |
| 2014/0351268 A1 | 11/2014 | Weskamp et al. |
| 2015/0020170 A1 | 1/2015 | Talley |
| 2015/0033102 A1 | 1/2015 | Losvik et al. |
| 2015/0058709 A1 | 2/2015 | Zaletel |
| 2015/0066743 A1 | 3/2015 | Gerard et al. |
| 2015/0072330 A1 | 3/2015 | Rosenberg |
| 2015/0088655 A1 | 3/2015 | Taylor |
| 2015/0100587 A1 | 4/2015 | Walkingshaw et al. |
| 2015/0106225 A1 | 4/2015 | Glass et al. |
| 2015/0106368 A1 | 4/2015 | Sohn et al. |
| 2015/0120767 A1 | 4/2015 | Skeen et al. |
| 2015/0131973 A1 | 5/2015 | Rav-acha et al. |
| 2015/0134687 A1 | 5/2015 | Sohn et al. |
| 2015/0149353 A1 | 5/2015 | Linden et al. |
| 2015/0172778 A1 | 6/2015 | Soon-Shiong |
| 2015/0193857 A1 | 7/2015 | Reed et al. |
| 2015/0213001 A1 | 7/2015 | Levy et al. |
| 2015/0262036 A1 | 9/2015 | Song et al. |
| 2015/0296033 A1 | 10/2015 | Jung et al. |
| 2015/0331675 A1 | 11/2015 | De Magalhaes |
| 2015/0356649 A1 | 12/2015 | Glass et al. |
| 2016/0034437 A1* | 2/2016 | Yong .................. G06Q 30/0241 715/202 |
| 2016/0062955 A1 | 3/2016 | Maertens et al. |
| 2016/0063486 A1 | 3/2016 | Purves et al. |
| 2016/0063580 A1 | 3/2016 | Greenberg et al. |
| 2016/0086218 A1 | 3/2016 | Li |
| 2016/0103565 A1 | 4/2016 | Greenberg et al. |
| 2016/0103791 A1 | 4/2016 | Greenberg et al. |
| 2016/0103794 A1 | 4/2016 | Greenberg et al. |
| 2016/0103795 A1 | 4/2016 | Greenberg et al. |
| 2016/0103797 A1 | 4/2016 | Greenberg et al. |
| 2016/0103805 A1 | 4/2016 | Greenberg et al. |
| 2016/0103820 A1 | 4/2016 | Greenberg et al. |
| 2016/0103821 A1 | 4/2016 | Greenberg et al. |
| 2016/0103926 A1 | 4/2016 | Greenberg et al. |
| 2016/0104210 A1 | 4/2016 | Greenberg et al. |
| 2016/0124913 A1 | 5/2016 | McFarland et al. |
| 2016/0124934 A1 | 5/2016 | Greenberg et al. |
| 2016/0162462 A1 | 6/2016 | Greenberg et al. |
| 2016/0196244 A1 | 7/2016 | Greenberg et al. |

OTHER PUBLICATIONS

Greenberg et al., U.S. Appl. No. 15/242,295, filed Aug. 19, 2016.

Wikipedia, http://web.archive.org/web/20040309172512/http://en.wikipedia.org/wiki/HyperCard, from Wayback Machine indicating Wayback retrieval date of Mar. 9, 2004, downloaded from the internet on Jun. 21, 2016.

International Search Report dated Feb. 2, 2016 from International Application No. PCT/US2015/54599.

Written Opinion dated Feb. 2, 2016 from International Application No. PCT/US2015/54599.

Stackoverflow, Aug. 15, 2009.

Web Monkey Internet Publication, Feb. 15, 2010.

MSDN, Introduction to DHTML Behaviors, [retrieved on Apr. 4, 2016].Retrieved from the internet: https://msdn.microsoft.com/en-us/library/ms531079(v=vs.85).aspx .Jun. 12, 2014. (Intro_to_DHTML_Behaviors).

Siegman et al., "Epub Zero, A Collection of Interesting Ideas", https://dauwhe.github.io/epub-zero/#compare, Sep. 28, 2015.

Gylling et al., "EPUB 3 Fixed-Layout Documents", http://www.idpf.org/epub/fxl/#dimensions, International Digital Publishing Forum, 2012.

Adobe InDesign CC, "How to Design Fixed Layout EPUB", https://web.archive.org/web/20140626152711/https://helpx.adobe.com/indesign/how-to/ebook-fixed-layout.html, from Wayback Machine indicating Wayback retrieval date of Jun. 26, 2014, downloaded on Sep. 13, 2016.

Gardeur et al., "Collection + JSON vs collection in EPUB", https://groups.google.com/forum/#!topic/epub-working-group/2aK4-jezWNE, Apr. 18, 2016.

Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.

Paul Adams, "The End of Apps as We Know Them", https://blog.intercom.io/the-end-of-apps-as-we-know-them/, published around Nov. 2014, downloaded on May 22, 2015.

Paul Adams, "Why Cards are the Future of the Web", https://blog.intercom.io/why-cards-are-the-future-of-the-web/, published around Sep. 2013, downloaded on May 22, 2015.

Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.

Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.

Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.

Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.

Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).

Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).

Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).

Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).

(56) References Cited

OTHER PUBLICATIONS

Max Bulger, "Why Cards?", http://blog.trywildcard.com/post/93983166893/why-cards, published on Aug. 6, 2014, downloaded on May 26, 2015.
Streamwize, http://www.streamwize.com, downloaded on May 22, 2015. (Streamwise).
Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).
Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).
Wildcard, https://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).
Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).
Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).
Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Tutorials_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).
Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).
Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).
Wildcard, http://www.trywildcard.com/docs/faq#shopify, not available on Wayback Machine, downloaded on Jun. 5, 2015. (WC_FAQ_V2).
Jacqueline Thomas, A Serious Look at Card Based Design, [retrieved on Nov. 17, 2015].Retrieved from the internet: http://webdesignledger.com/card-based-design.Jun. 12, 2014.
International Search Report dated Dec. 18, 2015 from International Application No. PCT/US15/50478.
Written Opinion dated Dec. 18, 2015 from International Application No. PCT/US15/50478.
Hypercard.org, http://web.archive.org/web/20121114055910/http://hypercard.org/hypercard_file_format.php, from Wayback Machine indicating Wayback retrieval date of Nov. 14, 2012, downloaded on Jun. 13, 2016.
Vito Tardia, "Building ePub with PHP and Markdown", https://www.sitepoint.com/building-epub-with-php-and-markdown/, Mar. 1, 2013.
Friendly Bit, "Rendering a Web Page—Step by Step", published on Jan. 11, 2010.
Hegaret et al., "What is the Document Object Model", published on Nov. 7, 2003.
GitHub, "Reading & Writing JSON", published on Oct. 6, 2013.

* cited by examiner

CUSTOMIZATION TOOLS

Text
- Create text box component
- Type Text

Image
- Create image components

Scribble/Draw
- Glyphs
- Notes
- Scribbles

Sound
- Record
- Annote
- Playback

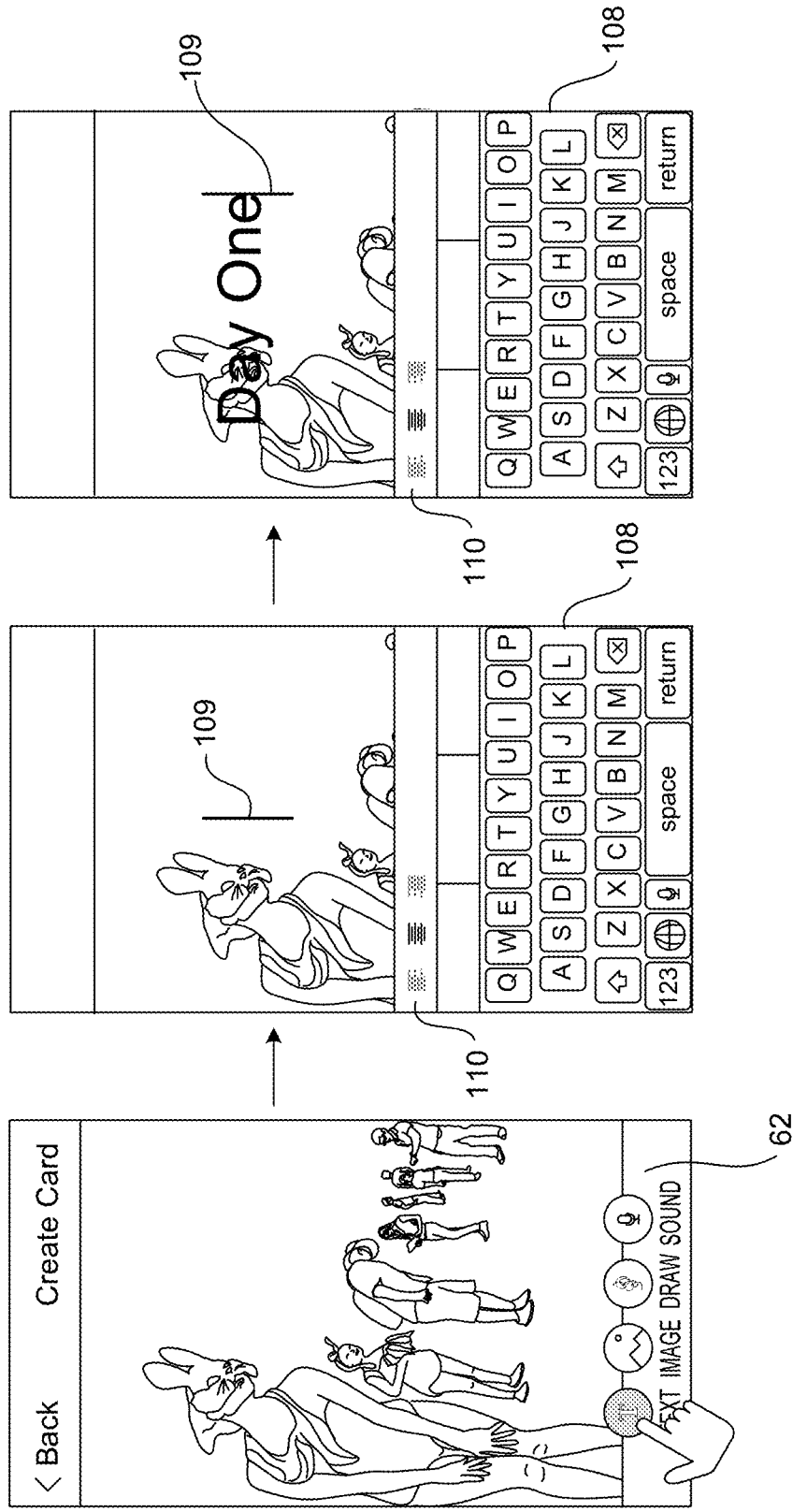

PROPERTIES AND PERMISSIONS

| WRAP PACKAGE | SHARE | EDIT | MIX | PUBLIC/PRIVATE |
|---|---|---|---|---|
| Name | Yes ☐ No ☐ | Yes ☐ No ☐ | Yes ☐ No ☐ | Yes ☐ No ☐ |
| | SHARE | EDIT | DELETE | Public/Private |
| CARD 1 | Yes ☐ No ☐ | Yes ☐ No ☐ | Yes ☐ No ☐ | Yes ☐ No ☐ |
| CARD 2 | Yes ☐ No ☐ | Yes ☐ No ☐ | Yes ☐ No ☐ | Yes ☐ No ☐ |
| CARD 3 | Yes ☐ No ☐ | Yes ☐ No ☐ | Yes ☐ No ☐ | Yes ☐ No ☐ |
| ••• | | | | |
| CARD N | Yes ☐ No ☐ | Yes ☐ No ☐ | Yes ☐ No ☐ | Yes ☐ No ☐ |
| ADD TAG: | | | | |

FIG. 19

MOBILE-FIRST AUTHORING TOOL FOR THE AUTHORING OF WRAP PACKAGES

CROSS REFERENCE TO RELATED APPLICATIONS

This application claims priority to U.S. Provisional Application No. 62/211,310, filed Aug. 28, 2015; 62/248,644, filed on Oct. 30, 2015; 62/298,723, filed on Feb. 23, 2016; 62/210,585, filed on Aug. 27, 2015, and 62/325,373, filed on Apr. 20, 2016.

This application is a Continuation in Part of U.S. application Ser. No. 14/669,395, filed on Mar. 26, 2015; Ser. No. 14/878,148, filed Oct. 8, 2015 and Ser. No. 14/993,829, filed on Jan. 12, 2016.

All of the above-referenced patent applications are incorporated herein by reference in their entirety, including any appendices

BACKGROUND

This invention relates to delivering content over networks in the form of wrap packages of cards, and more particularly, to a mobile-first authoring tool for the authoring of wrap packages on mobile devices, such as cellular phones, tablets and the like.

Media content developers have a variety of authoring tools, document formats and content delivery schemes that can be used to create and present media content to users over networks, such as the Internet. The content may be presented to users through a variety of mechanisms, including via web-sites, through the use of a mobile application (i.e., an "app") and downloadable documents such as PDF files. Each of these delivery mechanisms, however, has limitations, particularly within a mobile computing environment.

PDF files, while relatively simple to author, have a number of limitations. The content of PDF files is static. Once created and delivered to a user over a network, there is no way for the viewer to interact, through the PDF file, with the distributor. For example, retailers commonly create PDF versions of product catalogs, which are distributed via a web page or email. When the PDF file is opened, the document is limited to only viewing. The viewer is unable to interact through the PDF file with the retailer, for instance, to ask questions about a particular item or to make a purchase. Also since PDFs are not dynamic documents, they need to be delivered to a consuming device as a single binary block. As a result, PDFs, especially if they are graphic intensive, are typically large files, which may be difficult to distribute, especially over wireless networks to mobile devices. Furthermore, most PDF files are created for viewing on desktop computers, which have relatively large display screens. As a result, the viewing of these PDF files on a mobile device, such as a mobile phone with a relatively small viewing screen, often provides a poor user experience.

There are a number of advantages and disadvantages of using web sites for presenting media content to users. Web sites are typically "destinations", meaning a potential viewer is usually required to navigate to the web site to consume its content and functionality. Web sites are thus generally not considered as portable objects that can be readily delivered to consumers and other viewers, similar to messages. In addition, web sites are typically optimized for desktop computing, providing a rich opportunity for user interaction. With mobile devices, however, particularly mobile phones or wearable computing devices such as smart watches, small display screens and limited input/output capabilities, often results in a poor user experience. When viewing a web site through a screen on a mobile phone for example, it is often very difficult to read text and view images. It is also very difficult to input data and navigate from one web page to another. As a result, the user experience of accessing and viewing web sites on mobile computing devices is often frustrating, resulting in a poor user experience. In addition, the authoring of highly interactive, content-driven, web sites designed to create a positive user experience often requires a high degree of software expertise and sophistication. As a result, the creation of web sites designed for Internet commerce, for instance, is often very expensive and beyond the financial means of many small businesses and organizations.

More recently with the proliferation of "smart" mobile phonies and tablets, mobile applications (often referred to as "apps") have become exceedingly popular. Mobile apps are typically "stand alone" or monolithic software programs, designed to perform a specific task or function, and intended to run on smart phones, tablet computers and other mobile devices. An extremely wide variety of apps are now commonplace, such as productively tools like email, calendars, etc., gaming, GPS services such as Google Maps, text and/or voice messaging, live communication such as Skype, online banking, etc., to name just a few. With their growing popularity, to a significant degree, apps have replaced web sites as the preferred method for content providers to create and distribute media content to mobile computing device users.

Apps also have many advantages and disadvantages. On the positive side, apps often provide content-rich, rewarding, user experiences, particularly on mobile devices. A well-designed app allows users to sequence through a number of views, presenting content to users in an orderly fashion. On the negative side, apps are typically "stand alone" software applications that do not easily interact with other software applications. As result, the functionality of apps is often limited, typically only capable of performing the specific task(s) that they were designed to perform, and working only with the specific endpoints contemplated at the time they were developed. As a result, it is often difficult, although not impossible, to create the necessary integration functionality for a user to purchase a product and/or service through the app. Also, the design and authoring of apps is typically very complex and requires a very high level of design engineering expertise to create apps that are professional-looking and appealing. In addition, apps typically are not cross-platform. App developers usually have to create and distribute multiple versions of the same app for the iOS/Apple, Android/Google and the Microsoft platforms for example. As a result, the development and maintenance costs associated with creating and distributing an app is complex and very expensive. Finally, apps typically have to be distributed through an application aggregator, such as the Apple App Store or Google Play. Apps, therefore, typically cannot be directly downloaded from the author/creator to users or consumers.

A system and method for more effectively distributing media content, application functionality and e-commerce related services is therefore needed.

SUMMARY

Systems and methods for creating and delivering wrapped packages of cards are disclosed. With wrap packages, each card is selectively authored to include content such as (i) multi-media, (ii) application functionality and/or (iii) e-commerce related services. In addition, the cards are authored into one or more linear sequences. In optional embodiments, the content can further be authored to convey a "narrative" or "story" that unfolds as the cards are sequentially browsed in their linear order(s), similar to the turning of the pages of a book or magazine. Thus, when the wrap is consumed, the viewer experience is enhanced and is more engaging compared to other types of content delivery methods, such as web sites, PDFs, or applications, particularly on mobile devices. As a result, it is more likely that viewers will consume the media and partake in the functionality and/or services delivered through a wrap compared to the above-listed prior art content delivery types.

In addition, wrap packages are highly portable objects that can be distributed similar to electronic messages, posts in social media feeds, or banner ads appearing in web sites. With these attributes, it is easy to widely circulate wraps, particularly to mobile phones. By widely disseminating wrap packages to mobile phones, content publishers, marketing firms, e-retailers, service providers, consumers and individuals alike can readily create and deliver compelling narratives—precisely where it matters the most—where many people now spend much of their time and consciousness. Wraps thus have the unique ability to transform the mobile phone into a powerful business and social media tool by intimately contacting consumers and individuals at their point of immediacy.

The present application is preferably, although not necessarily, a mobile-first authoring tool that enables the creation of wrap packages on mobile devices. The authoring tool, since developed for mobile, leverages many of the hardware features and user interfaces commonly found and used on mobile phones and tablets. For example, still and/or video cameras, microphones, speakers, etc., are all used for creating and previewing the media of cards of a wrap as it is authored. The authoring tool also takes advantage of touch-sensitive displays, allowing authors to manipulate and customize the media content of cards using common screen-inputs, such tapping, scrolling, dragging, dropping, swiping, etc.

In a non-exclusive embodiment, the mobile-first authoring tool of the present invention is used for the authoring of a wrap package of cards on a mobile device by (a) activating a camera on the mobile device when an authoring session begins, (b) creating a first card using visual media captured by the activated camera, (c) creating additional cards for the wrap package using any of a plurality of provided media capture modes, (d) selectively customizing the first and/or the additional cards using a plurality of customization tools, (e) defining one or more sequence order(s) for navigating the cards of the wrap when consumed and (f) generating a wrap descriptor for the wrap package, the wrap descriptor specifying the cards of the wrap package and including a plurality of cards descriptors, each card descriptor specifying content, a structure and a layout of an associated card respectively.

In a non-exclusive embodiment, the media capture modes may specifically include camera, device, positional/GPS, link, light, and/or mixing modes. In other embodiments, other media capturing modes may be used.

In another non-exclusive embodiment, the customization tools may include text, image, scribble/draw and sound tools for adding and/or manipulating text, image, drawing and sound media included in or associated with the cards of the wrap respectively. In other embodiments, other customization tools may also be used.

In yet other non-exclusive embodiments, a collaborative tool to allow others to selectively author the wrap and a mixing permission tool selectively allowing card(s) of the wrap to be mixed into other wraps are also provided.

Up until now, wrap packages have largely been used by businesses. With the mobile authoring tool of the present application, however, now consumers and individuals alike can easily author wrap packages on their mobile phones and tablets. Individuals can use the camera, video, microphone, their image gallery, URLs or links, and other media capabilities on their mobile devices to capture moments as they happen and to create wraps, either "on the fly", or at later time at their leisure. In addition, with attributes that allow collaborative authoring, card mixing and the ability to easily distribute wraps via messages, such as email or texts, or posting in social media feeds, wraps created on mobile devices have the potential to become widely popular, possibly ushering in a new, social media, phenomena.

While the above-described embodiments have been described as a mobile-first authoring tool, it should be understood that mobile-first should in no way be construed as limiting. On the contrary, the authoring tool as described herein may be used on any type of computing device, including both mobile and non-mobile devices (i.e., a desktop computer or workstation). In addition, a camera-first default mode for the creation of a first card of an authoring session is also not a requirement. On the contrary, any capture mode can be set as a default mode when a session begins, or alternatively, the author may entirely select the mode for the creation of a first card, meaning there is no default mode when an authoring session begins.

BRIEF DESCRIPTION OF THE DRAWINGS

The invention and the advantages thereof, may best be understood by reference to the following description taken in conjunction with the accompanying drawings in which:

FIG. 11A through FIG. 11E illustrate various tools for customizing text components in accordance with non-exclusive embodiments of the authoring tool.

FIG. 19 illustrates a mixing tool for setting permissions for others to mix one or more cards of a wrap package into other wrap packages accordance with a non-exclusive embodiment of the invention.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
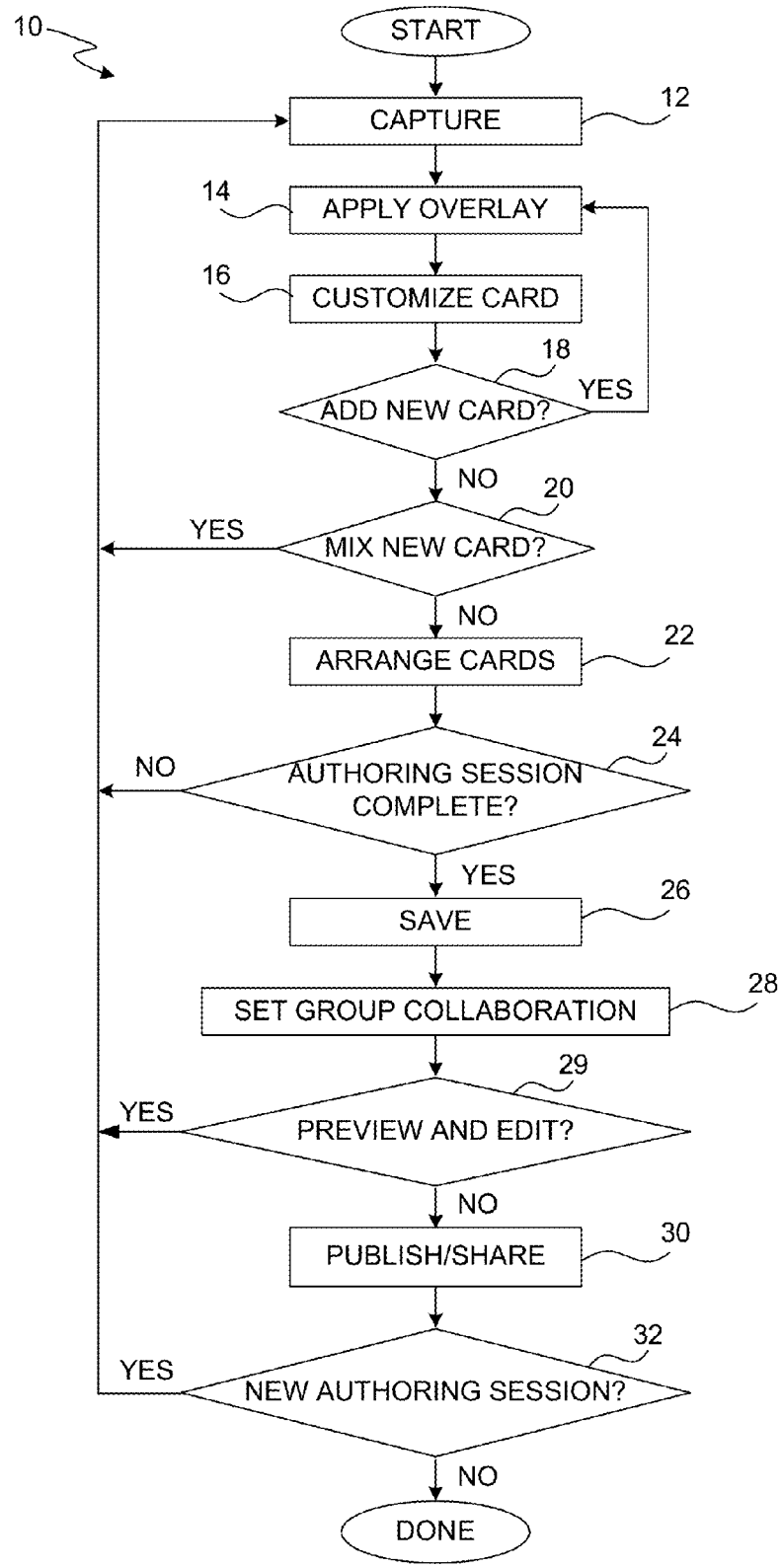
FIG. 1 is a diagram illustrating a non-exclusive sequence for authoring wrap packages of cards using an authoring tool of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The present disclosure is directed to the mechanisms that support the distribution of media content, and a corresponding palette of application functionality and/or e-commerce related services, in the form of wrapped packages of cards (interchangeably referred to herein as a "wrap", "package" or "wrap package").

A wrap package, which includes a set of cards arranged in one or more predefined sequences, is a unique delivery mechanism for the distribution of authored content and functionality. Wraps are typically characterized by the following:

(a) Each card is selectively authored to include media, such as text, photos, images, video, documents, etc. Since the cards are arranged in their one or more sequences, the media can be authored to convey a "story telling" narrative that unfolds as the cards are sequentially browsed;

(b) The cards of wraps can also be selectively authored to include web or application like functionality;

(c) The layout of the content of any particular card is generally immutable. That is, the positional relationship between the displayed components of any given card typically remains the same, regardless of the size, width, height, or type of display on which the wrap is rendered;

(d) The cards of a wrap all have a defined presentational aspect ratio (typically, but not necessarily, a portrait view);

(e) Wraps are designed for, although not necessarily limited to, mobile. On mobile devices having touch sensitive screens, the cards of wraps are navigated by swipe-browsing. Wraps thus mimic the way people already use their smartphones and other mobile devices such as tablets. Every swipe reveals a new card with a "bite-size" message and/or content.

As the cards are sequentially swiped during consumption, the story-telling narrative of the wrap unfolds. In addition, the user experience in viewing a given wrap is almost always the same, regardless of the type of viewing device, since each card is immutable and maintains the defined aspect at runtime.

An advantage of wraps is that they do not require a dedicated infrastructure for distribution and viewing. By using wrap identifiers, such as URLs, wraps can be distributed to a specific individual or widely to many either by including the wrap identifiers in messages (e.g., emails, texts, etc.), by posting in social media feeds (e.g., Facebook, Twitter, etc.), and/or embedding in online advertisements, etc. The ability to easily share and distribute wraps over already pervasive communication channels is likely to increase the possibility of (i) wraps in general becoming ubiquitous in the mobile economy and (ii) individual wraps going "viral".

Consumers and individuals now spend vast amounts of their time and consciousness on their mobile phones and tablets. As a result, the ability to easily distribute wraps to mobile devices helps brands intimately deliver elegant, user experiences, precisely where it matters the most. Wraps thus have the ability to transform mobile devices into powerful business and/or social media tools. By delivering wraps to mobile devices, it helps brands sell more and build recognition, relationships and loyalty among customers.

In most situations, all that is needed to view a wrap is a browser. When a wrap is requested for viewing, a runtime viewer is provided along with a wrap descriptor. On the consuming device, the runtime viewer is arranged to deserialize the cards of the wrap descriptor and to generate a runtime instance of the wrap. In other situations, the runtime viewer may already be included in a native application residing on the consuming device.

Wraps are thus a groundbreaking, mobile-first, storytelling and e-commerce platform. By making it simple, inexpensive, and easy to (i) author narrative wraps with interactive functionality and (ii) to distribute wraps like messages, wraps have the unique ability to:

(a) "democratize" the mobile web by providing a powerful, low barrier, low cost alternative to apps and web sites;

(b) unlock the vast story-telling potential of the Internet, and (c) drive e-commerce by building customer relationships and increasing web conversion rates via the interactive functionality provided in wraps.

Wraps thus solve many of the problems and limitations associated with the existing methods for distributing content and conducting e-commerce, such as PDF files, web sites, dedicated apps, and the like. With all these benefits, wraps have the potential of becoming ubiquitous, ushering in a new paradigm referred to herein as the "Narrative Web".

Desktop Authoring Tools

In commonly assigned U.S. application Ser. No. 14/740,539 filed Jun. 16, 2015 and PCT Application PCT/US15/050478 filed Sep. 16, 2015, both entitled "Authoring Tool for the Authoring of Wrap Packages of Cards, an authoring tool for the authoring of wrap a packages mainly in a non-mobile environment is described, for example, using personal computers, workstations and laptops, and other non-mobile computing devices. The authoring process generally involves the selection of a card template, creating a card by duplicating the card template, and then editing the card to include desired content, functionality and/or services. As the cards are authored, they are placed in one or more linear sequences, which defines the sequential order in which the cards are rendered in response to navigational inputs when the wrap is consumed. As previously noted, wraps can be authored to include a wide variety of (i) media, (ii) application functionality and/or (iii) e-commerce related services. For more detail on the authoring tool, see the two above-identified authoring tool applications, both incorporated by reference herein for all purposes.

Up to now, wraps have been created, using the above-mentioned desktop authoring tool, mostly used by the business community. The authoring tool has allowed online retailers and others to promote and deliver their brand, products and/or interactive services, through the web, at minimal cost and ease previously not possible. Previously, developing apps or web sites typically required a high degree of software sophistication, significant cost, and took months or weeks to create. Now with wraps, businesses and other content providers can inexpensively create, with little software expertise, interactive wrap packages in hours or minutes.

Today, mobile phones and tablets are among the most prized possessions of many people. For those on the go, particularly among the young, many now constantly access and use their mobile devices all day long, engaging in social media, accessing web content, viewing videos, texting or emailing, play games, etc. To a large degree, mobile devices have now captured the time, attention and consciousness of many people. While the aforementioned authoring tool is ideal for authoring of wrap packages in a desktop environment, it is not ideal for the authoring of wrap packages on mobile devices.

Advantage of Mobile Authoring

The present application is directed to a mobile-first authoring tool that enables the creation of wrap packages on mobile devices, such a mobile phones and tablets. The authoring tool, since developed for mobile, leverages many of the features and user interfaces commonly found on mobile phones and tablets. The authoring tool, as described in detail below, takes advantage of touch-sensitive displays, allowing authors to create and cards and manipulate content using common screen-inputs, such tapping, scrolling, drag and dropping and swiping. The mobile authoring tool also leverages other media capturing and rendering hardware found on mobile devices, such as a still and/or video camera, microphones for audio recording, internal speakers and/or external speaker ports for use with headsets, earbuds, and the like.

Up until now, wrap packages have largely been used by businesses. With the mobile authoring tool of the present application, however, now consumers and individuals alike can easily author wrap packages on their mobile phones and tablets. Individuals can use the camera, video, microphone, their image gallery, URLs or links, and other media capabilities on their mobile devices to capture moments as they happen and to create wraps, either "on the fly", or at later time at their leisure. In addition, with attributes that allow collaborative authoring, card mixing and the ability to easily distribute wraps via messages, such as email or texts, or posting in social media feeds, wraps created on mobile devices have the potential to become widely popular, possibly ushering in a new, social media, phenomena.

Card Components

Prior to addressing the details of the mobile-first authoring tool, a brief discussion of cards is first provided. Each card in a wrap is typically authored to include one or more components. A component is essentially a container. For a given component, media and/or other functionality is either (a) inserted into or (b) associated with the component. Typically, although not necessarily, media content of a relatively small file size, such as text or an image, is inserted into a component. Alternatively, with content having a relatively large file size such as a YouTube video, the content is typically (although not necessarily) associated with the component using a link or other identifier. In this manner, the content can be retrieved using the link or identifier either when the wrap is served or at runtime of the wrap package.

Within the wrap authoring environment, there are a number of different component types, including but not limited to, text components, photo/image components, video components, drawing/paint components (referred to herein as "scribble"), audio components, and button components. A given card in a wrap may include one or more containers, each of any of the above-listed component types.

A component is defined by its "type", a specific content format, and certain applicable constraints. The content format(s) and constraint(s)/style(s) for various component types are summarized in the tables below:

A text component, typically having content format of ASCII characters, may have one or more of the following styles/constraints:

| Constraint(s)/Style(s) |
|---|
| Font type |
| Styles (bold, italic, underline, strike-through, highlight, superscript, subscript, etc. |
| Alignment |
| Color |
| Justification |

A photo/image component, which may have content formats including GIFs, JPEG, JPG, and/or may have one or more of the following styles/constraints:

| Constraint(s)/Style(s) |
| --- |
| Filter |
| Mask Radius |
| Mask Type (share, circle, complex, etc.) |
| Filter (black and white, colorized, sepia, etc.) |
| Image style (frame, drop shadow, Polaroid, etc.) |

A drawing/scribble component, which typically will have a vector content format, may have the following constraints/styles:

| Constraint(s)/Style(s) |
| --- |
| Brush size |
| Brush type (solid, dashed, artistic, etc.) |
| Color |

A button component, which may have various content formats such as ASCII, CSS, Image, etc., may have constraints/styles such as:

| Constraint(s)/Style(s) |
| --- |
| Button Shape |
| Border Radius |
| Color |
| Graphic representation of button |
| Button label font |
| Button label color |

An audio component, which may have various content formats such as MP3, FLAC, WAV., etc., may have constraints/styles such as:

| Constraint(s)/Style(s) |
| --- |
| Graphic Representation of Play Icon |
| DSP Filter |

Finally, a video component, which may have content formats such as MPEG, MOV, etc., may have constraints/styles such as:

| Constraint(s)/Style(s) |
| --- |
| Mask Radius |
| Filter |
| Graphic Representation of Play Icon |

The Mobile Authoring Tool

In a non-exclusive embodiment, the mobile authoring tool of the present application is an application or "app" developed for any number of different mobile operating systems commonly used by mobile devices, such as iOS by Apple or Android by Google. As such, the mobile authoring tool is intended to be distributed through Apple's App Store or the Google Play Market. It should be understood that the above-listed operating system platforms and distribution channels are merely exemplary and should in no way be construed as limiting. On the contrary, the mobile authoring tool of the present application may be distributed through any channel and/or developed for any operating system, mobile or otherwise, currently known or developed in the future.

Once the authoring tool is downloaded onto a mobile device, it will typically appear as an "app" icon on a display view of the device. By tapping or otherwise selecting the icon, the mobile authoring tool is launched, opens and appears on the display of the mobile device.

Referring to FIG. 1, a diagram 10 illustrating a non-exclusive sequence for the authoring of a wrap package using the mobile authoring tool is illustrated. Each of the authoring steps are briefly described immediately below. A more detailed explanation of each step, including examples, is provided with respect to the remaining figures.

In the initial step 12, the author selects a capture mode for capturing the media content of a card. The capture modes include, but are not limited to, the following:

(a) a camera mode for visual media captured by the camera on the mobile device;

(b) a device mode for media stored on or accessible by the mobile device;

(c) a "light mode" for adding "positive energy" to the wrap package in the form of a user-friendly image, an animated Graphics Interchange Format (GIF) or video clip;

(d) a location mode for GPS or positional media;

(e) a link mode for specifying a URL or other identifier used to identify and access remote media; and (f) a mixing mode for enabling the mixing of a select card from another wrap package into a wrap package authored using the authoring tool.

The above are just a few examples of how the media of a card can be captured. It should be understood that this list is not exhaustive and that any media capturing mode or method may be used.

In a non-exclusive embodiment, the camera mode is selected as a default capture mode. With this embodiment, the camera on the mobile device is automatically activated when a session for the authoring of a wrap package is initiated. With the camera activated, visual media content is automatically displayed on the screen of the mobile device for preview. When media content of interest appears in the screen, it can be captured using a media capturing input feature, such as a virtual camera shutter button, provided on the display. In response, the authoring tool creates a visual media card including the captured media content. For example, after the mobile authoring app is launched, the author may use their mobile device to pan a scene. When an image of interest appears, a photo of the previewed content can be "snapped", capturing the content. In response, the authoring tool creates a card with an image component including the snapped photo. In a variation of this embodiment, the author can record video and/or audio content using the video functionality on their mobile device. After the video clip is complete, a card with a video component is created including the recorded video clip.

In step 14, an overlay can optionally be applied to the media of the card captured in the previous step. As used herein, is an overlay is similar or analogous to a picture frame for portraying or framing the captured content within the card. In various non-exclusive embodiments, overlays may assume any number of shapes, including circular, round, oval, square, rectangular, or any other arbitrary shape. It should be understood that this list is non-exhaustive and that overlays of any shape may be used. In yet other embodiments, overlays can be further customized with various components, such as text components, image components, drawing components, etc. It should be noted overlays are sometimes referred to herein as "LiveStyles".

In step 16, the card can optionally be further customized by the author using a variety of customization tools. Such customization tools may include, but are not limited to, a text tool, an image tool, a drawing tool, and a sound tool for adding text, images/photos, drawings and/or sound to a given card. For example, the author may wish to include in a given card additional images, photos and/or video, a hand-generated drawing, notes and/or scribbles, sound, such as voice annotation or music, that will be played when the card is rendered.

When the author wishes to customize a given card, a customization tool is selected. In response, the customization tool creates for the card a component of the selected tool type. For example, if the text, image, drawing or sound tool is selected, then a text, image, drawing or sound component is created respectively. The media created or otherwise defined using the tool is then inserted into or otherwise associated with the component.

Once any customization of a given card is complete, the author may wish to add a new card to the wrap using a new card tool. When a new card is desired, as depicted by decision 18, the author enters a selection of one of the aforementioned plurality of different media capture modes as specified above with respect to step 12. In response, the authoring tool generates a new card including a component for media of the selected media capture mode type. Thereafter, a LiveStyle overlay and/or further customization of the new card as described with respect to steps 14 and 16 above may optionally be performed. By iterating these steps, any number of cards can be added to the wrap.

In decision 20, the author determines if an existing card from another wrap is to be mixed into the wrap that is being authored. The mixing process generally involves viewing the cards of existing wraps maintained in a library, selecting a card or multiple cards in existing wrap(s), and then inserting the card(s) into the wrap being authored. As general rule, a mixed card cannot be modified, preserving the original intent of the mixed card. The author, however, may optionally create an overlay that is applied to the mixed card. With this approach, various component(s), such as text components, image components, sound components, etc., can be added to the overlay. Accordingly, when the mixed card is rendered, the components of the overlay are also rendered, appearing superimposed on the mixed card.

In step 22, the author defines the sequence order(s) in which the cards are to be rendered, in response to navigational inputs, when the wrap is consumed. This step generally involves arranging the cards in a horizontal sequence order. Once the horizontal order is defined, the author may also wish to arrange certain cards in one or more vertical sequences.

In decision 24, the author determines if the authoring session is complete or not. If the author wishes to continue adding to or revising the wrap, then any of the steps 12 through 22 may be selectively performed. On the other hand, if the author would like to complete the session, then the next steps are performed.

In step 26, the authored wrap package is saved. In various embodiments, the wrap may be saved in a wrap library locally maintained on the mobile device and/or remotely, for example, in the cloud or in the wrap content delivery network as described in see commonly assigned U.S. application Ser. No. 14/878,148, entitled Card Based Package for Distributing Electronic Media and Services, filed Oct. 8, 2015, incorporated by reference herein. In yet additional embodiments, the library, regardless of where it may be maintained, can be either a private or public library, the latter meaning it can be accessed by other wrap users. It also should be understood that the save function is not always a sequential step as illustrated in FIG. 1 that necessarily occurs only after an authoring session is complete. On the contrary, a wrap package may be saved at anytime during authoring, including using an auto-save function, where the wrap is automatically saved at periodic time intervals.

In steps 28, the author determines if group collaboration of the wrap will be allowed or not. If no collaboration is permitted, then others will not be permitted to co-author or modify the wrap. If collaboration is permitted, however, then designated other person(s) are invited to further modify or author the wrap. In a non-exclusive embodiment, this step involves the author accessing their contact list on their mobile phone and then inviting designated the person(s) to access and modify the wrap. As noted herein, group collaboration is sometimes referred to herein as "groupie".

In an optional decision 29, the author may preview the wrap. If the author would like to edit an existing card in the wrap, or add or delete cards from the wrap, then the author may perform any of steps 12 through 28 as discussed above.

In step 30, the author defines certain properties and/or permissions that are associated with the wrap. For example, the author may define or change the name of the wrap or set tags associated with the wrap. In addition, the author can set permissions for the wrap regarding sharing, editing, mixing and/or making the wrap public or private. These permissions can be set either globally (meaning for all the cards of the wrap) or individually on a card-by-card basis.

In step 32, the author elects to publish and/or share the wrap. The extent to which an author elects to publish or share a wrap may widely vary. For example, an author may simply store the authored wrap in a public library, allowing other wrap users to access and consume the wrap on their own volition. Alternatively, the author may wish to take steps to proactively share and distribute the wrap. Such steps may include posting the wrap in a social media feed such as Facebook, Twitter, Pinterest, posting the wrap within a web page or web site, sharing the wrap with others via messaging, such as email or text, or any other means for distributing electronic media content.

In step 34, at any point in time, the author may wish to initiate another authoring session and make further changes to the wrap. Such changes may include adding new cards, additional authoring of existing cards, or deleting existing cards, etc. Thus, by storing wraps in libraries and allowing the periodic updating of the wrap, a wrap has the potential of never becoming stale. In other words, the useful life of a wrap can be extended, potentially indefinitely.

Although the steps 12 through 32 of FIG. 1 are described above in a given sequence, it should be understood that this order is by no means a strict requirement. On the contrary, an author may implement any of the aforementioned steps in just about any order while authoring a wrap package. The flow illustrated in FIG. 1 should therefore not be construed as limiting.

A more detailed explanation of each step of FIG. 1 as performed by the authoring tool is provided below. In this discussion, specific, but non-exclusive, examples are presented as the design sequence for the mobile authoring of a wrap is explained.

Figure 2:
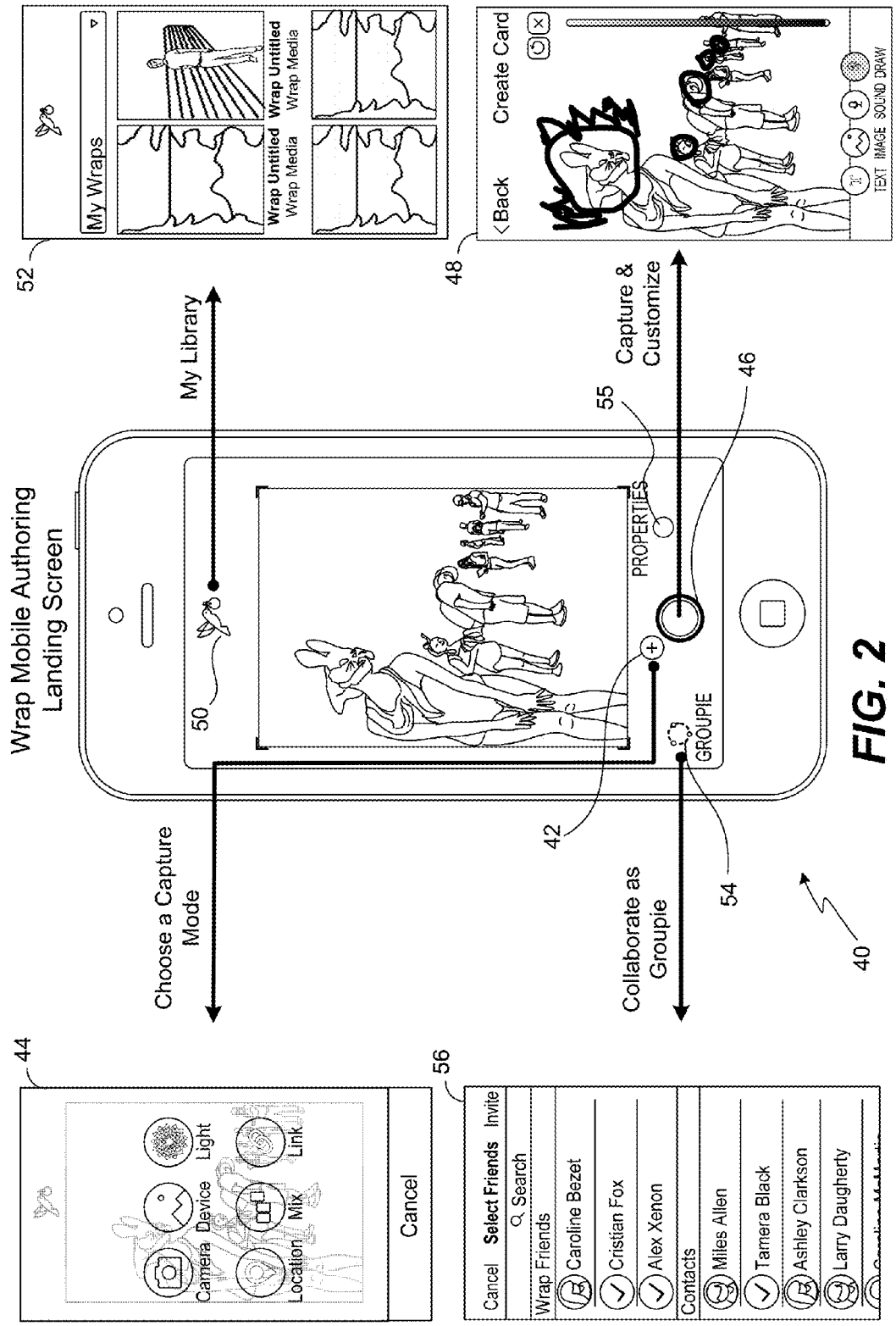
FIG. 2 illustrates a non-exclusive example of a landing page of the authoring tool of the present invention.

Referring to FIG. 2, a non-exclusive embodiment of an exemplary landing screen 40 for the mobile authoring tool is illustrated. In this embodiment, the landing screen 40 includes:

(a) A capture mode selection button 42. When selected, a transition to a capture mode selection screen 44 occurs. The screen 44 includes an array of icons for a plurality of capture modes, include camera, device, light, location, link and mixing respectively. By selecting an icon in screen 44, an author can select one of the plurality of capture modes for the creation of a card for a wrap being authored;

(b) A media capture button 46 that captures media for use in a card. The type of media captured when the button 46 is selected depends on the capture mode. For instance, while in the camera mode, the selection of the button 46 results in the capture of an image (i.e., the taking of a photo or video) and the creation of a card 48 with the captured image or video. Similarly, with the other modes, the selection of button 46 results in the capture of media, such as GPS or positional information, a link, etc. Regardless of the mode, a card 48 containing the captured media is typically created when the button 46 is selected;

(c) A library button 50, which in this non-exclusive example, is depicted using the Wrap logo of a humming bird. When the library button 50 is selected, it results in a transition to a display of a library 52 containing other wraps. The author can then peruse the wraps contained in the library 52. In various embodiments, the library 52 may be a private library belonging to the author or a public library. The library 52 may also reside on the mobile device, the cloud, in the wrap content delivery network, or a combination thereof;

(d) A collaboration button 54, which in this non-exclusive embodiment, is labeled "Groupie". When the collaboration button 54 is selected, it causes a transition a contacts list screen 56, which displays the contacts list of the author. Permission can be granted for the designated individuals to access and modify the wrap currently appearing in the landing screen by selecting or checking the names of contacts on the list. The "Groupie" function thus enables the author to allow his/her friends and/or colleagues to corroborate in the authoring of a wrap; and (e) A properties button 55, which when selected, transitions to a properties and permissions setting tool (as illustrated in FIG. 19). When selected, a transition to the properties and permission tool occurs, enabling the author to selectively set various properties and permissions for a wrap being authored, or individual cards, as described in more detail below.

The authoring tool as described herein can be used to create a wrap from scratch or to modify an already existing wrap maintained in the library. Once an authoring session begins, the various buttons 42, 46, 50, 54 and 55 on the landing screen 40 allows the author to navigate through the various screens and functionality provided by the authoring tool.

In the discussion below, the creation of a card using each of the above-defined media capture modes is described. Thereafter, a discussion of how the cards may be customized using a variety of customization tools is provided.

Capture Modes

Figure 3A:
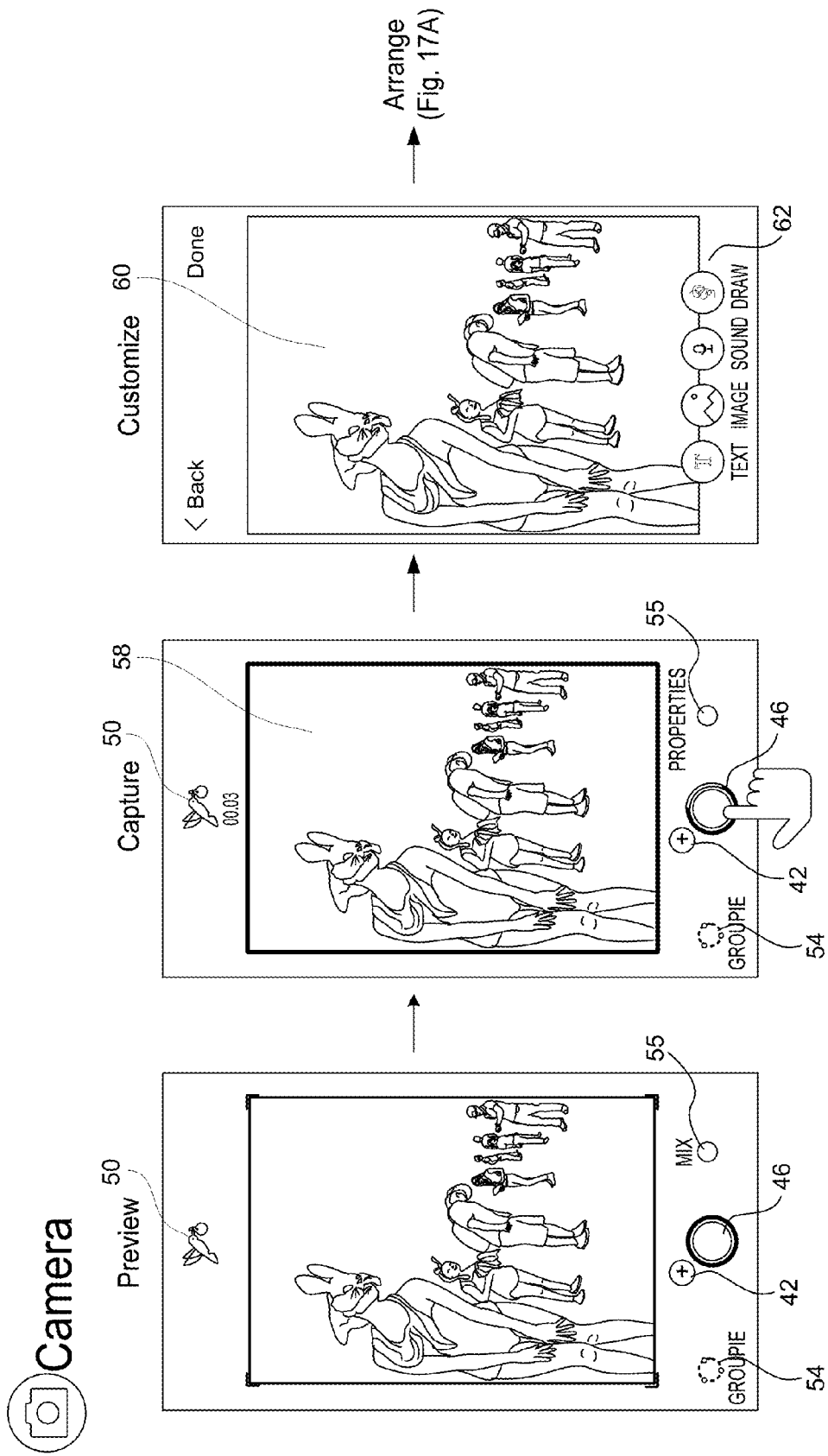
FIG. 3A illustrates a sequence for creating a card for a wrap package using a camera mode in accordance with a non-exclusive embodiment of the authoring tool.

Referring to FIG. 3A, a sequence for the creation of an image card in the camera mode is illustrated. In a preview step, the author pans the mobile device, scanning a scene. In a capture step, a screen image 58 of interest is captured with the capture button 46. As a result, a card 60 with a component including the captured photo is created.

Figure 3B:
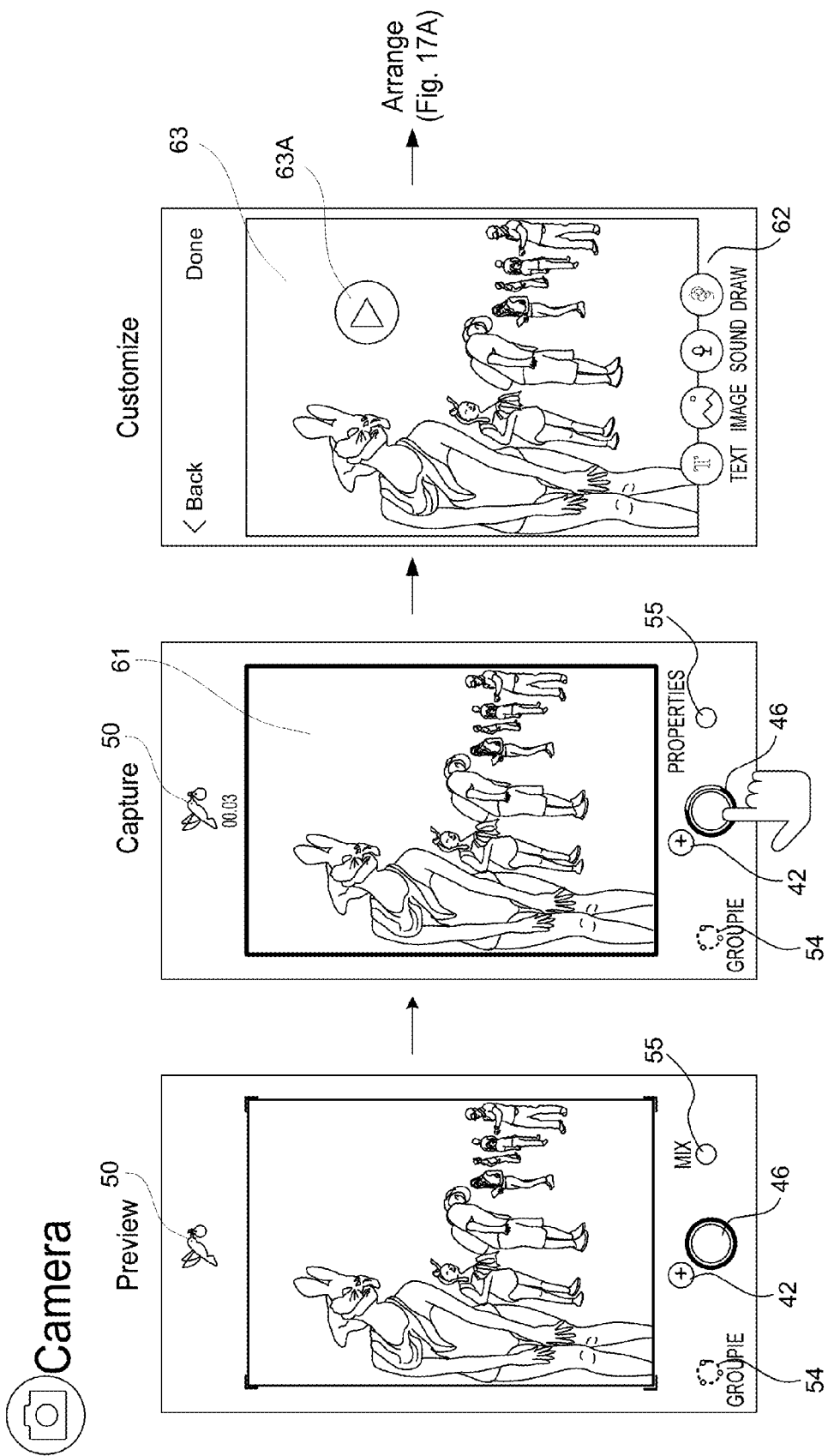
FIG. 3B illustrates a sequence for creating a card for a wrap package using a video camera mode in accordance with a non-exclusive embodiment of the authoring tool.

Referring to FIG. 3B, a sequence for the creation of a video card, also in the camera mode, is illustrated. In a preview step, the author pans the mobile device, scanning a scene 61. While panning, the capture button 46 is pressed, resulting in the recording of the scene 61. When the capture button 46 is released, a card 63 with a video component is created. The video component is represented by a play icon 63A.

With both the cards 60 and 63 of FIGS. 3A and 3B, a number of customization tool icons 62 (e.g., Text, Image Sound and Draw) are superimposed on the card 60. As described in more detail below, these tools 62 enable the author to further customized the card. Once any optional customization is performed, the author may elect to arrange the sequence order(s) of the cards, as described herein.

Figure 4A:
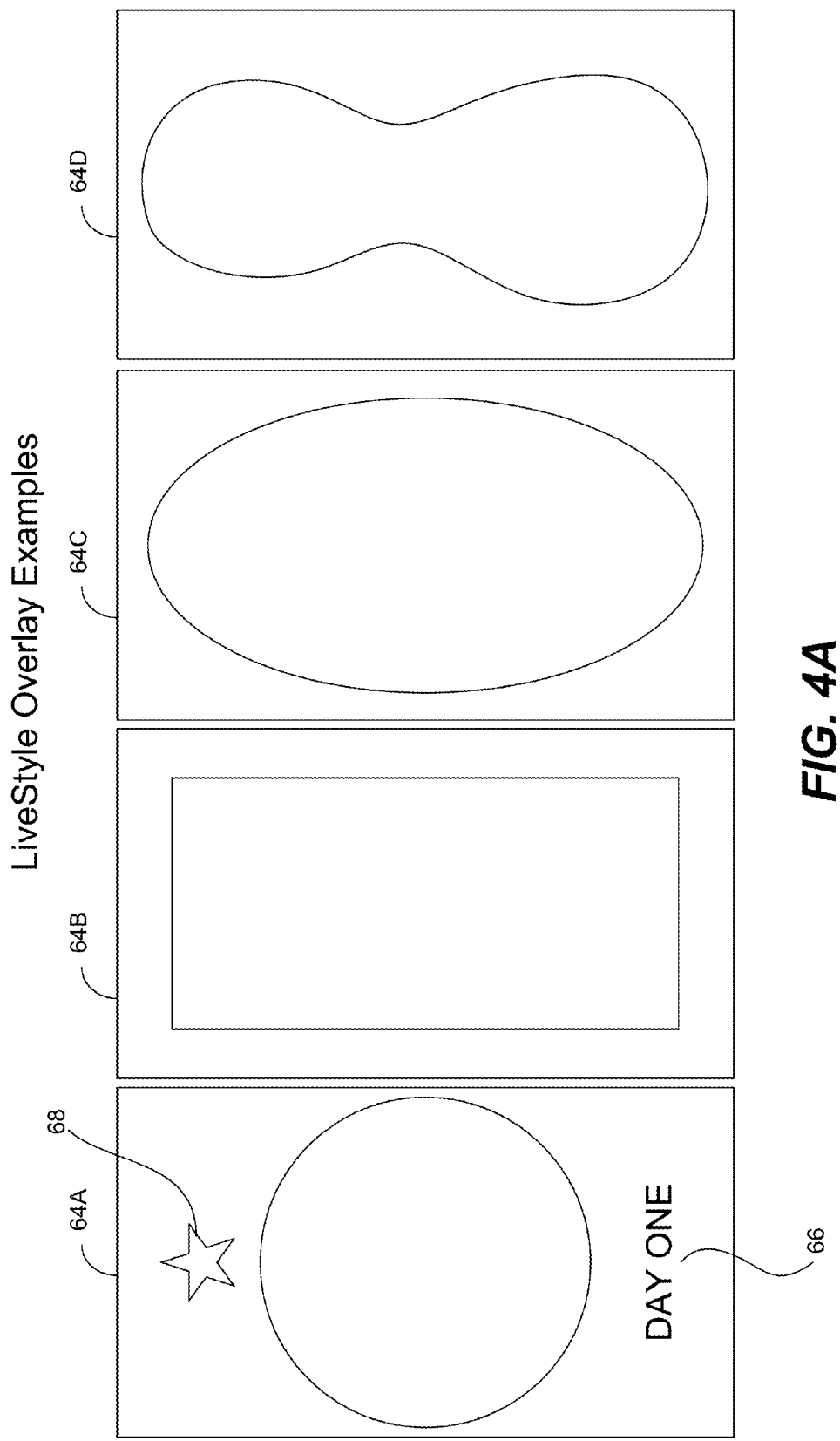
FIGS. 4A and 4B illustrate the application of a overlay feature to a card in accordance with a non-exclusive embodiment of the authoring tool.
Figure 4B:
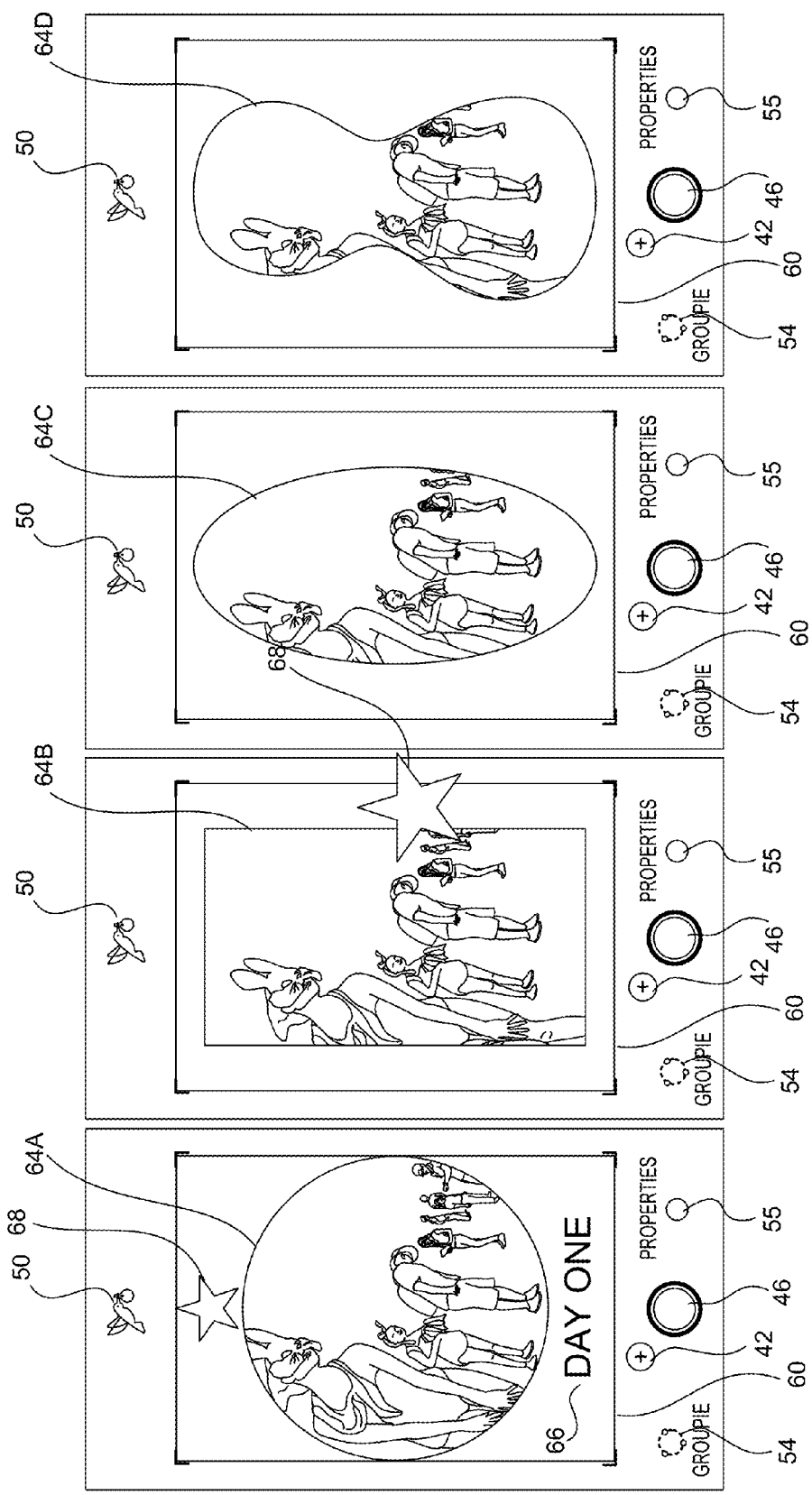

Referring to FIGS. 4A and 4B, diagrams illustrating an optional application of a LiveStyle overlay to the card 60 is illustrated. As illustrated in FIG. 4A, overlays that are round 64A, rectangular 64B, oval 64C and hour-glass shaped 64D are illustrated. In FIG. 4B, each of these overlays 64A through 64D is shown applied to the card 60. In a non-exclusive embodiment, the author may preview and select an overlay by swiping the display screen of the mobile device. With each swipe, a different overlay shape is applied to the card 60. The author can thus swipe through the various LiveStyle overlays until one of interest is found.

In certain non-exclusive embodiments, a LiveStyle overlay can also include other types of components. For example, the overlay 64A includes a text component 66 and an image component 68. In this particular example, the text of the component 66 recites "Day One", while the image component 68 is a star. When a LiveStyle overlay with additional components is applied to a card, those additional components will be associated with the card, as illustrated in example 64A of FIG. 4B.

When a LiveStyle overlay for the card 60 is selected, a component for the overlay is created and associated with the card. In addition, if the overlay itself includes component(s), regardless of the type, those components are also associated with the card. It should be understood that any type of component, including audio, video and/or button components can be included in or associated with a LiveStyle overlay.

In the above example, a swipe action is used to select and apply a LiveStyle overlay to a card created in the camera mode. It should be understood that LiveStyle overlays can be selected and applied in a similar manner to any card, regardless of the capture mode. For the sake of brevity, however, an example of the selection and application of an overlay example for each capture mode is not exhaustively described herein.

Figure 5:
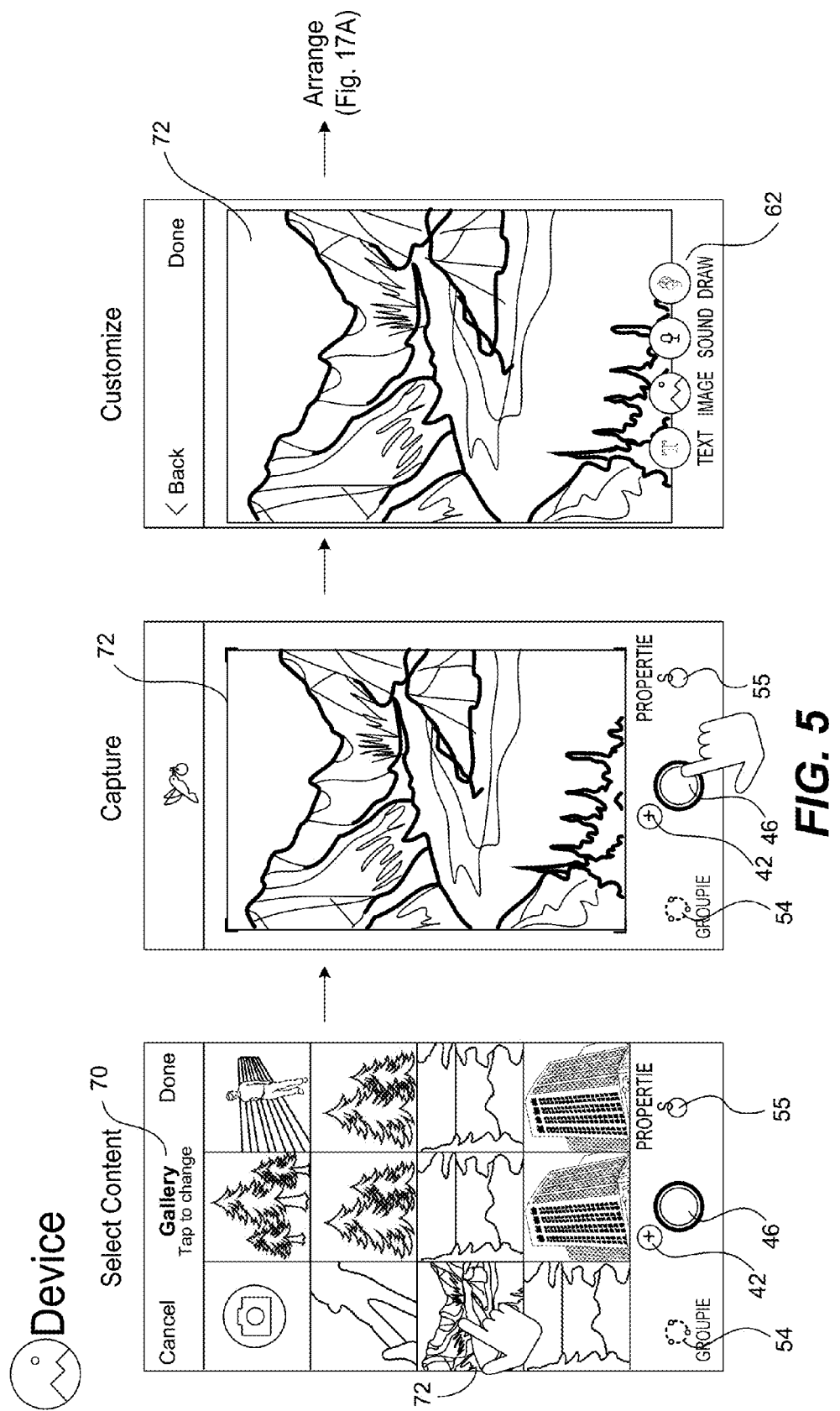
FIG. 5 illustrates a sequence for creating a card for a wrap package using a device mode in accordance with a non-exclusive embodiment of the authoring tool.

Referring to FIG. 5, a sequence for the creation of a card in the device mode is illustrated. When the device mode is selected, a gallery of images 70 is displayed on the screen. In many situations, the gallery resides on the mobile device and/or cloud and includes images and photos captured by the author. This, however, is by no means a requirement and the images/photos in the gallery may come from any source.

When a particular photo/image 72 is selected from the gallery 70, it appears on the display of the mobile device. When the capture button 46 is selected, the mobile authoring tool generates a card 74 with a component having the image 72 contained therein. Again, the various customization tools 62 are superimposed on the newly created card. Once any optional customization of the card is performed, the author may elect to arrange the cards, as described herein.

Figure 6:
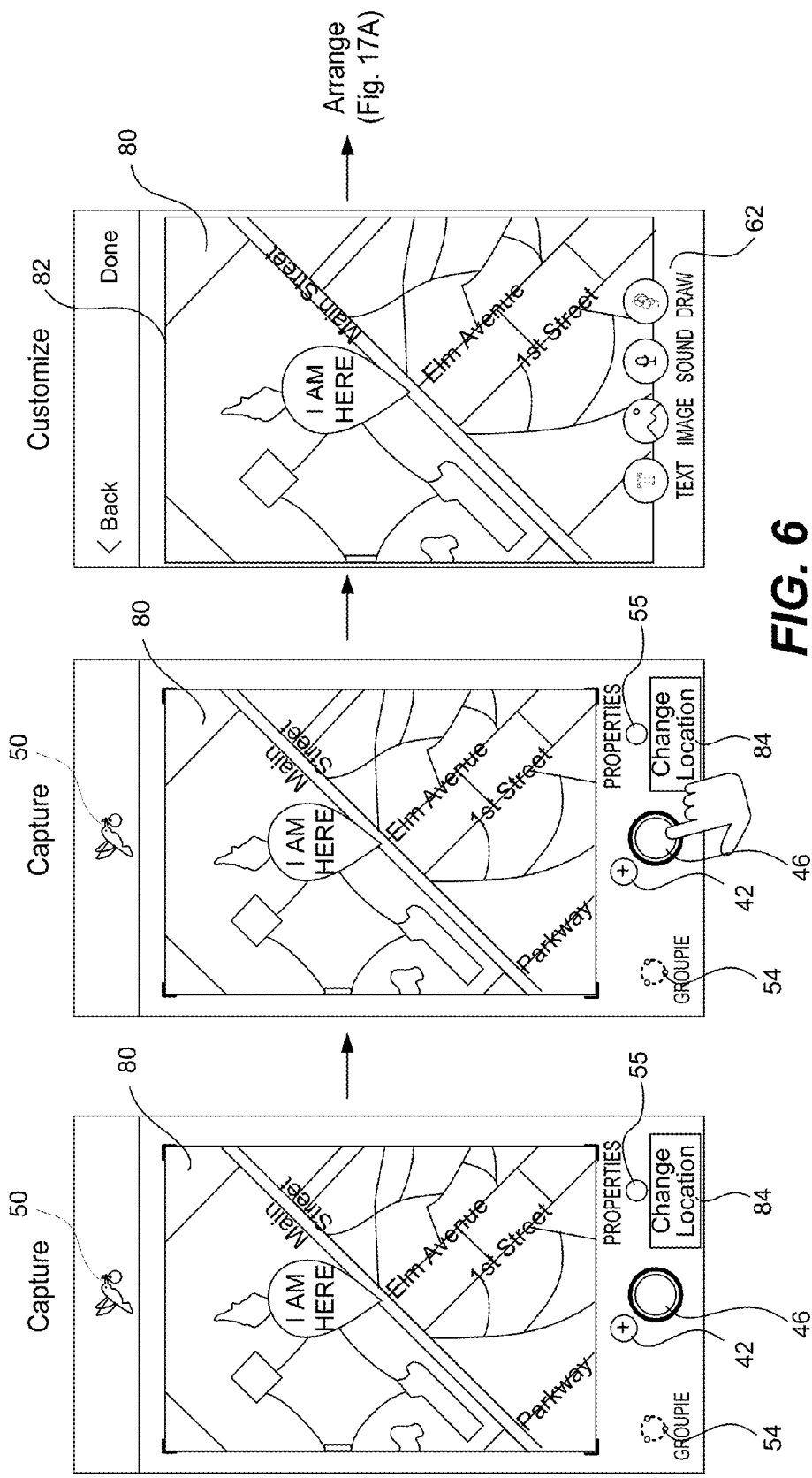
FIG. 6 illustrates a sequence for creating a card for a wrap package using a location mode in accordance with a non-exclusive embodiment of the authoring tool.

Referring to FIG. 6, a sequence for the creation of a card using the location mode is illustrated. When selected, the authoring tool operates in cooperation with GPS functionality residing on the mobile device, such as Google Maps or an equivalent GPS application. In a default preview setting, the current location 80 of the mobile device is displayed on the screen. By contacting the screen and manipulating the content (e.g., expanding, shrinking, or scrolling in different directions, the displayed map content can be adjusted). In a capture step, the button 46 is selected to capture the map content appearing on the display. In response, a card 82 displaying the captured map content 80 is generated. If the author is desirous of creating a card including another location besides the current location, a change location button 84 is implemented. In response, the author may enter either an address (e.g., 250 Sacramento Street), a location such as a city name (e.g., Chicago, Ill.), or point of interest (e.g., the Golden Gate Bridge or the Empire State building). Once a new location is defined, the corresponding positional information generated by the GPS functionality can be displayed, captured, and included in a card. Again, regardless of the positional information of the card, customization icons 62 are superimposed. After any optional customization is performed, the card of the wrap can be arranged as described herein.

Figure 7:
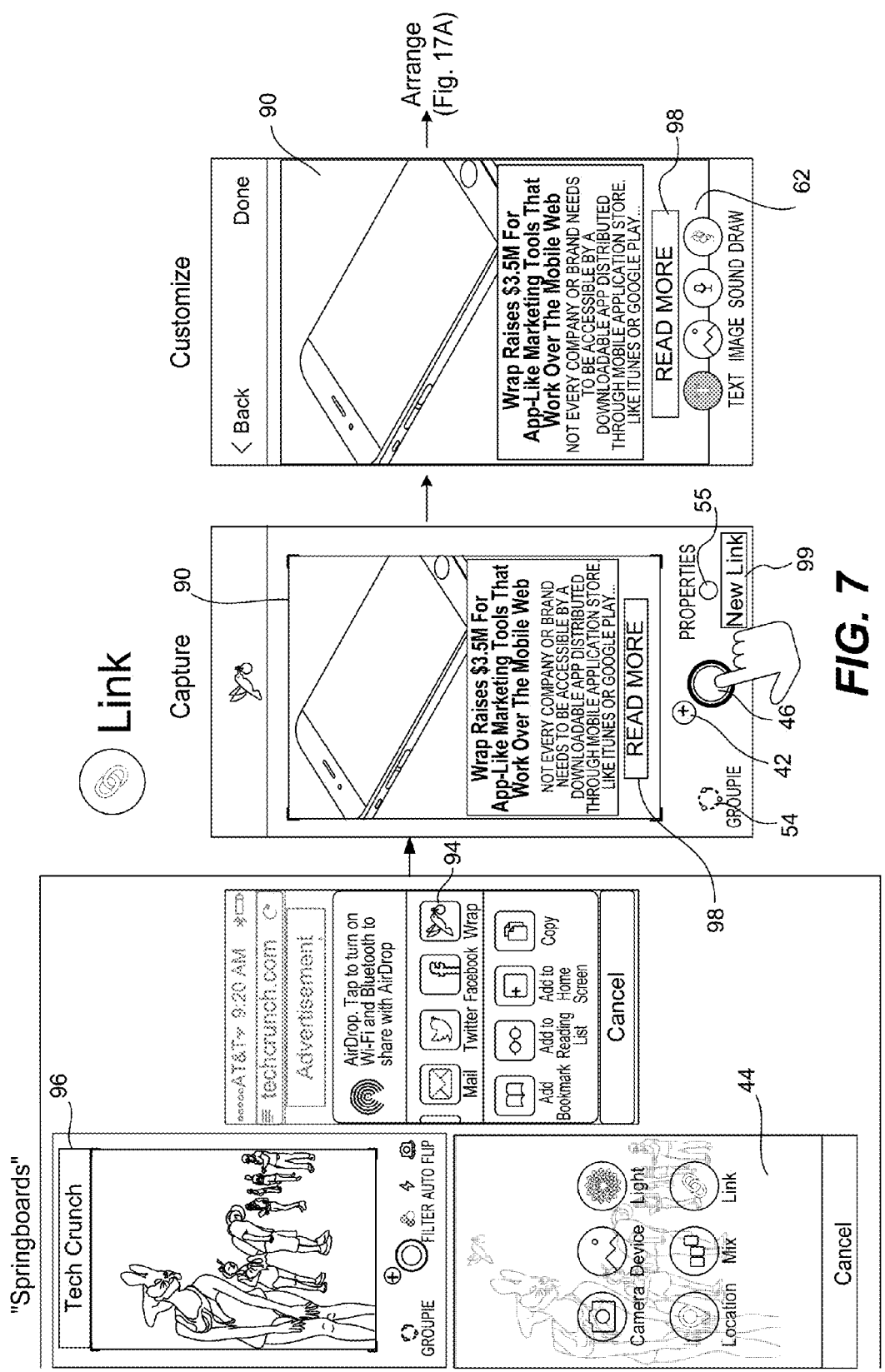
FIG. 7 illustrates a sequence for creating a card for a wrap package using a link mode in accordance with a non-exclusive embodiment of the authoring tool.

Referring to FIG. 7, a sequence for the creation of a card in the link mode is illustrated. In the link mode, the authoring tool provides at least three "springboards" for the creation of a card including linked media. These springboards include:

(a) A selection of the link icon appearing in screen 44. When the link icon is selected, the author may define a link, such as a URL of a web page or document. In response, the media 90 identified by the link appears on the display of the mobile device in the capture mode. By pushing the media capture button 46, a card 92 including the media 90 identified by the link is created;

(b) A selection of a Wrap icon (e.g., the hummingbird logo) 94 using a share function while the author is browsing a web page while using the mobile device. For example, the author may be browsing web content on their mobile device. When a URL of interest is found, the author may select the Wrap icon 94 provided in the share function. In response to the selection of icon 94, the mobile application is launched, which results in the appearance of the linked media 90 on the display screen in the capture mode. Again, by selection of the capture button 46, a card 92 including the media 90 is created; and (c) A selection of a banner 96 appearing in mobile authoring tool, which was created in response to the author selecting and copying content into a clipboard on their mobile device. For example, the author may copy a URL of a web page or other content while viewing an application on their mobile device. When the mobile authoring tool is next launched, the banner 96 appears with the copied content from the clipboard. When the banner 96 is selected, the corresponding media 90 is displayed in the capture mode. Again, by selecting the capture button 46, a card 92 including the media is created.

In non-exclusive embodiments, the created card 92, regardless of the springboard, will include a button 98, which defines the URL of the referenced web page or document. Thus, when the button 98 is selected when the card 92 is rendered, the referenced web page or document is retrieved and presented within the card 92.

In certain embodiments, a new link icon 99 may also appear in the capture screen view. When the new link icon 99 selected, the author can define a new URL or link that will override or replace the existing content of the previously selected link. Thus, by using the new link icon 99, the link associated with the card 92 can be updated.

In addition, like other newly created cards, the authoring tool superimposes the customization tool icons 62 onto the card 92, which allows optional customization if desired. The card 92 may also be arranged in one or more sequence orders within the wrap as described herein.

The light mode is a unique media capture mode that is designed to convey sentiments. With the light capture mode, media conveying "positive energy" can be created and sent within the context of a wrap package, making a recipient feel loved, appreciated, on top of the world, special, etc. In a non-exclusive embodiment, an algorithm is typically used to generate the light media in response to some form of physical input provided to the mobile device by the author.

Figure 8:
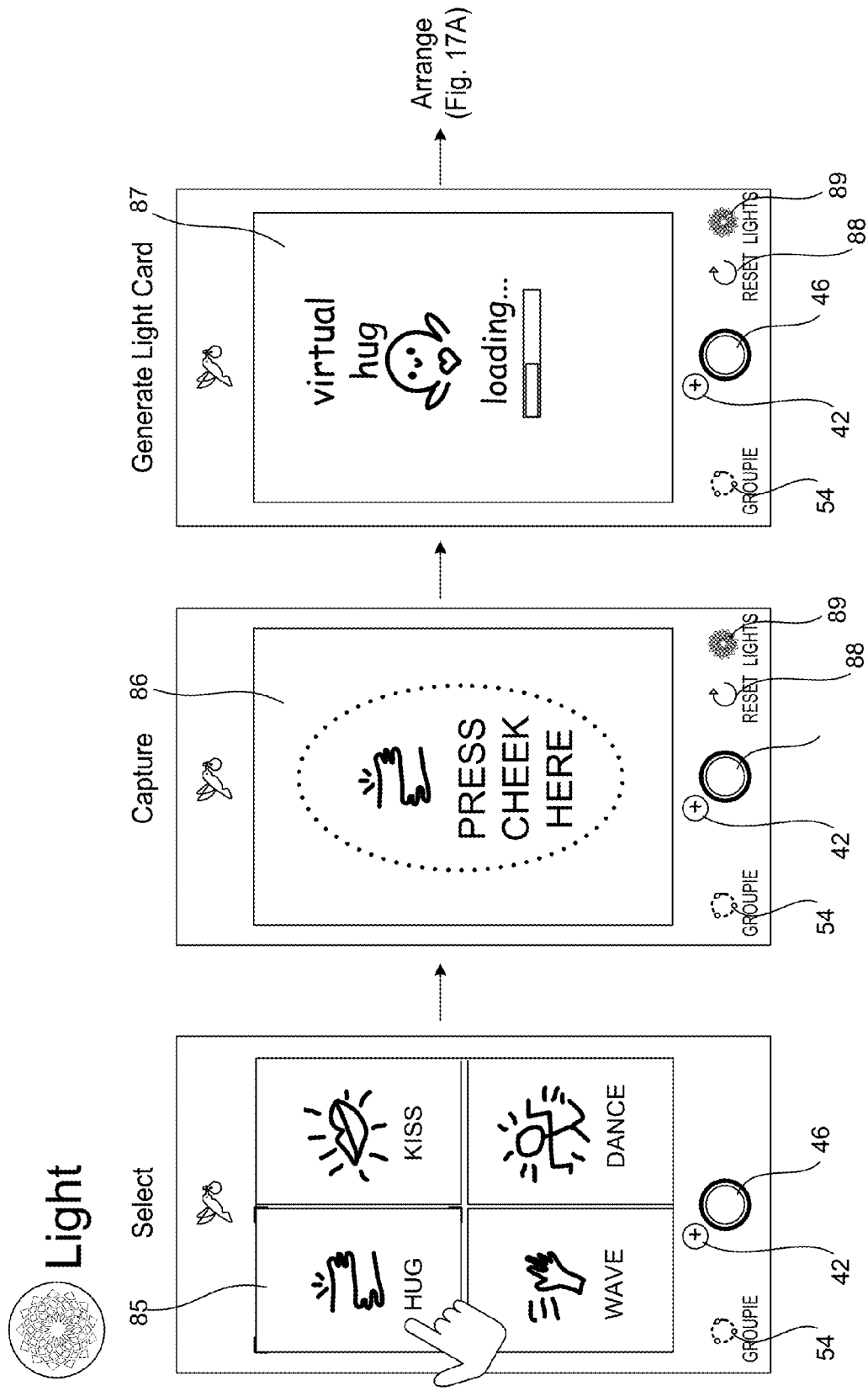
FIG. 8 illustrates a sequence for creating a card for a wrap package using a "light" mode in accordance with a non-exclusive embodiment of the authoring tool.

Referring to FIG. 8, an illustrative sequence for the creation of a card using the light mode is provided.

As illustrated on the right, a menu 85 of different light capturing modes is presented when the light icon appearing on screen 44 is selected. In this non-exclusive embodiment shown, the types of "light" modes provided in the menu 85 include a virtual hug, a virtual kiss, an interactive wave or an interactive dance. In response, the author may select one of the modes. In the particular example shown, the hug mode is selected.

In response to the selection of the hug mode, a screen 86 appears instructing the author how to physically interact with their mobile device. In this example, the screen 86 directs the author to hold or press the screen of their device against their cheek. In response to the sensed contact, an algorithm generates media representing a "virtual hug", such as an animated GIF or video clip showing a character reaching out and embracing the viewer. As illustrated on the right, a light card 87 including a component containing or associating the GIF or video is created in response.

The reset icon 88 allows the resetting of the created positive light media. For example, if the author does not like the created GIF or video, it can be removed by selecting the reset icon 88. Similarly, the lights icon 89 allows the author to return to the menu 85, where the same or a light different mode can be selected and new positive media can be created.

The kiss, wave or dance modes can each similarly be used to create cards with positive energy media. For example:

(a) With the kiss mode, the author may be directed to make a kissing sound into the microphone of their device. In response, an algorithm is used to generate media representative of a kiss, such as an animated GIF showing and making the sound of a kiss;

(b) With the wave mode, the author may be directed to wave their mobile device back and forth. In response, an algorithm responsive to an internal accelerometer in the device generates a unique animation GIF representative of the waving motion; and (c) With the dance mode, the author may be directed to shake their mobile device. In response, an algorithm responsive to an internal accelerometer in the device generates a unique dancing animation GIF representative of the shaking motion.

By using algorithms, unique animations or GIFs may be created each time one of the light modes is invoked. For example, since the hugging, kissing, waving or shaking inputs will vary each time they are used, the resulting animations or GIFs will also vary. It should be noted, however, that using algorithms is by no means a requirement. On the contrary, media, animations and/or GIFs representative of positive energy or light media can be created in any manner, for example, by selection from a library.

In yet another non-exclusive embodiment, the positive energy media created while the author is physically interacting with their mobile device can be displayed "on the fly" as it is generated. For example, as the author makes a kissing sound into the microphone of their device, the animation or GIF can be displayed as it is created. If the user input stops, then the animation or GIF stops, and then resumes if the author again starts to make a kissing sound. In a variation of this embodiment, a progress bar may be displayed on the screen of the device. The progress bar prompts the author to physically interact with their device until the progress bar is full. In embodiments where a progress bar is used, the animation of the GIF can be displayed on the fly as the physical input from the author is received or only after the progress bar is full. Again, although the kiss mode was used for the above examples, displaying light media on the fly and/or the use of progress bars or the like can be used with any of the above listed or other light modes.

It should be noted that the hug, kiss, wave and dance examples provided herein are merely illustrative and that any other light modes for conveying "positive energy" may be used.

Positive or "light" media also does not have to be limited to animations or GIFs. Positive or light media can also include actions, sometimes also referred to as "IOU Light". Within the context of a card, an author may promise a favor to a recipient of the wrap, such as committing to walk their dog, run an errand, or drive them to school. Positive or "light" media can also take the form of redeemable gifts, such as a gift card. An author may send an electronic Starbucks gift card within a wrap as a way of sharing positive sentiments toward an intended recipient.

Figure 9:
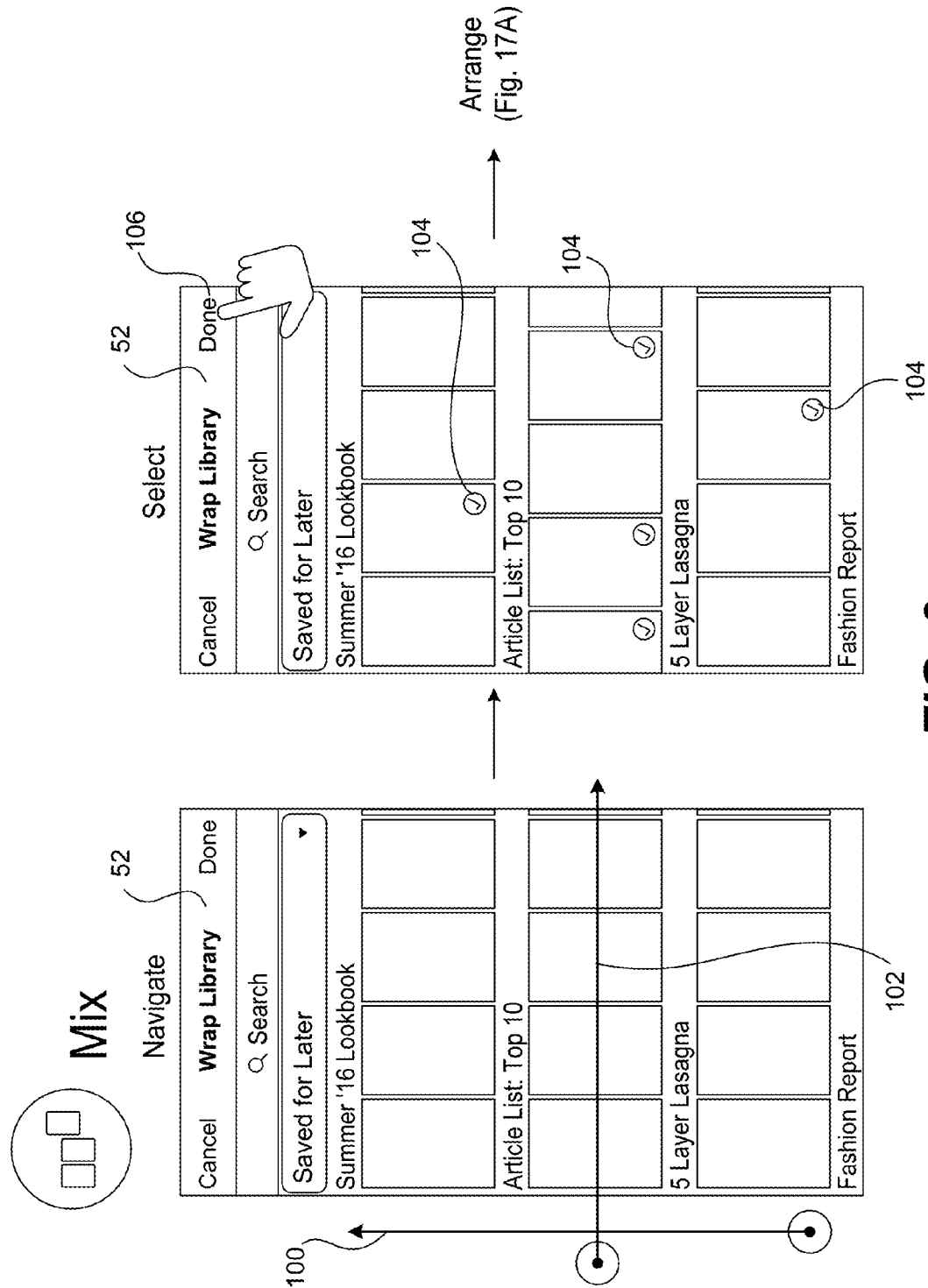
FIG. 9 illustrates a sequence for creating a card for a wrap package using a mix mode in accordance with a non-exclusive embodiment of the authoring tool.

Referring to FIG. 9, a sequence for the mixing of one or more card(s) from other wraps into a wrap that is being authored is illustrated.

When the mix icon in screen 44 is selected, the library 52 of existing wraps is displayed for navigation. By swiping up/down, as designated by the vertical arrow 100, the author can navigate all the wraps in the library 52. By swiping left and/or right, as designated by the horizontal arrow 102, the author can peruse all the cards of a given wrap. While navigating the library 52, the author may select one or more cards from one or multiple wraps for mixing. For example, the author may select a card for mixing by touching or tapping the card, resulting in a check or other visual marker 104 appearing next to the selected card. When a "Done" button 106 is implemented, the selected cards are mixed into the wrap in the order in which they were chosen.

Mixed cards, like all cards, can be further customized, as discussed below in more detail with respect to FIG. 16. In addition, the mixed cards can also be arranged in one or more sequence orders within the wrap as described herein.

Customization Tools

Figure 10:
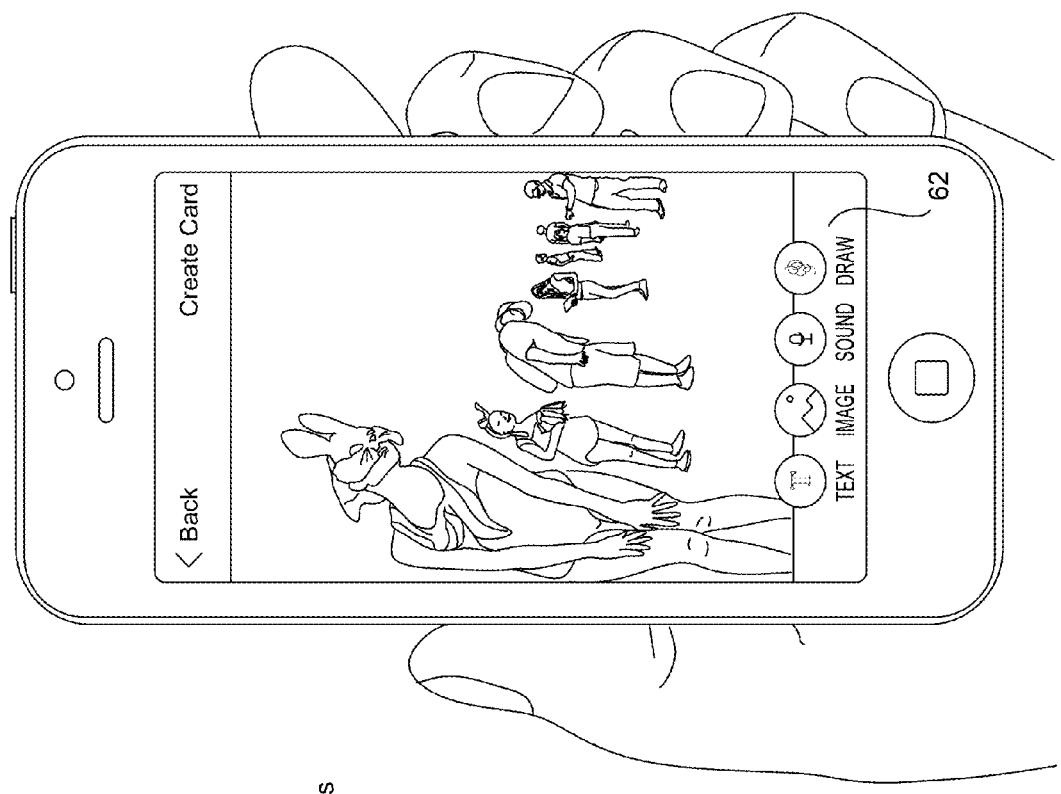
FIG. 10 illustrates various customization tools for customizing a card in accordance with non-exclusive embodiments of the authoring tool.
Figure 10:
Figure 10:
Figure 10:

Referring to FIG. 10, an overview of the customization tools 62 is provided. As previously noted, icons for the various customization tools 62 appear superimposed over the display of a card, regardless of the mode in which the card was created. In a non-exclusive embodiment, the tools 62 include text, image, scribble/draw and sound. It should be understood that this list of tools should in no way be limiting. On the contrary, any type of tool for the customization of cards may be provided.

The text tool enables an author to create one or more text components for a card and then enter or type the desired text for each component.

The image tool allows the author to create one or more image components for a card and then define the image for each component.

The "scribble/drawing tool allows the author to create drawing component for cards and then fill the components with drawings, scribbles and/or notes.

The sound tool allows the author to create sound components and then fill or associate recorded audio with the components.

To invoke a given tool 62, the corresponding icon is selected. Once selected, an "empty" component is generated. Media for the component is then created or otherwise defined. For example, when the text, image, scribble or sound tool is selected, the resulting container is filled with text, an image/photo, a drawing, scribble or note, or sound respectively. With other types of components, however, the component and the media are associated with one another. For example, with links and/or video, components may rely on an identifier, such as a URL, to associate or reference the media rather than contain the media per se.

Some of the customization tools further provide an optional two-step selection process for manipulating components and their associated media content respectively. In response to a first or primary selection, the component itself is manipulated. For example, a component can be selected, positioned, dragging, rotated and/or sized on the display of the mobile device. In response to a second or secondary selection, the media of the component can be edited, replaced, or otherwise modified. As explained in more detail below, this two-step approach generally applies to text, images and sound components, but not necessarily drawing/scribble components. In a non-exclusive implementation, the primary and secondary selections are each invoked by first and second taps on the display screen of the mobile device respectively. This embodiment is just one example of how components can be manipulated and customized through a touch-sensitive screen on a mobile device. This example, however, should not be construed as limiting. On the contrary, any component manipulation operation can be used.

Referring to FIGS. 11A through 11E, a sequence of diagrams illustrating the operation of the text tool and the manipulation of text components is illustrated.

In FIG. 11A, a sequence of screen shots illustrating the creation of a text component in a card is illustrated. As illustrated in the left screen shot, the "Text" tool is selected. In response, as illustrated in the center screen shot, a keyboard 108 appears superimposed over the card. In addition, a text box 109 appears within the card. As illustrated in the right screen shot, the typed media (e.g., "Day One") is inserted into the component and appears on the card as it is typed. In this manner, the author can customize the card to include any desired string of text and/or characters. In an optional embodiment, a justification tool 110 is also provided. Tool 110 allows the author to left, right or center justify the text component as it appears on the card. It should be noted that the justification tool 110 is just one tool of many that can be provided. In other examples, other tools as bold, italic, etc. may be provided.

Figure 11B:
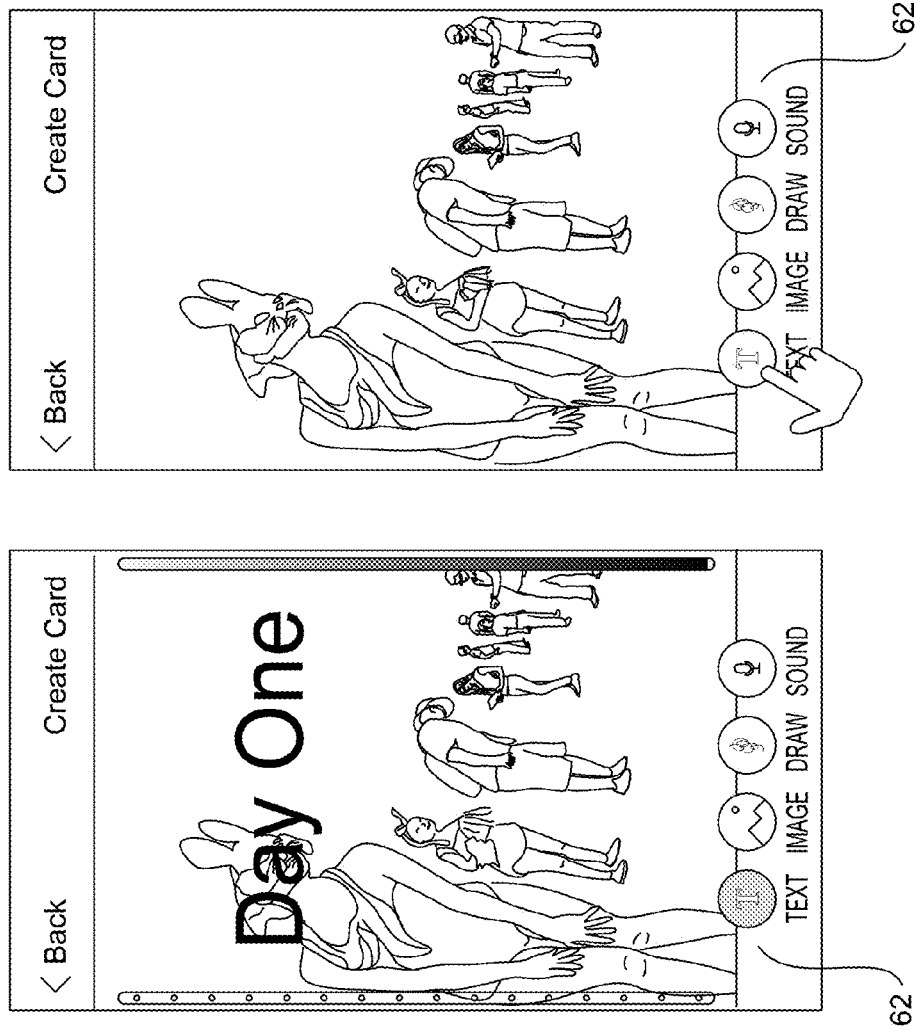

FIG. 11B illustrates a feature where the author can toggle the text component on or off. In the left screen shot, the previously entered text "Day One" appears. By selecting the Text tool again, the component is no longer displayed within the card. If the Text tool is yet again selected (not illustrated), then the text "Day One" re-appears. In this manner, the author can selectively toggle the display of the text component on or off.

Figure 11C:
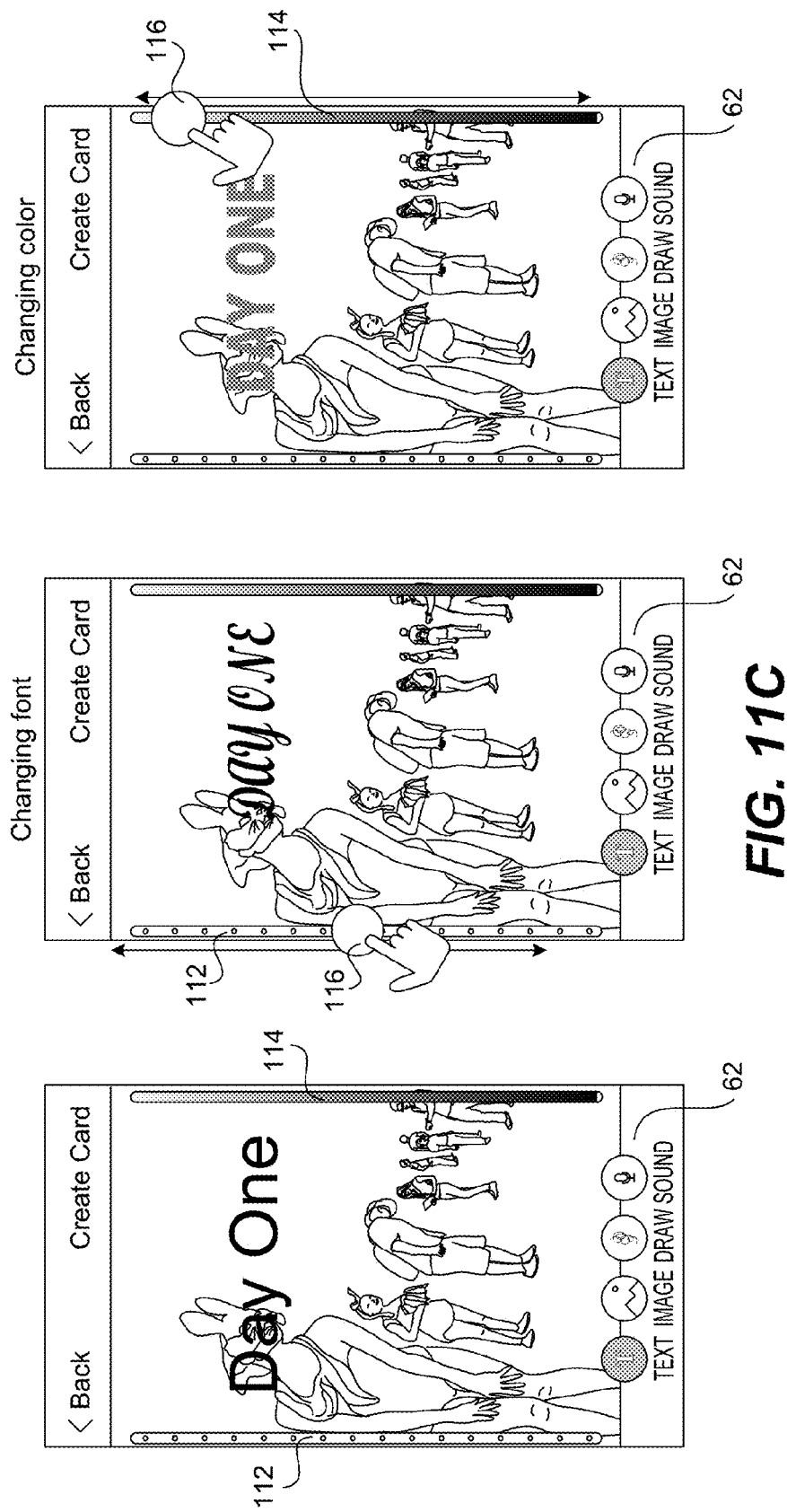

FIG. 11C illustrates the operation of style selector bars (or, as sometimes referred to herein "style-swipes"), which are a novel way for an author to modify or alter a constraint associated with text. In this example, as illustrated in the left-most screen shot, a first style selector bar 112 for changing the font and a second style selector bar 114 for changing the color of the text is illustrated. As appears in the middle screen shot, an up/down finger swipe, represented by the circle 116, causes the font of "Day One" to change (e.g., from Ariel, Cambria, Calibri, etc.). Similarly, as illustrated in the left most screen-shot, the up/down finger swiping along the second style selector bar 114, as also signified by circle 116, causes the color of "Day One" to change (i.e., red, blue, green, yellow etc.). It should be noted that in these examples, just two constraints of text are modified using style selector bars. It should be understood, however, that any text constraint may be modified using style selector bars.

Figure 11D:
Figure 11D:
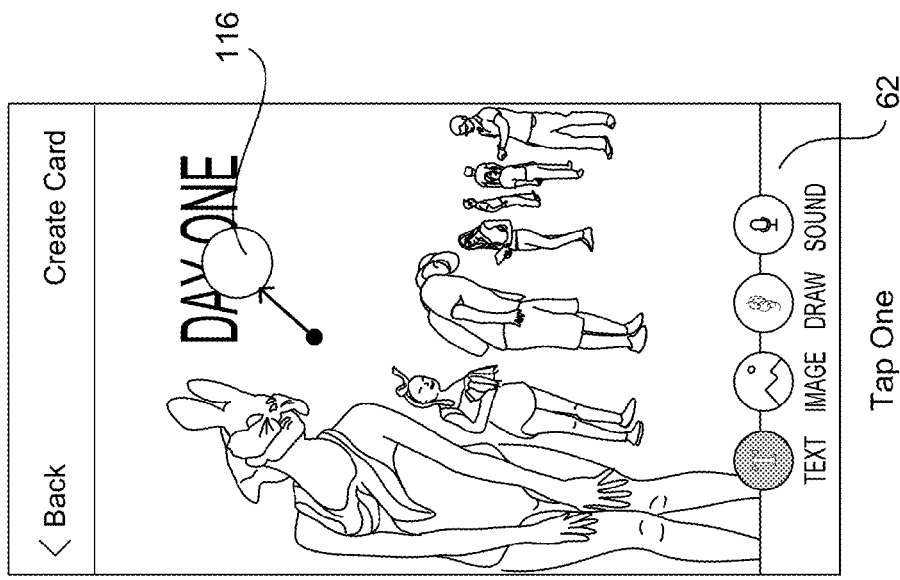

FIG. 11D illustrates several examples of how a text component can be manipulated using a first selection (e.g., tap) are shown. In the left screen shot, the position of the component is moved by contacting the display adjacent the component with a single finger (i.e., a first tap represented by circle 116) and then dragging the component to a desired location. In the right screen shot, the component may be rotated by touching the display adjacent the component with two fingers contacting the screen at approximately the same time (i.e., a first tap represented by circles 116A and 116B). With the two fingers contacting the display, a twisting and/or turning motion will result in a rotation of the component. Also, by moving the two fingers either closer together or wider apart, the component can be sized.

Figure 11E:
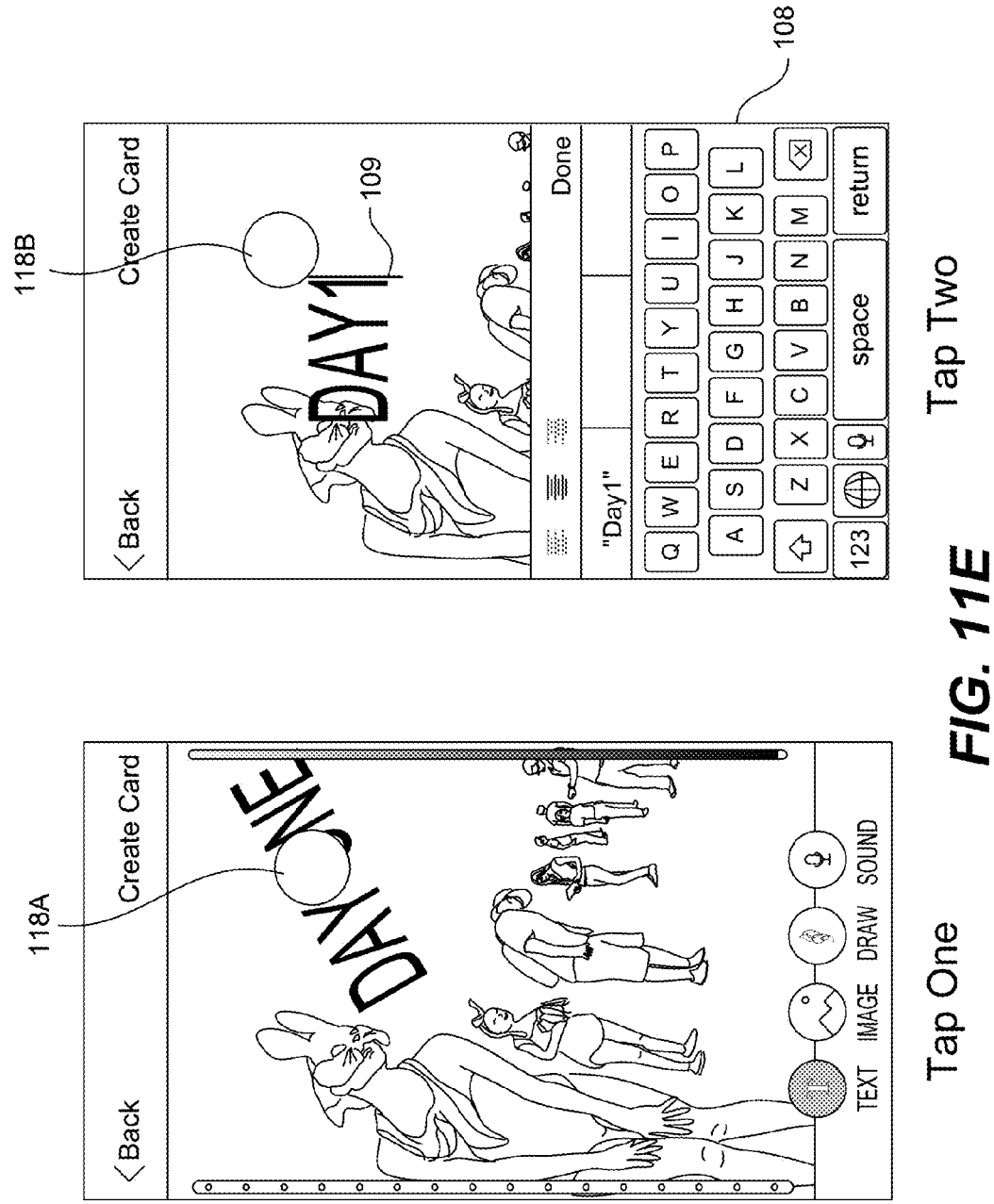

In contrast, FIG. 11E illustrates both a first selection and a second selection manipulation of the text component. As illustrated in the left screen shot, a first selection (e.g., tap one) 118A allows manipulation of the component itself, for example, moved or rotated as discussed above. As illustrated in the right screen shot, a second selection (e.g., a second tap) 118B, the media of the component can be changed. Specifically, with a text component, the keyboard 108 and the text box 109 again appear in response to the second tap, allowing the author to modify the original text and/or add new text.

Referring to FIGS. 12A through 12E, a sequence of diagrams illustrating the operation of the image tool and the manipulation of image components is illustrated.

Figure 12A:
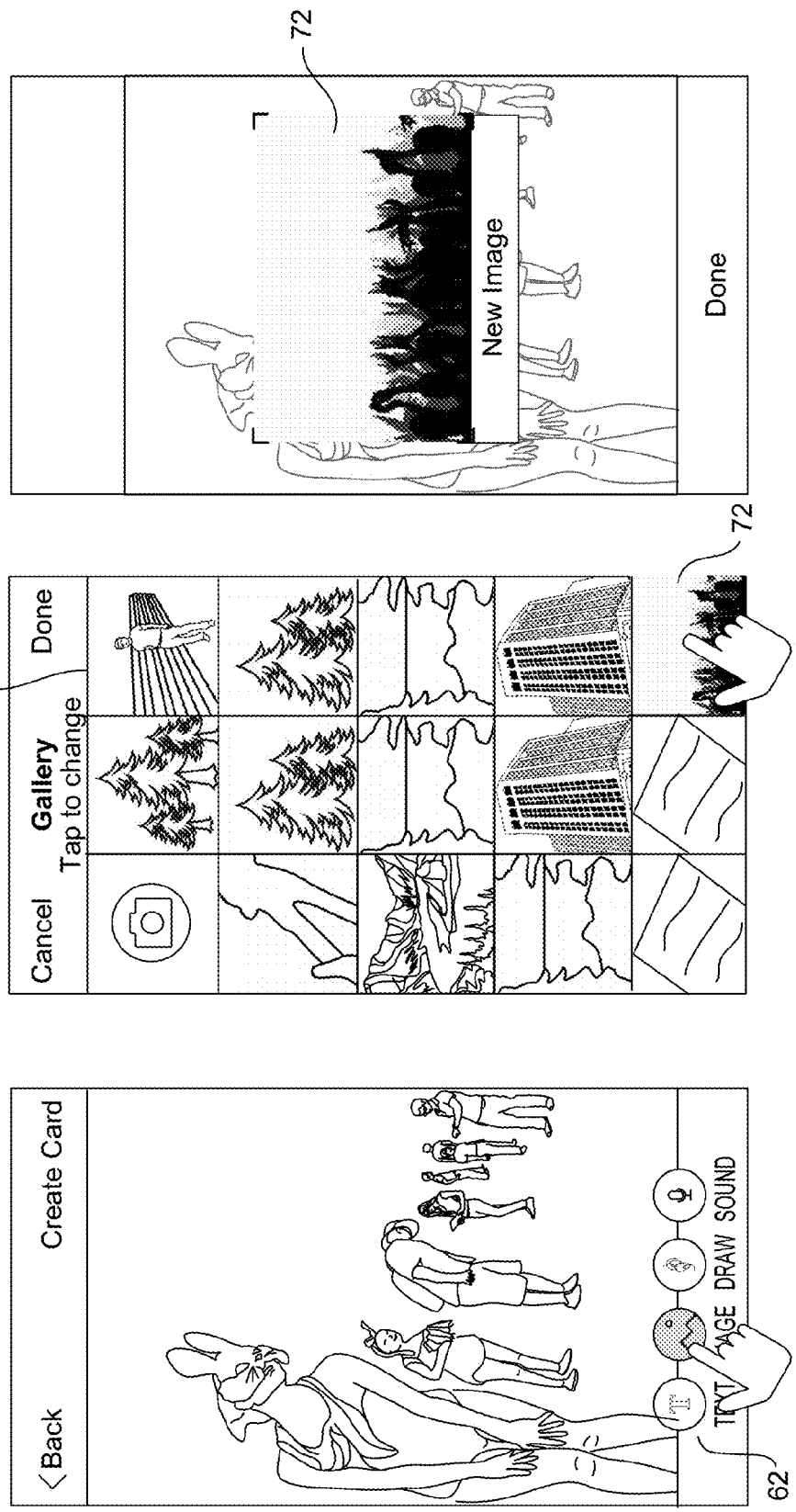
FIG. 12A through FIG. 12E illustrate various tools for customizing image components in accordance with non-exclusive embodiments of the authoring tool.

In FIG. 12A, a sequence of screen shots for customizing a card with an image is illustrated. In the left most screen shot, the "Image" tool is selected. As illustrated in the middle screen shot, an image gallery 70 appears on the display screen of the mobile device in response. The author then selects an image 72 from the gallery. As illustrated in the right screen shot, a component with the selected image 72 is then created on the card. In this manner, the author can customize the card to include any image as desired.

Figure 12B:
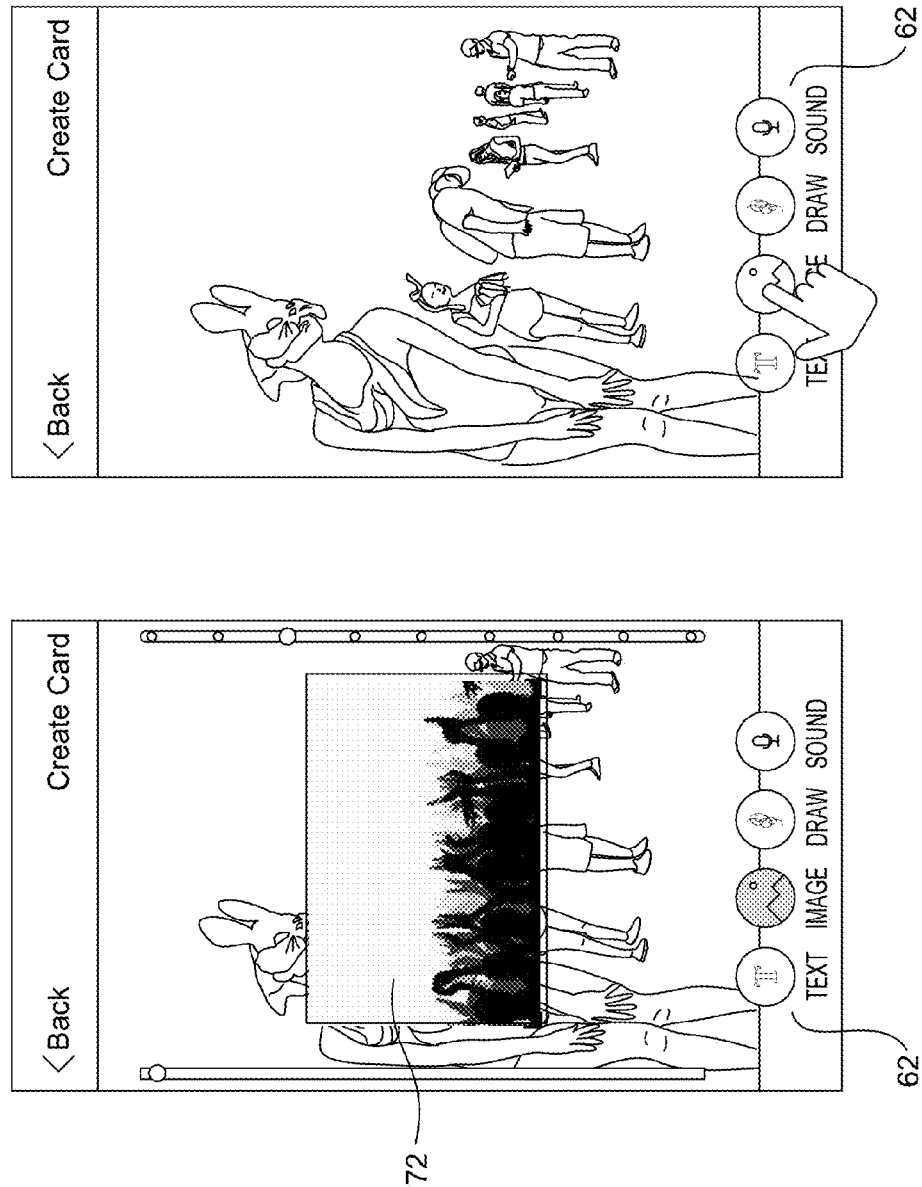

FIG. 12B illustrates a feature where the author can toggle the image component on or off. In the left screen shot, the image appears. By selecting the Image tool again, the image component is toggled off. If the Image tool is again selected, the image re-appears. In this manner, the author can selectively toggle the image component on or off.

Figure 12C:
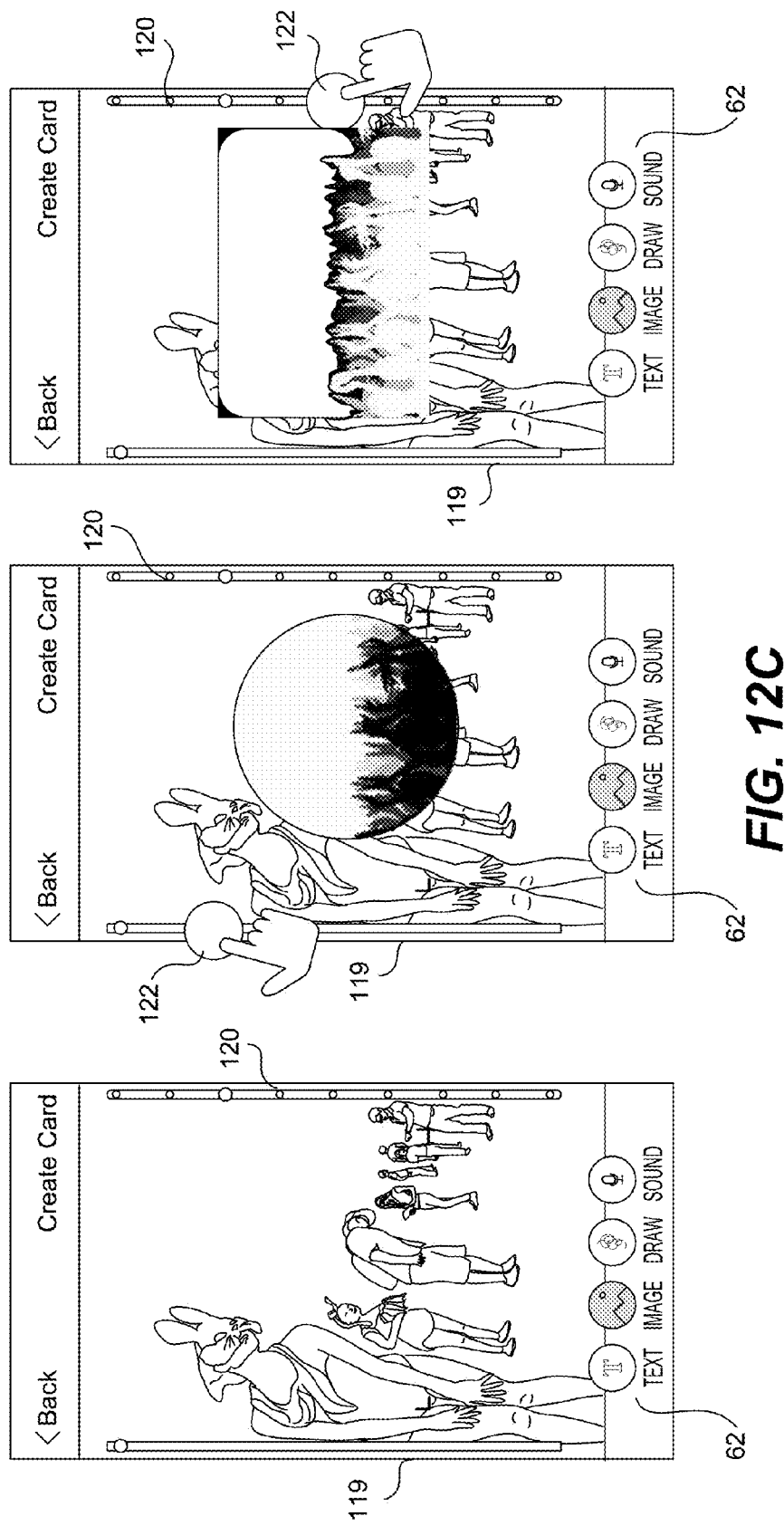

FIG. 12C illustrates the operation of style selector bars for modifying or altering constrain(s) associated with an image. As illustrated in the left screen shot, two style selector bars 119 and 120 are shown.

The style selector bar 119 is used to adjusts a mask radius surrounding the image. As illustrated in the center screen shot, the radius of the mask surrounding the image can be made larger or smaller in response to the author sliding a finger, represented by circle 122, up/down the style selector bar 119.

The second style selector bar 120 is used to adjust filtering applied to the image. As illustrated in the right screen shot, an up/down finger swipe, represented by the circle 122 along the style selector bar 120, causes the filtering (e.g., black, white, colorized, sepia, etc.) of the image to change.

It should be noted that in the above examples, two image constraints are modified using style selector bars. It should be understood that any constraint associated with images may be modified using style selector bars.

Figure 12D:
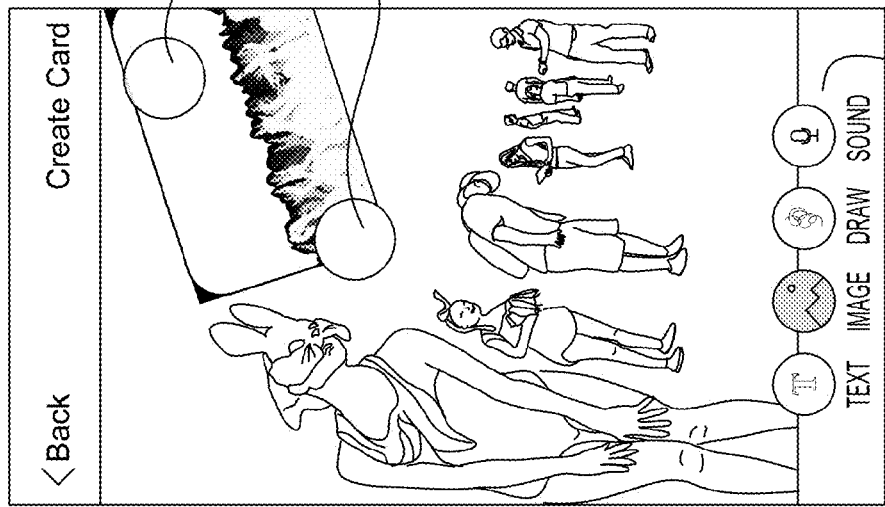
Figure 12D:
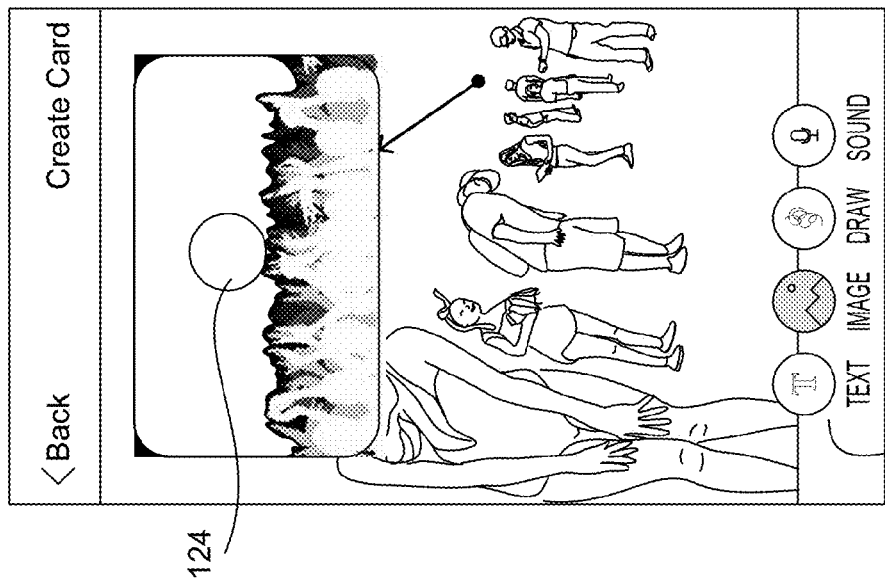

FIG. 12D illustrates several image component manipulation examples using a first or primary selection (e.g., one tap). In the left screen shot, the position of the image component is moved by contacting the display adjacent the component with a single finger (represented by circle 124) and then dragging the component to a desired location (as represented by the arrow). In the right screen shot, the image component is contacted with two fingers at approximately the same time (124A and 124B), followed by a twisting or turning motion, resulting in a rotation of the component. Also, by moving the two fingers either closer together or wider apart, the size of the image component can be manipulated.

Figure 12E:
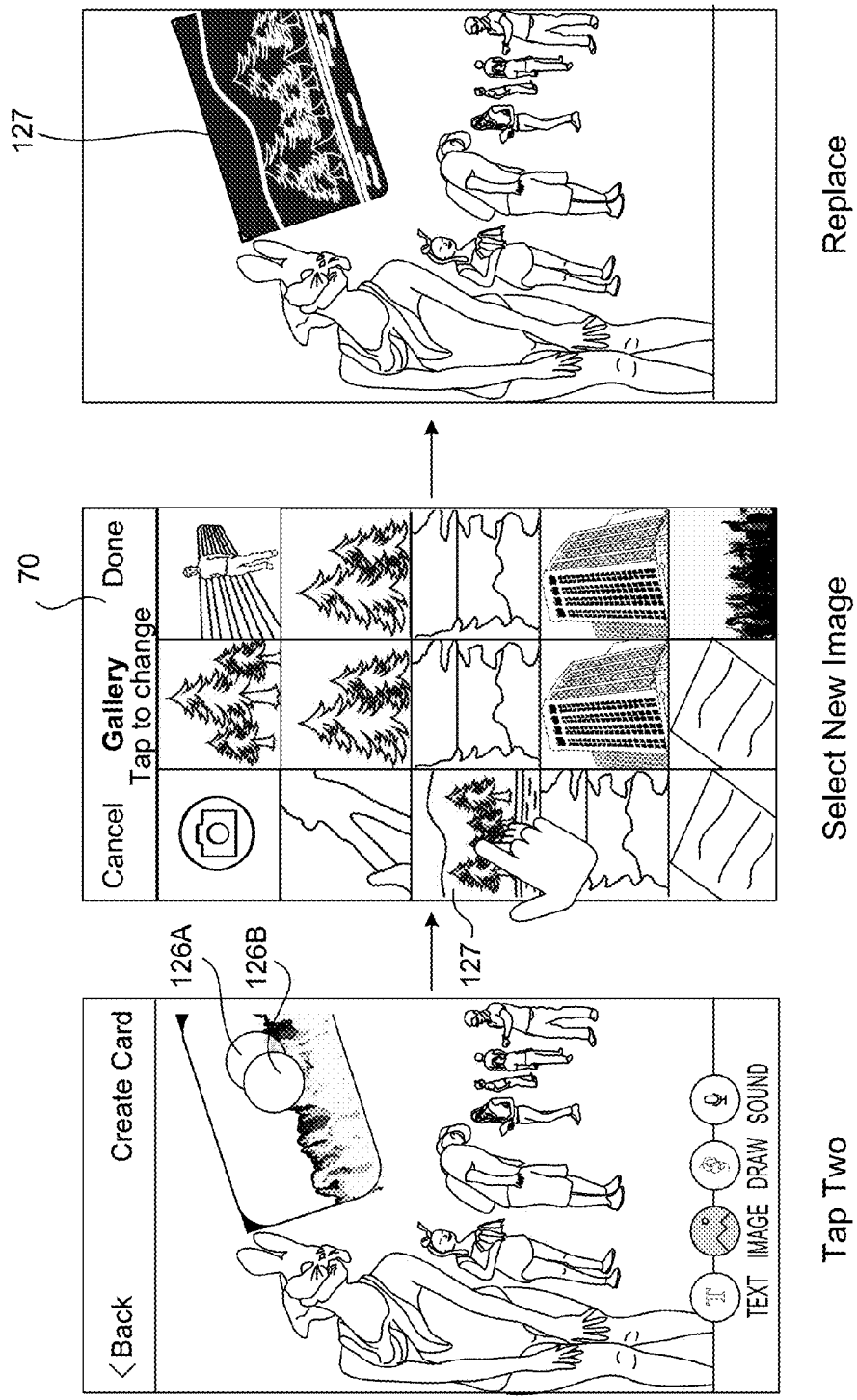

In contrast, FIG. 12E illustrates a secondary manipulation of an image component (e.g., two taps). In the left screen shot, an secondary selection of an image component is input by tapping two times, as represented by circles 126A and 126B. As illustrated in the middle screen shot, the gallery 70 appears. In this example, the author selects a new image 127. As illustrated in the right screen shot, the new image 127 replaces the old image in response to the selection.

Figure 13A:
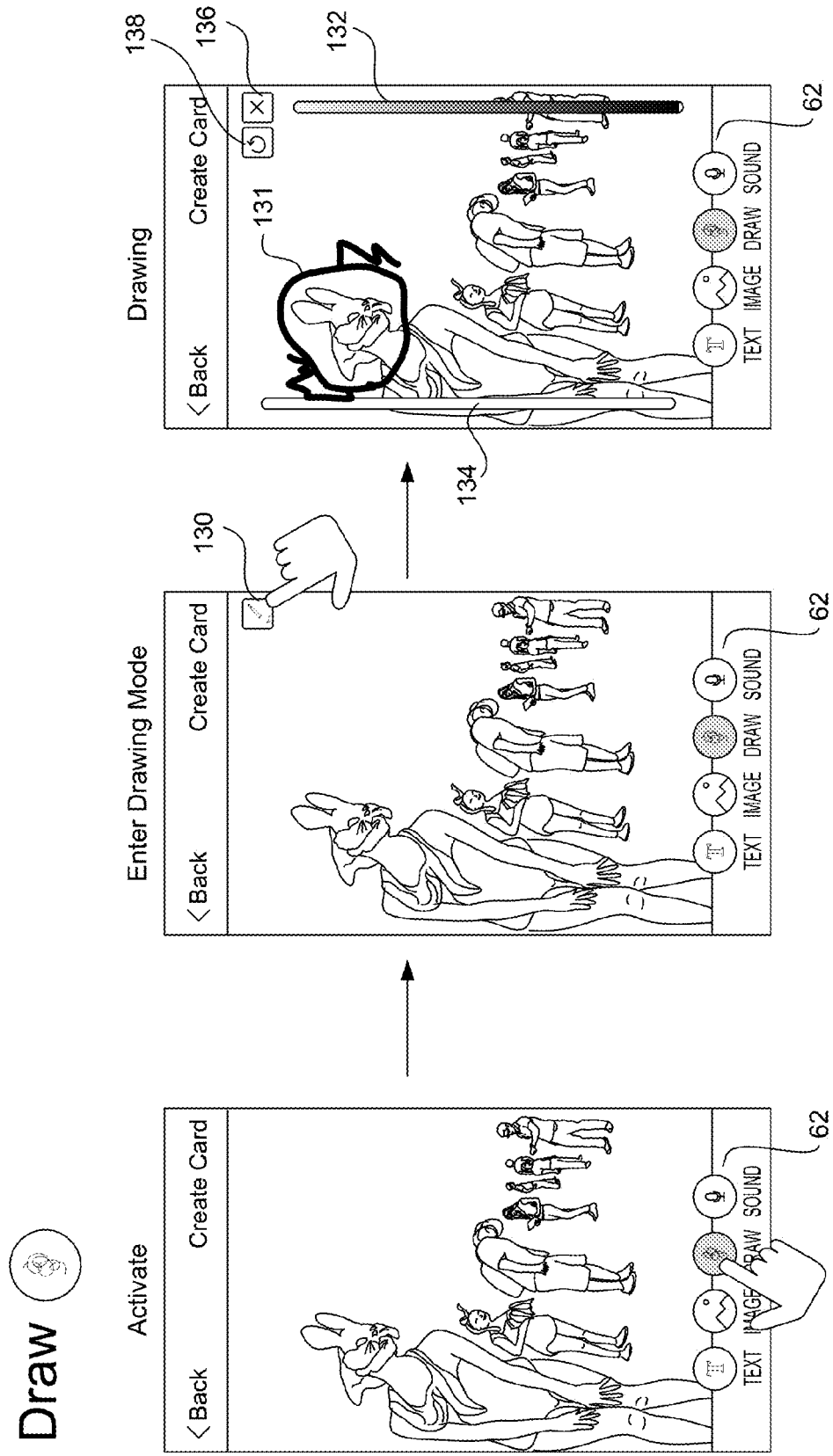
FIG. 13A and FIG. 13B illustrate various tools for customizing drawing components in accordance with non-exclusive embodiments of the authoring tool.
Figure 13B:
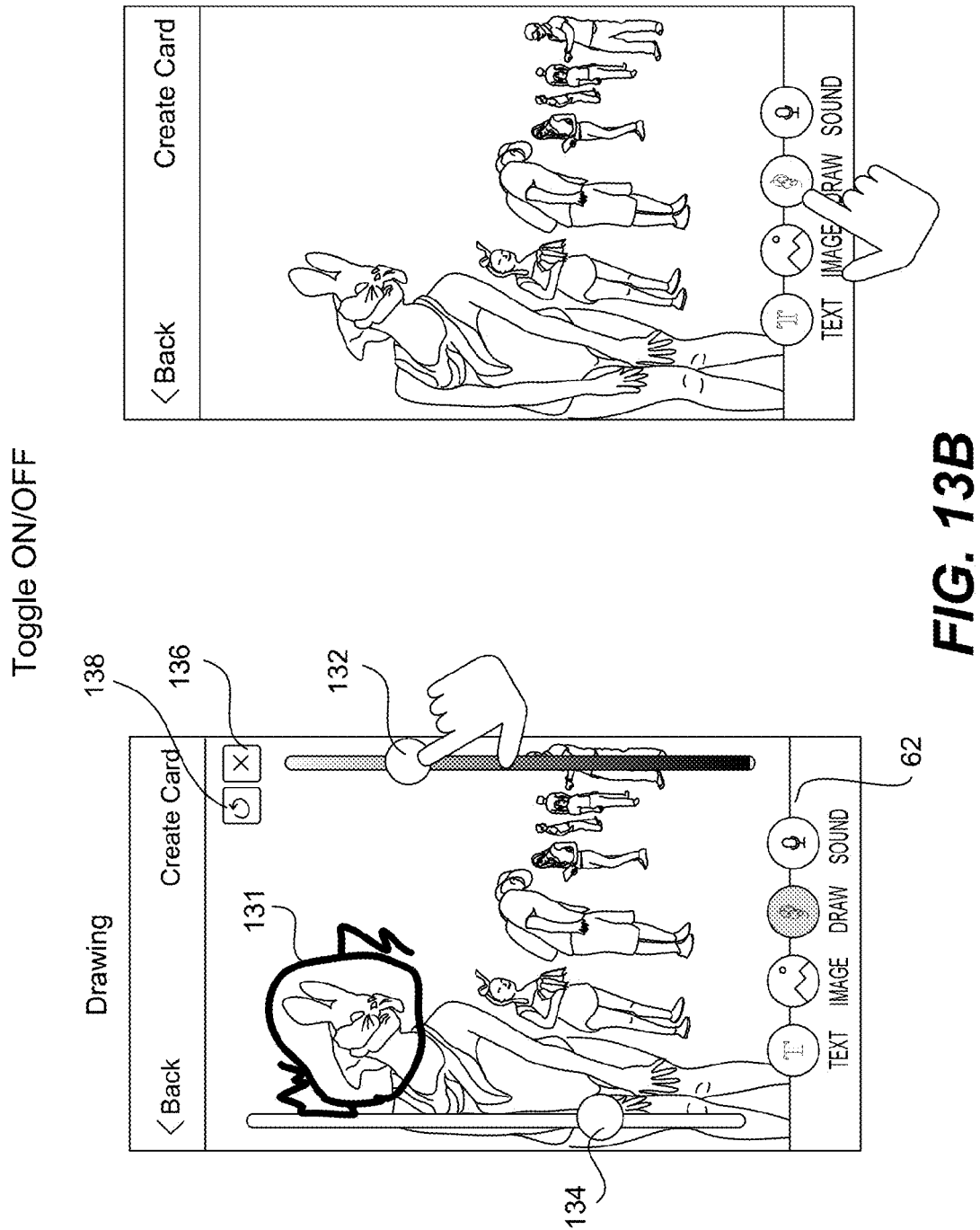

Referring to FIG. 13A and FIG. 13B, a sequence of diagrams illustrating the operation of the draw/scribble tool is illustrated.

In FIG. 13A, the draw tool is activated by the selection of the draw icon, as illustrated in the left screen shot. Thereafter, the author activates a paintbrush icon 130 to enter a drawing mode, as illustrated in the middle screen shot. Once in the drawing mode, the author may create a drawing 131 with one or multiple strokes.

Two style selector bars 132 and 134 appear while in the drawing mode. In this instance, the style selector bar 132 is used to alter the color of the drawing. As the user swipes a finger up/down the swipe 132, the color of the next stroke changes. For example, the author may create a first stroke in black. Then, swipe the style selector bar 132 to red. The next stroke will therefore be in red. The drawing in this example thus includes two strokes, the first in black and the second in red. By repeating this process, a drawing with any number of strokes, and multiple colors, can be created.

The second style selector bar 134 is used to change the brush size or thickness using a similar swiping action. For example, a first stroke can be created. Then, by swiping style selector bar 134, another brush size or thickness can be defined for the next stroke. Again, it should be understood that these two style selector bars are merely exemplary. Any drawing constraint can be altered or modified using style selector bars.

In the drawing mode, a "back" tool 136 and undo tool 138 are also provided. The back tool 136, when selected, will cause a transition back to the drawing mode, meaning the paintbrush icon 130 will again appear, allowing the author to once again select the paintbrush 130 and create a new stroke for a drawing. The undo tool 138 will undo or remove previously created stroke(s). For example, if a scribble/drawing includes multiple strokes, selecting the undo icon 138 multiple times will successively remove the strokes in the reverse order in which they were created.

FIG. 13B illustrates a toggle feature for the drawing tool. By alternatively selecting the Draw icon among the set of tools 62, any created scribble/drawings can be toggled on or off.

Figure 14A:
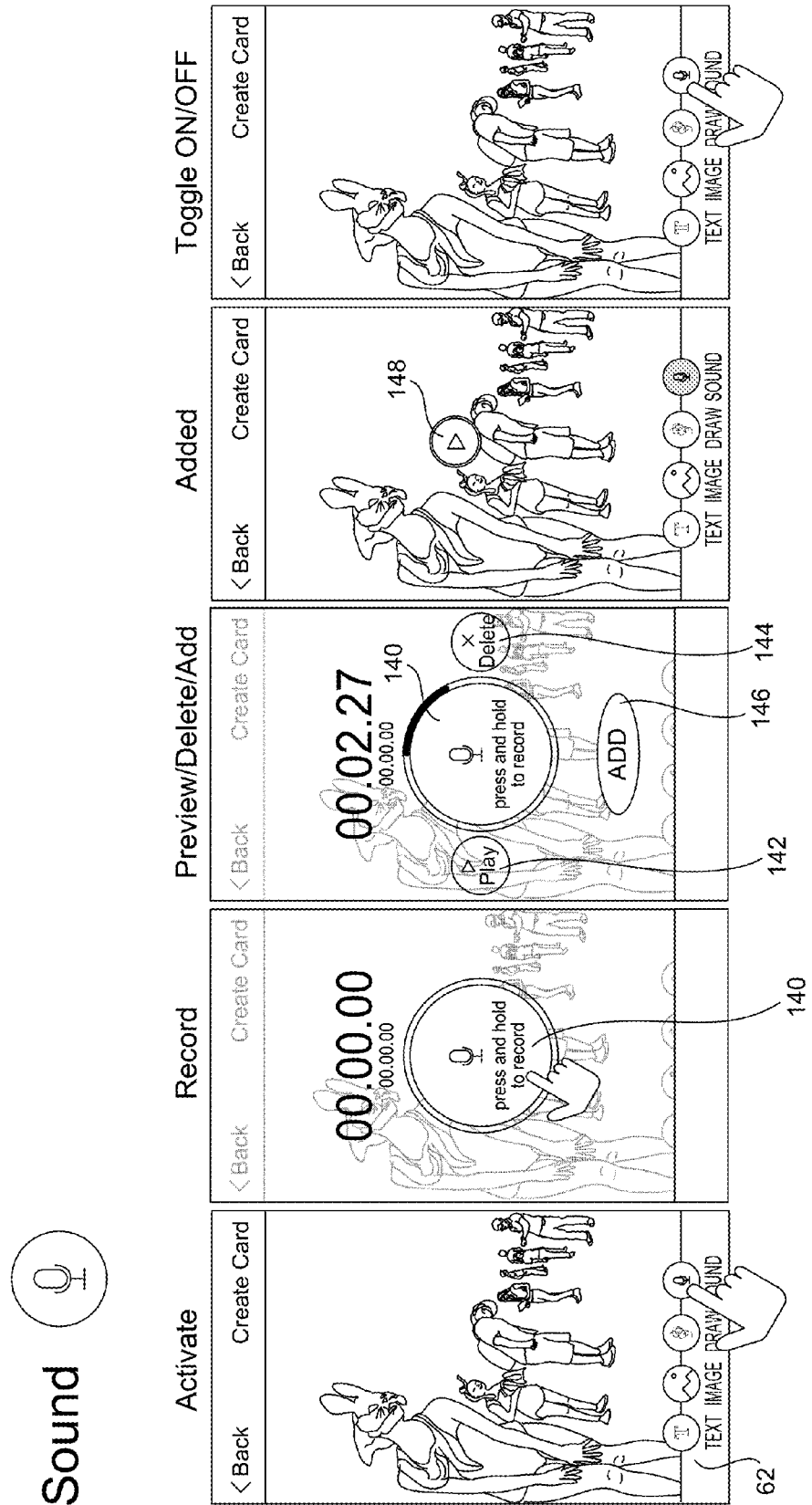
FIG. 14A and FIG. 14B illustrate various tools for customizing sound components in accordance with non-exclusive embodiments of the authoring tool.
Figure 14B:
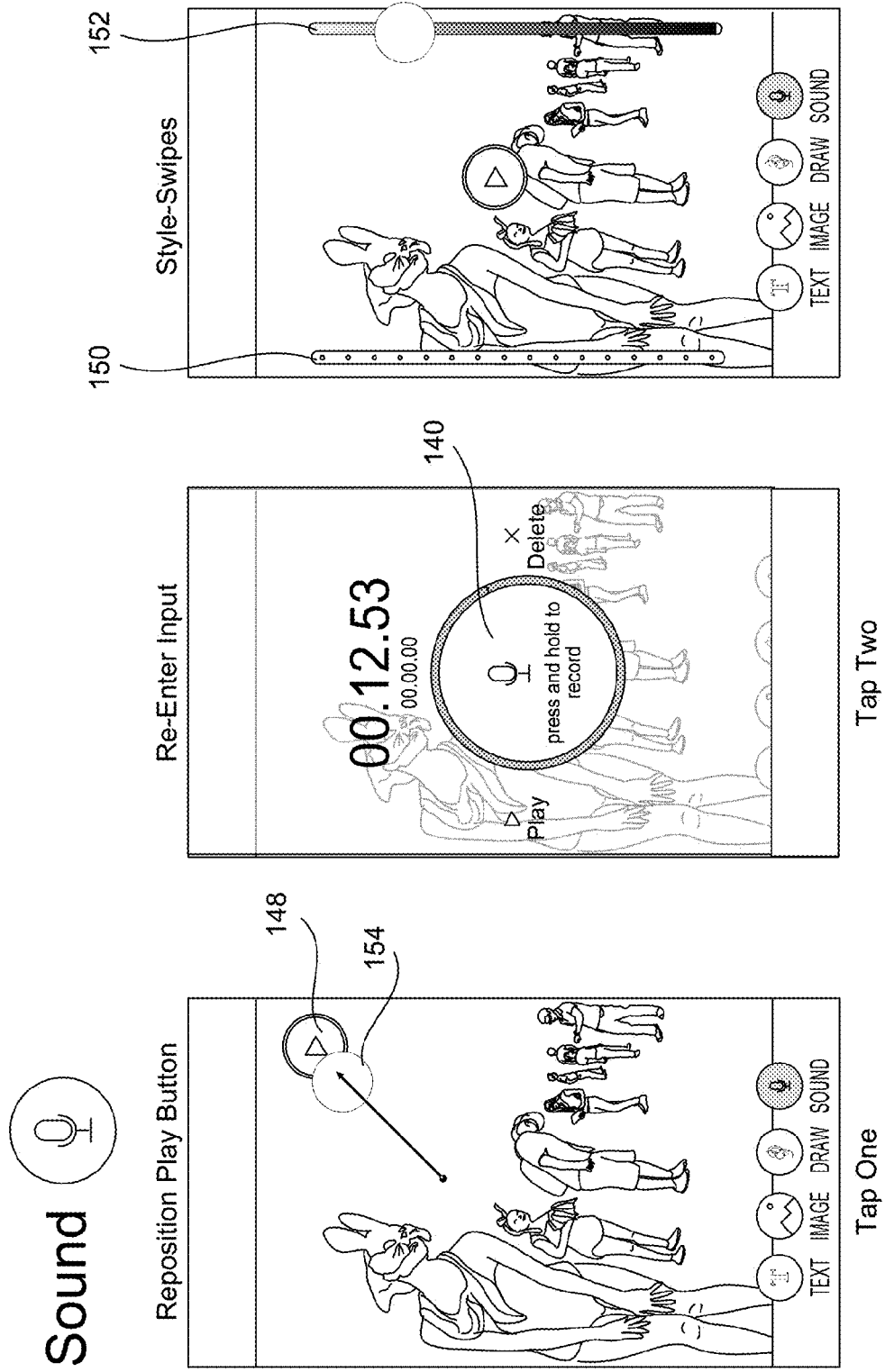

FIG. 14A and FIG. 14B illustrate the operation of the sound tool.

Referring initially to FIG. 14A, a sequence of screen shots, from left-to-right, illustrate the creation of a sound component and the recording of sound media.

In activate screen shot of FIG. 14A, the sound tool is activated by the selection of the sound icon.

In the record screen shot, a record button 140 appears after activation. When the record button 140 is selected, audio is captured and recorded. For example, the author may hold the button 140 and speak into the microphone of their mobile device, recording a message. Alternatively, the record button 140 may be used to record ambient sound, such as another person speaking, birds chirping, music, etc.

In the preview/delete/add screen shot, the author may optionally preview, delete or add the recorded media to the card. By selecting the play icon 142, the recorded audio can be previewed. By selecting the delete icon 144, the recorded audio is deleted. When add icon 146 is selected, the recorded media is included in or associated with the component created when the sound tool was selected.

In the added screen shot, a play button 148 appears on the card in response to the activation of icon 146.

In the toggle screen shot, the author may toggle the play icon 148 on or off by tapping the sound tool.

FIG. 14B illustrates how an author can possible manipulate a sound components using a primary-secondary selection (e.g., a first tap, second tap) approach and a style selector bar example. As illustrated in the right screen shot, a primary selection (e.g., a first tap) can be used to move the sound icon 148 to a new location, as represented by the arrow and circle 154. With a secondary selection (e.g., a second tap), the actual recorded content of the component can be manipulated. For instance, in this case, the record button 140 again appears and the author can either record over existing media or record and add additional media. Finally, as illustrated in the right screen shot, style selector bars can also be applied to a sound component. In this example, two style selector bars 150 and 152 are provided. The first style selector bar 150 is used to change the color of the play button 148. The second style selector bar applies a Digital Signal Processing (DSP) filter to the recorded audio, for example, to create sound effects. It should be understood that these two style selector bars are merely exemplary. Again, any constraint associated with sound components can be adjusted using style selector bars.

Figure 15:
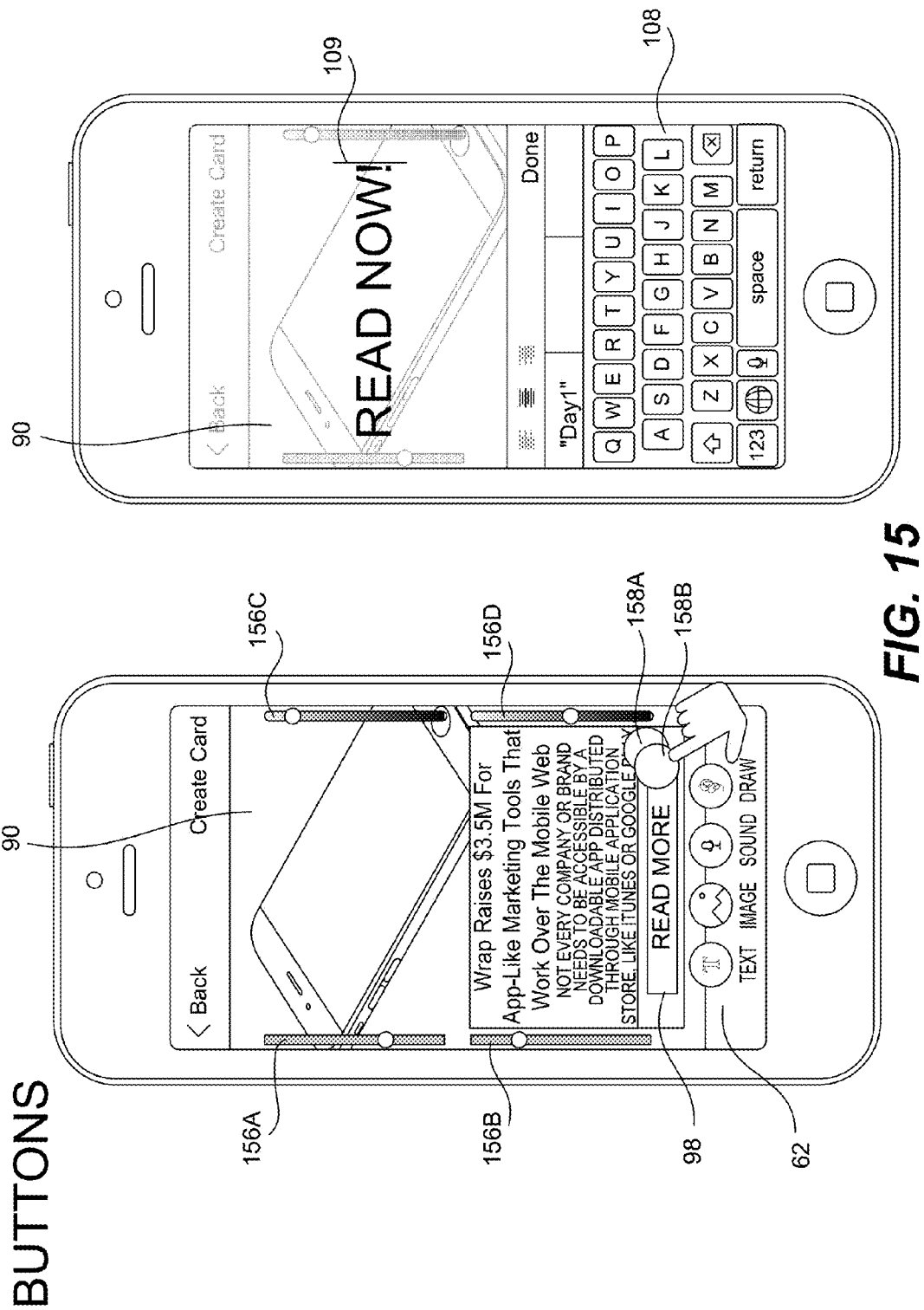
FIG. 15 customization tools for customization of buttons appearing in cards in accordance with non-exclusive embodiments of the invention.

Referring to FIG. 15, two screen shots illustrating the customization of a button appearing in the link card 90 are illustrated.

In the left screen shot, four style selector bars 156A through 156D are shown. In this non-exclusive example, the four-style swipes 156A through 156D are used to change following constraints of button 98: (a) button border radius; (b) button color; (c) font; (d) button color. Again, these style selector bars, and the particular arrangement shown, are merely exemplary. Any constraint associated with a button can be altered or modified using a style selector bar. Furthermore, the individual style selector bars 156A through 156D, or any other style selector bar, can be arranged in any manner.

Button components can also be manipulated using a first or primary selection (e.g., tap one) and a second or secondary selection (e.g., tap two). For instance, with a first tap, the author can select, move, rotate and/or size the button 98 (not illustrated), as described above. A second tap, as represented by the circles 158A and 158B, causes the keyboard 108 and text box 109 to appear, as illustrated in the left screen shot. In response, the author can change the text of the button 98. For instance, in the example shown, the author can change "READ MORE" to "READ NOW".

Customizing Mixed Cards

Figure 16:
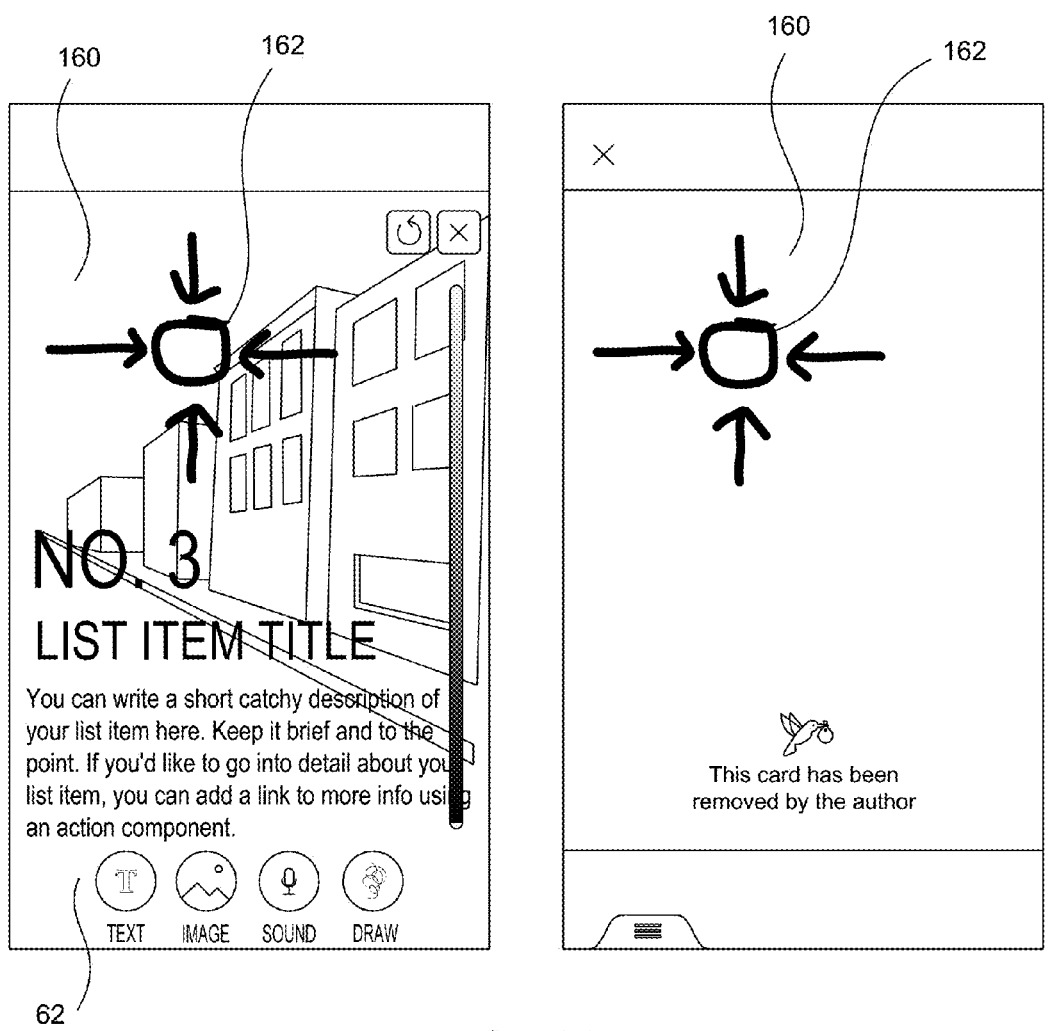
FIG. 16 illustrates the customization of a mixed card using a card overlay in accordance with a non-exclusive embodiment of the authoring tool.

Referring to FIG. 16, a diagram illustrating the customization of a card mixed into the wrap is illustrated. When a card from another wrap is mixed into a wrap being authored, a card overlay layer 160 is created, including the superimposing of the tools 62. The author can then select the various tools 62 to create text, image sound and/or drawing components as described herein. However, the custom component(s) are created or associated with the overlay layer 160, not the underlying mixed card per se.

In the specific example illustrated, a drawing 162 has been created using the draw tool. With this approach, the mixed card as originally created remains intact and is controlled by the original author. As a result, if the original author wishes to modify the original card, those changes will appear in the mixed card of the wrap being authored. Alternatively, if the original author deletes the original card, then the mixed card is removed from the wrap. For example, as illustrated in the right screen shot, the author has deleted the original card. As a result, just the overlay layer 160, with the drawing 162 in this case, remains in the wrap package.

Creating New Cards and Card Sequencing

Figure 17A:
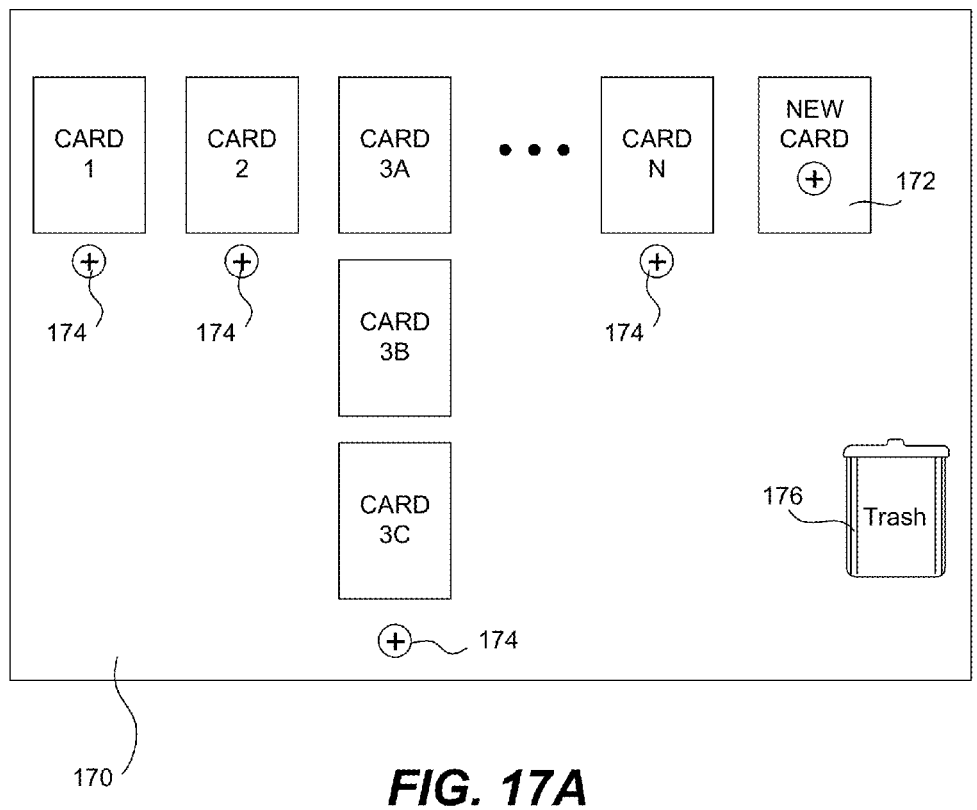
FIG. 17A and FIG. 17B illustrate various embodiments for adding a new card and/or sequencing cards of a wrap package using the authoring tool.

Referring to FIG. 17A, a non-exclusive embodiment illustrating a tool for creating new cards and sequencing the cards of the wrap package are illustrated.

In FIG. 17A, a pallet 170 for sequencing the cards in (a) a horizontal sequence, (b) a vertical sequence and/or (c) both horizontal and vertical sequences is illustrated. In this embodiment, a new card icon 172 is provided adjacent the right-most card. By selection of the icon 172, a new card is created in the horizontal sequence. In addition, a new card icon 174 is also provided beneath each card. By selecting an icon 174, a new card is created below the corresponding card. Once a new card is created using either tool 172 or 174, it may be customized as described herein. In addition to the new card tools 172 and/or 174, the author can also arrange the cards in any desired horizontal and/or vertical sequence by selecting, dragging and dropping the individual cards within the pallet 170. In this way, the author can create new cards and define their horizontal and/or vertical sequences for rendering the cards, in response to navigational inputs, when the wrap is consumed. In addition, the selection, dragging and dropping of a card into a trashcan 176 allows for the deletion of a card from the wrap.

Figure 17B:
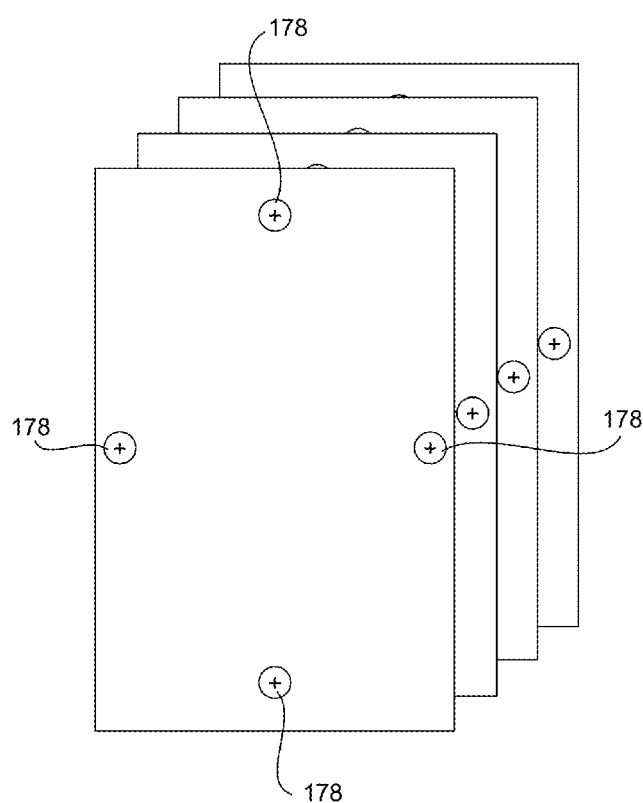

In FIG. 17B, yet another embodiment for creating new cards and sequencing cards is provided. In this embodiment, as the author navigates through the cards, a "moving" new card tool icon 178 is superimposed on the centermost displayed card(s). The icon 178 is "moving" because, as the author navigates through the Wrap horizontally, the icon 178 will appear around the card(s) that is centermost displayed on the device screen. The icon 178 will be drawn by the system in any of the four positions, including left, right, top or bottom of the card and in any combination. One of the icon(s) 178 may then be selected, for example, by tapping. In response, a new card is created in the corresponding direction. For example, if the icon 178 is positioned in either the left or right positions, then a new card will be created in either the preceding or succeeding positions. Similarly, a new card will be created above or below when the icon 178 is selected in either the top or bottom position of the card respectively. In a variation of this embodiment, just a single new card icon 178 appears per card. By tapping the icon 178, followed by some other user input such as a swipe in a given direction (e.g., left, right, up or down), resulting in the creation of a card in the swipe direction. Using any of these or other methods, a new card can be added in any horizontal and/or vertical position within the wrap by (i) navigating to a select card and (ii) implementing tool 178. Furthermore, using select, cut, copy and paste operations, cards can be selectively arranged into horizontal and/or vertical sequences.

With either embodiment of FIG. 17A or 17B, the media content of newly created cards can be authored using any of the above-described capture modes and/or customization tools.

Collaboration

Figure 18:
FIG. 18 illustrates a collaboration tool for setting permissions for others to collaboratively author a wrap package in accordance with a non-exclusive embodiment of the invention.

Referring to FIG. 18, a diagram of a group collaboration tool 180 is illustrated (sometimes referred to herein as "Groupie"). As previously noted, when the collaboration button 54 illustrated in FIG. 2 is selected, it causes a transition to screen 56, which displays the author's contacts list. In one embodiment, by selecting or checking the names of contacts on the list, permission can be granted for the designated individual(s) to access and author the wrap. In an alternative embodiment, checking one or names on the contacts list results in the generation of an invite to those selected individual(s). In response, the invited individual(s) can either accept or decline. For those who have not affirmatively responded, their status is pending. In this instance for example, individuals named Christian Fox, Alex Xenon, and Tamera Black have accepted an invite and have been granted permission to collaborate in the authoring of the wrap. Caroline Bezet on the other hand has declined, while Miles Allen is pending. The collaboration tool 180 thus enables the author to allow friends and/or colleagues to corroborate in the authoring of the wrap.

Properties and Permissions

Referring to FIG. 19, a properties and permission tool 190 for enabling the author to selectively designate properties and permissions for the wrap, or individual cards, is illustrated. When the properties button 55 is selected, the tool 190 appears on the display screen. The tool 190 includes a first section 192 that enables the author of a wrap package to set properties and permissions for the wrap package on a global basis. For example, the wrap can be named (or renamed if already assigned a name). In addition, the author can set permissions to let others share, edit, mix and/or declare the wrap public or private by selecting the appropriate Yes/No boxes. The permission tool window 190 also includes a second section 194 that enables the author to grant or deny others the permission to edit, share, delete, mix and/or make public or private individual cards on a card-by-card basis. Again, by selecting either the Yes or No options for each card (e.g., Card 1, Card 2, Card 3 through Card N), the property and/or permissions for each card can be set. Finally, a tag field 196 is provided, allowing the author to assign a tag to the wrap. A few examples of tags defined by an author may include (i.e. fashion, favorites, product, lifestyle, funny).

Wrap and Card Descriptors

When an authoring session of a wrap using the mobile authoring tool is complete, a background process is performed for the purpose of generating (a) a card descriptor of each card in the wrap and (b) a wrap descriptor including all the card descriptors. As explained in more detail below, generating a card descriptor for a given card is an iterative process. For each component in a card, data object(s) are generated for the component, its contents, and any attributes, styles, triggers and/or behaviors associated with the component. After the data component(s) are generated for the first component, the above process is successively repeated for (a) each component in the card and (b) for each card in the wrap.

Figure 20:
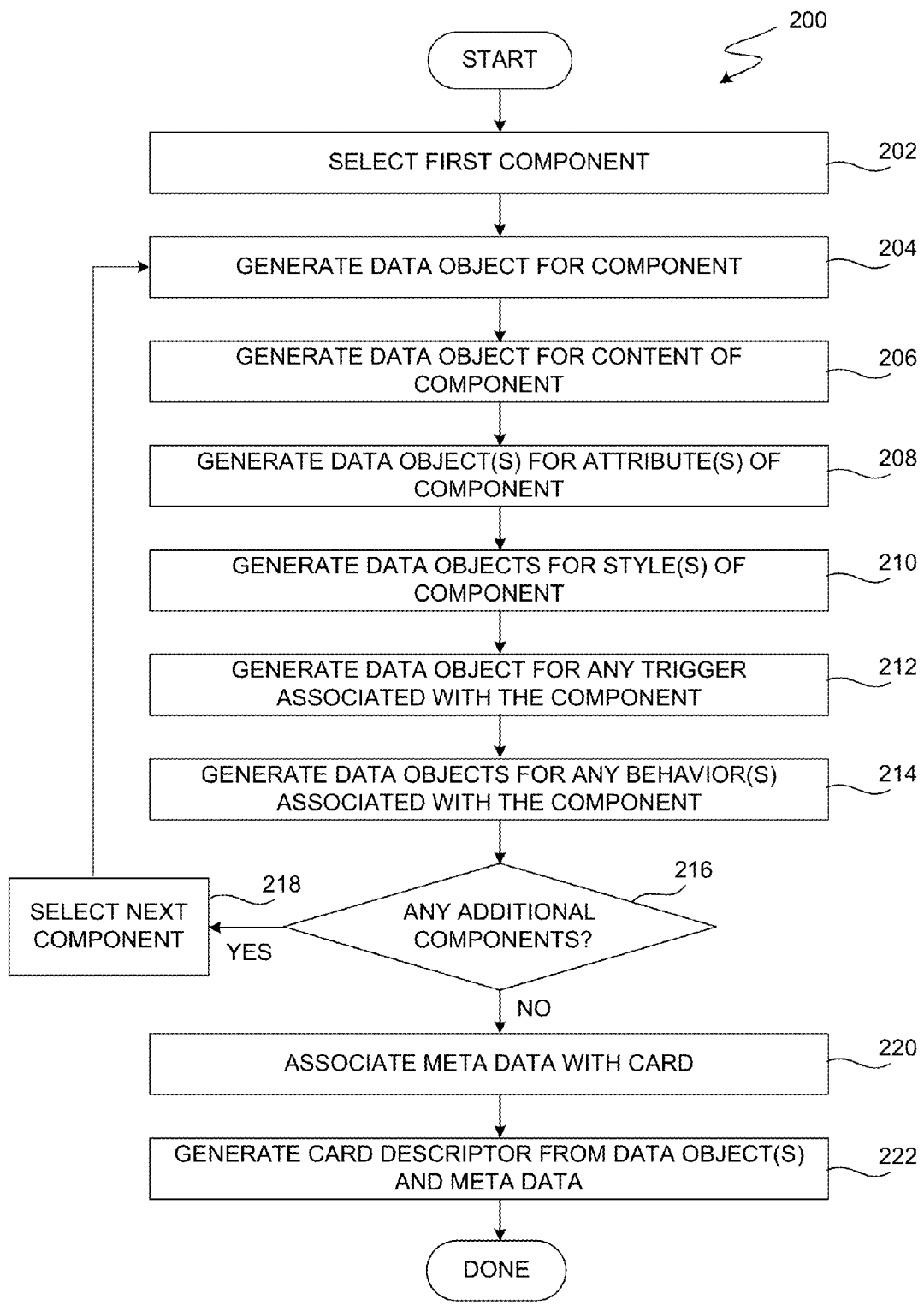
FIG. 20 is a diagram illustrating a sequence for generating a card descriptor for a card of a wrap package performed by the authoring tool.

Referring to FIG. 20, a flow chart 200 illustrating the steps of generating a card descriptor for a card of a wrap in accordance with a non-exclusive embodiment is shown. In initial step 202, a first component of the card is selected. Thereafter, data object(s) are generated for the component (step 204) along with any included or associated content (step 206), attribute(s) (step 208), style(s) including, but not limited to those defined using style selector bars as described herein (step 210), trigger(s) (step 212) and/or defined and/or declared behavior(s) (step 214) associated with the component. In decision step 216, it is determined if there are any additional components associated with the card. If yes, then in step 218 another component is selected and steps 204 through 216 are repeated for the selected component. The above process is repeated for all the components of the card. When there are no more components as determined in decision 216, then any meta data is associated with the card in step 220. Meta data may include, but is not limited to, information such as a unique card ID assigned to the card by the authoring tool, the name of the originating author, a version of the card, properties and permissions status for the card, a list of contact(s) who are permitted to collaborate in the authoring and/or customization of the card, etc. Finally, the card descriptor is generated from all the data object(s) and meta data (step 222) for the card. The card descriptor thus contains everything needed to render the card at run-time.

In accordance with various embodiments, a card descriptor for a mixed card may be generated in a number of different ways. In one embodiment, the card descriptor from the originating wrap may be copied. In another embodiment, the card descriptor may be referenced. In yet another embodiment, the sequence of FIG. 20 may be applied to the mixed card, resulting in the generation of a duplication card descriptor of the original. Regardless of the embodiment, one or more objects describing the overlay layer 160, including any added customization components, is/are generated using the aforementioned process. The overlay data objects are then included with or otherwise associated with the card descriptor of the mixed card so that customization features are rendered along with the mixed card at runtime.

Figure 21:
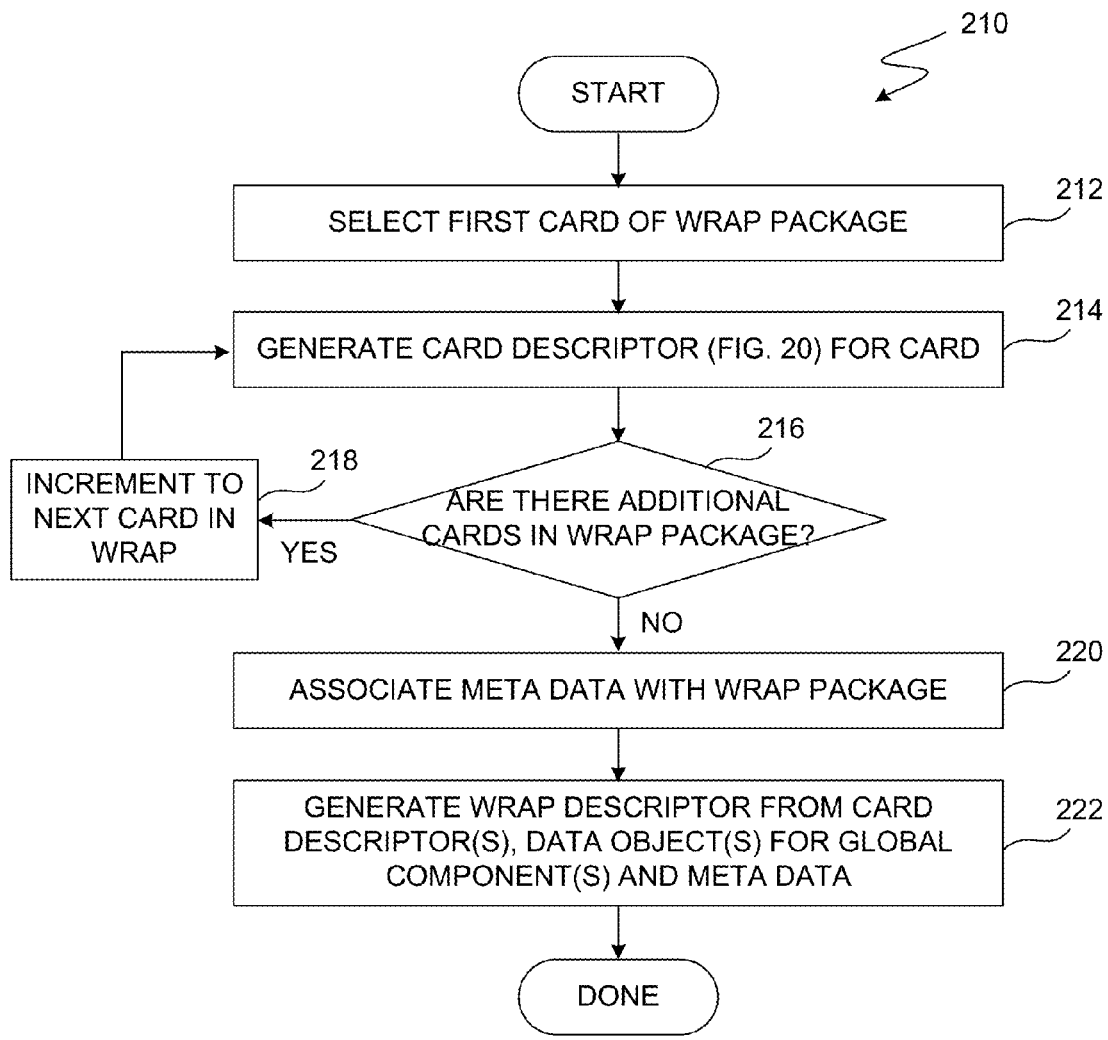
FIG. 21 is a diagram illustrating a sequence for generating a wrap descriptor for a wrap package performed by the authoring tool.

Referring to FIG. 21, a flow diagram 210 illustrating the steps of generating a wrap descriptor for the authored wrap package is illustrated. In the initial step (212), the first card of the wrap is selected and its card descriptor is generated (step 214) using the process described above with respect to FIG. 20. Thereafter, in decision 216, it is determined if there are any additional cards in the wrap package. If yes, then next card in the wrap is incremented (step 218) and the card descriptor for that card is generated in step 214. This process is repeated until a card descriptor is generated for all the cards in the wrap, as determined in decision 216. Once all the card descriptors are generated, meta data is associated with the wrap in step 220. Such meta data may include, but is not limited to, a unique wrap ID, name of the originating author, a version of the wrap, the properties and permissions status for the wrap, a list of contact(s) who are permitted to collaborate in the authoring and/or customization of the wrap, etc. Finally, in step 222, the wrap descriptor is generated from the all the card descriptors and/or any media data associated with the wrap.

The net result of the above-described background process is the generation of a wrap descriptor for the wrap package. The wrap descriptor (a) defines all the cards of the wrap package and (b) includes a plurality of card descriptors for the cards of the wrap package respectively. Each card descriptor defines the content, structure and a layout of an associated card respectively. The wrap descriptor may also include various wrap level components, attributes, behavior declarations and/or metadata.

Content of relatively small size, such as text, is typically defined inline the descriptors of the wrap. On the other hand, content of any appreciable size will typically be referenced through the use of references to assets stored outside of the descriptor itself. That is, the descriptor contains references to external asset(s) rather than incorporating such assets into the descriptor itself. With this approach, a runtime viewer is responsible for obtaining the external assets at runtime. Wraps are thus "lightweight", meaning they are easier to download and distribute over mobile and cellular networks, which tend to be relatively low bandwidth.

Cards and components may also feature behaviors. When behaviors are used they are preferably declared in the descriptor rather than being referenced, scripted, or explicitly defined within the descriptor itself. The runtime viewer is responsible for associating the behaviors declared in the descriptor with their associated components in a runtime instance. The use of declared behaviors allows card authors to endow cards, components or the wrap itself with desired behaviors without requiring the author to be knowledgeable of, or concerned with, how the behavior is implemented on different platforms. It also eliminates the need to include any scripts or other executable code within the descriptor itself to implement the behavior. The descriptor may also include links and other triggers, which can facilitate various calls to action.

Wrap descriptors can be represented in a number of different formats. For instance, a wrap descriptor may be formatted using markup languages, such as XML, which are common formats used for the distribution of web content and functionality. Although markup languages can be used to represent a wrap, the Applicant has found that using a JavaScript Object Notation (JSON) format for representing wrap descriptors works particularly well for defining a wrap package of cards. As explained in detail below, the use of JSON results in wrap descriptors that are generally more compact and concise and that are simpler to produce, transport and consume compared to using a markup language.

JSON is a lightweight, text-based, language independent data interchange format. Although JSON is a well known for exchanging data, to the best of the knowledge of the Applicant, JSON has not previously or conventionally been used to define the entire structure, layout and content of web based cards or even web pages and it has not been used to represent the structure, layout and content of a set of cards such as wrap packages as described herein. On the contrary, conventional wisdom suggests that markup languages (in conjunction with style sheets—e.g. CSS) are the most suitable medium for defining the content and presentation of web based documents, including both traditional web pages and web-based cards. However, applicants have found that the use of descriptors in general, and the use of JSON descriptors in particular, has several advantages when representing a set of cards of a wrap package when compared to using markup language card definitions.

One advantage of using JSON is that in the context of defining the structure, layout and content of a set of cards, JSON tends to be more compact than XML and other popular markup languages. Another advantage of using JSON relates to portability. Since JSON is derived from JavaScript, a JavaScript parser associated with virtually any JavaScript interpreter will likely be able to seamlessly parse a JSON descriptor. Today, JavaScript interpreters are ubiquitous and included in virtually all web browsers and web based viewers which simplifies (and reduces the size of) the runtime viewer since there is no need to include a dedicated descriptor parser. In contrast, if XML were used to create the descriptor, many runtime environments would need to be supplemented by an appropriate XML parser.

JSON's ability to express typed data, and especially arrays, also has benefits in the context of a wrap descriptor. Consider, for example, the JSON expression:

"cards": [ . . . ]

This expression communicates that the defined structure is an array of "cards". The communication of data type, especially arrays, is beneficial within the context of wrap packages because wrap descriptors may contain repeating elements where implicit order is important. In the example, the expression "cards": [ . . . ] is used to define the set of cards that constitute the wrap as can be seen, for example, in the Appendices of the of commonly assigned U.S. Provisional Application No. 62/210,585 (P005P6), incorporated herein by reference for all purposes, including the Appendices. The implicit order of the array elements (i.e., the order of the cards in the array) is then used by the runtime viewer to define the order of the cards within the runtime instance of the wrap package. That is, the order of the cards in the package is implicitly defined by the wrap descriptor. In contrast, defining the order of a set of cards using traditional markup language approach, without explicit card-to-card links, is more cumbersome. Arrays are also useful in other applications within the context of wrap packages, as for example, implicitly defining the order of gallery items within a gallery, etc.

Furthermore, the constraints that the cards have defined aspect ratios and the positional relationships of the content within each card is immutable gives the authors presentational control of their creative(s) without requiring knowledge of any of the idiosyncrasies of web programming for different devices. Such constraints also significantly simplify the wrap definition, thereby making the use of JSON wrap descriptor representations practical, since there is no need to describe how layouts of components change with different aspect ratios.

In yet another non-exclusive embodiment, the wrap descriptor can also be a Binary JSON (BSON) wrap descriptor.

Component Model

In yet other embodiments, a component model is used. That is, each card is composed of one or more components. As such, each wrap or card descriptor defines, and therefore includes, one or more components, which are effectively container(s) for corresponding content and/or functionality—e.g., textbox components, image components, video components, link components, trigger components, etc. When appropriate, components may also include "sub-components", which are in actuality, just components as well.

The component model, in certain non-exclusive embodiments, may also help separate content from its presentation within a wrap descriptor. For example, when a component based descriptor format is used, attributes (e.g., styles etc.—which may take the form of CSS) and behaviors may be may be applied at any defined component level (e.g., the wrap, card, a component level, or even a sub-component level, but not to individual elements (i.e., non-components) within or making up a given component. For example, a textbox component may include an extended string of text. Any special formatting desired for the component, such a bolding, a certain font, or color, is associated with the entire component (i.e., the entire text string). However, with the component model, there is no explicit mechanism provided for associating unique styling (e.g., tags, CSS, etc.) with any subset of the words or characters within the text string. This constraint on the use of attributes provides less flexibility than standard mark-up language usages, but helps separate the content from the presentation and helps simplify the descriptor structure and the descriptor serialization and deserialization processes.

As previously discussed, attributes may be associated with components at any desired level, including to the entire wrap (the wrap level), to an entire card (the card level), the component level or a sub-component level. Within this framework, styles, attributes and/or behaviors can be applied at any defined component level, but only at those levels. As a result, the card creation and rendering processes is significantly simplified, while still supporting the ability for authors to create visually compelling creative content.

Although attributes are associated at the component level, it should be appreciated that certain styling conventions such as CSS-3, support the possibility of applying different styling to different elements of a string of elements. Such styling can also be used in conjunction with a wrap descriptor as well although such an approach is considered unlikely in the vast majority of applications.

Although a descriptor format constrained to associating attributes with components in preferred, it should be appreciated that in other embodiments, the descriptors do not need to be so constrained.

Behaviors

In one embodiment, any behaviors assigned to cards or components are set by default by the authoring tool and generally cannot be altered by an author of a wrap. For example, a "card flip" behavior, similar to the turning of the pages of a book magazine, may be assigned to all the cards of a wrap in response to horizontal navigation inputs. Or, alternatively in another example, the cards in a vertical sequence can transition using a free-scrolling behavior in response to vertical navigation inputs. In these two examples, the behavior associated with an individual card or the cards of a given wrap are assigned by the authoring tool and are not alterable by an author. However, the above-described default behavior settings are by no means a requirement.

Figure 22:
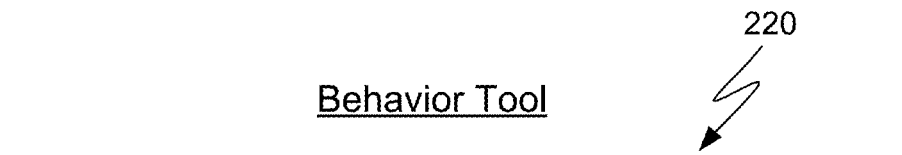
FIG. 22 illustrates a behavior tool for enabling an author to selectively assign certain behaviors to the cards and/or components of a wrap package in accordance with a non-exclusive embodiment of the present invention.

Referring to FIG. 22, an exemplary behavior tool 220 that enables an author to selectively define or set certain behaviors for card(s) and/or component(s) of a wrap package is illustrated. In this non-exclusive embodiment, the tool 220 lists on the left a number of card and/or component types, such as a vertical gallery of cards, a hyperlink component, location button components, and document component. On the right, various selections for defining different behaviors for the corresponding card and/or component is provided.

For example, with the vertical gallery of cards, a behavior of either free scrolling or snap-to-card can be selected.

For hyperlink components, behavior options for opening in the same tab, opening in a different tab, or cul-de-sacing are provided. With cul-de-sacing, the view appearing on the display of the mobile device transitions to the defined hyperlink when selected. When the content corresponding to the hyperlink is closed, the viewer is returned to the wrap.

For location button components, the behavior options may include automatically displaying a map of a defined location or displaying an icon, that when selected, spawns the display of a map of the defined location.

For document component, the behavior options may include the display of an icon that when selected, spawns the display of the corresponding document, a preview that allows a preview of the document or a "Hot Spot", which is a transparent bounding box.

The behavior tool 220 illustrates just a few possible examples of the types of behaviors that can be selectively defined by an author for a given card and/or component. It should be understood, however, that this list is not exhaustive and that any behavior can be assigned to any card and/or component of a wrap in a similar manner.

In addition, it should be noted that any behavior assigned to any card and/or component type can be done on a global basis (i.e., all the cards and/or components of a given type) or on an individual card and/or component basis. In the case of the latter, the tool 220 enables the selection of a particular card and/or component and the association of a desired behavior. Although this embodiment is not illustrated in FIG. 22, it would generally include first the selection or identification of an individual card and/or component and then second the association of a behavior to that individual card and/or component.

Finally, the behavior tool 220 may be implemented in a wide variety of different ways using various user interfaces. As such, the behavior tool as illustrated in 22 should be in no way construed as limiting.

Distribution and Sharing of Authored Wrap Packages

Figure 23:
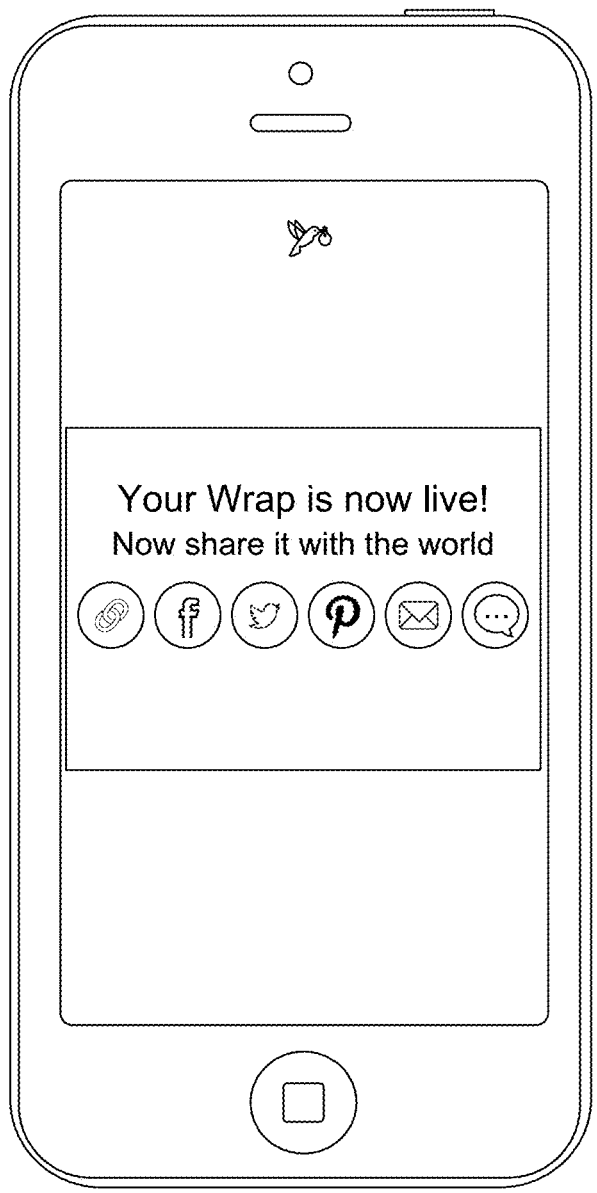
FIG. 23 illustrates how an authored wrap package can be distributed and shared with others in accordance with non-exclusive embodiments of the present invention.

Once a wrap has been authored, it may be shared and distributed with others in numerous ways. For example, as illustrated in FIG. 23, a unique wrap identifier associated with the wrap can be included in a message, such as an email or text, and sent to one or multiple recipients. Alternatively, a wrap cover (not illustrated), including the wrap identifier embedded therein, may be created. The wrap cover may then be inserted into a web site, an application, in email message(s), and/or text message(s). In yet other embodiments, the wrap identifier and/or a corresponding wrap cover may be inserted into a social media feed, such as but not limited to, Facebook, Twitter, Pinterest, etc. Regardless of the delivery method, when a wrap identifier and/or cover is selected, the corresponding wrap descriptor is delivered to the requesting device. In response, a runtime engine processes the wrap descriptor and generates a runtime instance of the wrap package. In various embodiments, the runtime engine may be included in a native "app" that already resides on the consuming device. In situations were a native app is not present, a runtime engine may be delivered to the requesting device in cooperation with the delivery of the wrap descriptor. In this way, the wrap can be rendered without the native app.

For more details on the distribution of wrap packages and the operation and distribution of the runtime engine, see commonly assigned U.S. application Ser. No. 14/878,148, entitled Card Based Package for Distributing Electronic Media and Services, filed Oct. 8, 2015, incorporated herein for all purposes.

ALTERNATIVE EMBODIMENTS

While the above-described embodiments have been described as a mobile-first authoring tool, it should be understood that mobile-first should in no way be construed as limiting. On the contrary, the authoring tool as described herein may be used on any type of computing device, including both mobile and non-mobile devices (i.e., a desktop computer or workstation). In addition, a camera-first default mode for the creation of a first card of an authoring session is also not a requirement. On the contrary, any capture mode can be set as a default mode when a session begins, or alternatively, the author may entirely select the mode for the creation of a first card, meaning there is no default mode when an authoring session begins. In yet other embodiments, any media capturing mode, customization tool and/or button may be used or otherwise incorporated into the mobile authoring tool, meaning the tool is not limited to just those explicitly described herein. For example, a button tool can be added to the customization tool set. With a button tool, an author can selectively create button components within cards. Examples of button components that an author may wish to include are "Buy Now", "Contact Us", "Chat Now", "Read Now".

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. An authoring tool for authoring a package of cards on a mobile device, the authoring tool configured to:
    activate a camera on the mobile device when a session for the authoring of the package of cards is initiated;
    display for preview visual media content, generated by the camera, on a display screen associated with the mobile device;
    capture the previewed visual media content in response to a media capture input provided to the mobile device;
    a create a visual media card including the captured visual media content;
    provide a new card tool for adding one or more additional card(s) to the package;
    provide a sequencing tool for ordering the sequence of the visual media card and the one or more additional card(s) of the package;
    generate a JavaScript Object Notation (JSON) descriptor for the package, the JSON descriptor:
        (a) defining the sequence order for rendering the cards of the package including the visual media card and the one or more additional card(s); and
        (b) including a plurality of JSON card descriptors for the cards of the package respectively, each JSON card descriptor arranged to define content and a layout of an associated card respectively.

2. The authoring tool of claim 1, wherein the JSON descriptor generated by the authoring tool is a Binary JSON (BSON) descriptor.

3. The authoring tool of claim 1, wherein the new card tool enables the creation of a new card by:
    (c) receiving an input through the mobile device indicative of a selection of one of a plurality of media capture modes; and
    (d) generating the new card including a component for media of the selected media capture mode type.

4. The authoring tool of claim 3, wherein the plurality of media capture modes includes, but is not limited to, the following:
    (e) a camera mode for visual media captured by the camera on the mobile device;
    (f) a device mode for media stored on or accessible by the mobile device;
    (g) a "light mode" for adding "positive energy" to the package in the form of an image, animated Graphics Interchange Format (GIF) or video clip;
    (h) a location mode for GPS or positional media;
    (i) a link mode for specifying a URL or other identifier used to identify and access remote media; and
    (j) a mixing mode for enabling the mixing of a select card from another card package into the package of cards as authored using the authoring tool.

5. The authoring tool of claim 1, further comprising a card overlay tool defining a plurality of overlays, the overlay tool enabling one of the plurality of overlays to be selectively applied to a select card of the package of cards.

6. The authoring tool of claim 5, further comprising customization tools for selectively customizing the overlay applied to the select card of the package of cards, the customizing tools enabling the customization of the overlay with one or more components, the one or more components including:
    (c) a text component;
    (d) an image/photo component;
    (e) a sound component; and/or
    (f) a drawing/scribble component.

7. The authoring tool of claim 5, wherein the card overlay tool is configured to sequence through the plurality of different overlays, each having a different shape, in response to a swiping action applied to the display of the mobile device.

8. The authoring tool of claim 1, further comprising one or more customization tools for selectively and individually customizing the cards of the package respectively.

9. The authoring tool of claim 8, wherein the one or more customization tools include one or more of the following:
   (c) a text tool for adding text;
   (d) an image tool for adding an image and/or photo;
   (e) a drawing/scribble tool for adding drawings/scribbles; and/or
   (f) a sound tool for adding sound.

10. The authoring tool of claim 1, further comprising a customization tool configured to:
   (c) create a component for a select card of the package to be customized; and
   (d) render the created component on or associated with the selected card on the display of the mobile device as the created component is customized.

11. The authoring tool of claim 1, further comprising a customization tool for customization of a visual component portrayed within a card of the package, the customization of the visual component implemented by one or more of the following touch-screen operations performed on the display of the mobile device:
   (c) selecting by contacting the visual component on the display;
   (d) positioning by dragging the visual component on the display;
   (e) rotating the visual component on the display;
   (f) sizing the visual component on the display.

12. The authoring tool of claim 1, wherein the customization tool enables selective customization of an individual card of the package by:
   (c) creating a component for the individual card;
   (d) defining media for the component; and
   (e) inserting into or associating the defined media with the component.

13. The authoring tool of claim 10, wherein the component comprises one of the following types of components:
   (c) a text component;
   (d) an image and/or photo component;
   (e) a video component;
   (f) a drawing component;
   (g) a sound component;
   (h) a GPS or positional component;
   (i) a link component; and/or
   (j) a button component.

14. The authoring tool of claim 10, further comprising enabling a first manipulation of the component, the first manipulation comprising one of the following:
   (c) moving the component;
   (d) sizing the component;
   (e) rotating the component; or
   (f) any combination of (c) through (e).

15. The authoring tool of claim 14, further comprising enabling a second manipulation of the component, the second manipulation enabling the modification of the media included in or associated with the component.

16. The authoring tool of claim 15, wherein the first manipulation and the second manipulation of the component is implemented by a first tap and a second tap of the display screen of the mobile device respectively.

17. The authoring tool of claim 1, further comprising a style tool for adjusting a constraint associated with text appearing within a card of the package, the style tool adjusting the constraint of the text in response to a swipe along a style bar appearing in the card portrayed on the display, the constraint comprising one of the following:
   (c) font;
   (d) color;
   (e) justification;
   (f) font style including one or more of bold, italic, underline, strike-through, highlight, superscript, subscript; and
   (g) size.

18. The authoring tool of claim 1, further comprising a style tool for adjusting a constraint associated with an image appearing within a card of the package, the style tool adjusting the constraint of the image in response to a swipe along a style bar appearing in the card portrayed on the display, the constraint comprising one of the following:
   (c) color filter;
   (d) mask radius;
   (e) mask type; and
   (f) image style.

19. The authoring tool of claim 1, further comprising a style tool for adjusting a constraint associated with a drawing appearing within a card of the package, the style tool adjusting the constraint of the drawing in response to a swipe along a style bar appearing in the card portrayed on the display, the constraint comprising one of the following:
   (c) brush size;
   (d) brush type; and
   (e) color.

20. The authoring tool of claim 1, further comprising a style tool for adjusting a constraint associated with a sound associated within a card of the package, the style tool adjusting the constraint of the sound in response to a swipe along a style bar appearing in the card portrayed on the display, the constraint comprising one of the following:
   (c) a sound filter; and
   (d) graphic representation of play button.

21. The authoring tool of claim 1, wherein the sequencing tool is further configured to sequence the visual media card and the one or more card(s) added to the package into one of the following:
   (c) a horizontal sequence order;
   (d) a vertical sequence order; or
   (e) both horizontal and vertical sequence orders.

22. The authoring tool of claim 1, wherein the new card tool includes a new card icon that appears on an existing card of the package and that is used to create a new card when invoked.

23. The authoring tool of claim 1, further comprising a behavior tool for selectively defining a behavior for a card or a component of the package.

24. The authoring tool of claim 1, further comprising a collaboration tool for inviting and granting permission for one or more other(s) to collaboratively author the package.

25. The authoring tool of claim 1, further comprising a mixing-permission tool for selectively designating if one or more of the card(s) of the package can be mixed into a second package of cards.

26. The authoring tool of claim 1, further comprising a sharing tool for enabling the sharing of the package, wherein the sharing tool enables the distribution of the package by one or more of the following:
   (c) via email;
   (d) via messaging;
   (e) insertion into a social media feed;
   (f) inclusion in a web site; and
   (g) inclusion in a native mobile app.

27. An authoring tool for authoring a package of cards on a mobile device by enabling an author to:
   (i) create a new card by selectively using one of a plurality of media capture modes;
   (ii) customize the new card using one or more of a plurality of customization tools;

(iii) create one or more additional card(s) by repeating steps (i) and (ii);
(iv) define a sequence order for rendering the cards, including the new card and the one or more additional card(s), of the package, the sequence order extending in one or more directions; and
(v) generating a JavaScript Object Notation (JSON) descriptor for defining and delivering the package of cards to a consuming computing device, the JSON descriptor having a plurality of JSON card descriptors, each of the JSON card descriptors defining a layout and content of an associated card among the cards of the package respectively.

28. The authoring tool of claim 27, wherein the plurality of media capture modes includes, but is not limited to, the following:
(e) a camera mode for visual media captured by a camera on the mobile device;
(f) a device mode for media stored on or accessible by the mobile device;
(g) a "light mode" for adding "positive energy" to the package in the form of an image, animated Graphics Interchange Format (GIF) or video clip;
(h) a location mode for GPS or positional media;
(i) a link mode for specifying a URL or other identifier used to identify and access remote media; and
(j) a mixing mode for enabling the mixing of a select card from another card package into the package of cards as authored using the authoring tool.

29. The authoring tool of claim 27, further comprising a card creation tool for enabling the creation of the new card and/or the one or more additional cards by:
receiving an input through the mobile device indicative of a selection of one of the plurality of media capture modes; and
creating the new card or the one or more additional card(s) including a component for including or associating media of the selected media capture mode type.

* * * * *